United States Patent [19]

Harris

[11] Patent Number: 5,438,436
[45] Date of Patent: Aug. 1, 1995

[54] FACSIMILE MACHINE APPARATUS

[76] Inventor: Scott C. Harris, 7988 Foxmoor Dr., Dunn Loring, Va. 22027

[21] Appl. No.: 126,408

[22] Filed: Sep. 27, 1993

Related U.S. Application Data

[63] Continuation-in-part of Ser. No. 346,211, May 2, 1989, Pat. No. 5,339,174.

[51] Int. Cl.⁶ .................................................. H04N 1/46
[52] U.S. Cl. ..................................... 358/500; 358/504; 358/524
[58] Field of Search .................... 358/500, 504, 524

[56] References Cited

U.S. PATENT DOCUMENTS

| | | | |
|---|---|---|---|
| 3,619,484 | 11/1971 | Tanaka | 358/529 |
| 3,725,569 | 4/1973 | Ashworth et al. | 358/529 |
| 4,274,111 | 6/1981 | Murase | 358/508 |
| 4,411,873 | 1/1985 | Takayama | 358/426 |
| 4,582,396 | 4/1986 | Bos | 350/347 E |
| 4,646,160 | 2/1987 | Iizuka | 358/402 |
| 4,746,996 | 5/1988 | Tanigawa | 360/76 |
| 4,811,385 | 3/1989 | Watanabe | 358/434 |
| 4,814,990 | 3/1989 | Kato | 364/426.03 |
| 4,834,508 | 5/1989 | Fergason | 350/339 F |
| 4,862,254 | 8/1989 | Takada | 358/515 |
| 4,907,255 | 3/1990 | Kurokawa | 374/100 |
| 4,918,718 | 4/1990 | Emmons et al. | 379/53 |
| 4,935,955 | 6/1990 | Neudorfer | 358/402 |
| 4,964,154 | 10/1990 | Shimotono | 358/442 |
| 4,999,238 | 1/1991 | Iggulden | 428/283 |
| 5,089,905 | 2/1992 | Sasaki | 359/64 |
| 5,132,826 | 7/1992 | Johnson | 359/93 |
| 5,177,603 | 1/1993 | Kojima | 358/518 |
| 5,182,637 | 1/1993 | Yoshioka et al. | 358/75 |
| 5,200,832 | 4/1993 | Taniuchi et al. | 358/527 |
| 5,218,647 | 6/1993 | Blonstein et al. | 358/500 |
| 5,220,417 | 6/1993 | Sugiura | 358/515 |

OTHER PUBLICATIONS

Hawkins, William J., "For-your-home video phones", Popular Science, vol. 232, #3, Mar. 1988.

Primary Examiner—Scott A. Rogers
Assistant Examiner—Thomas L. Stoll

[57] ABSTRACT

A fax machine having improved functions. Information is sent in a batch mode. A preferred embodiment of this invention separates the printer and processor so that a single printer can serve multiple fax machines. The fax is sent in a random orientation and this orientation is rotated prior to sending. Security aspects are also handled by storing all pages in memory, taking a picture of an area when faxing and taking a picture of an area based on an alarm mode. A color embodiment is also described which send faxes in color, including handshaking modes for determining whether color should be sent. Another embodiment of the invention straightens the lines of faxes prior to sending. Multiple modes of transmission are described. Finally, a power down mode is described, specially optimized for fax machines and their problems.

4 Claims, 44 Drawing Sheets

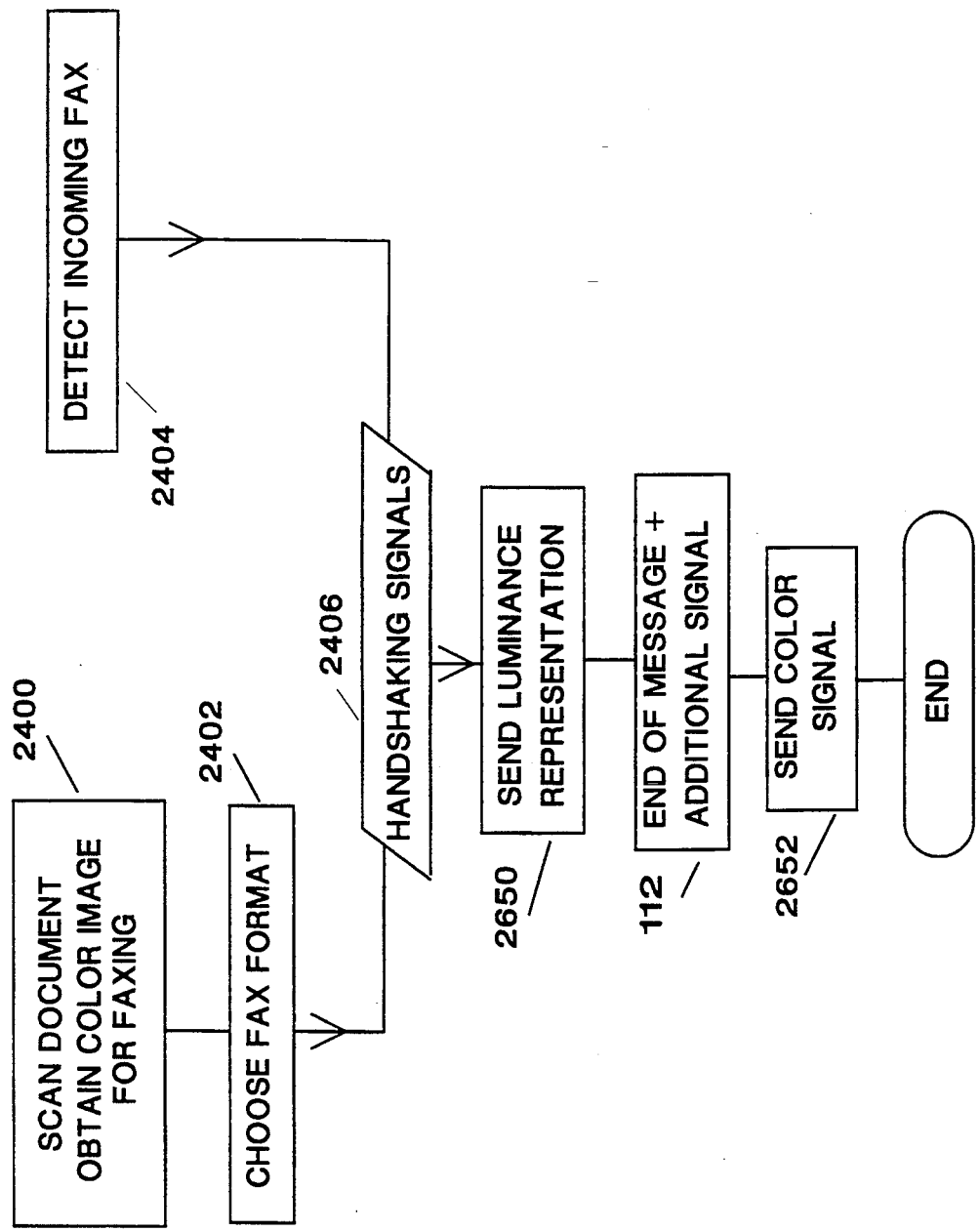

| START | SPACE | X1I+1,Y1I+1 | OCR | F/P | X,Y | AS | CII | OCR | ... |
|---|---|---|---|---|---|---|---|---|---|
| 3100 | 3102 | 3104 | 3106 | 3108 | 3112 | 3114 | 3116 | 3118 | 3120 |

(3100 also labels F/P column position)

| GRX | X,Y | PCX | PG END |
|---|---|---|---|
| 3130 | 3132 | 3134 | 3136 |

FIG 31

| SOUND | X | TIME | PG END |
|---|---|---|---|
| 3200 | 3202 | 3204 | |

FIGURE 32

| PART # | SEG# | START | END | WIDTH | TYPE CODE |
|---|---|---|---|---|---|
| 1 | 1 | X | Y | W | L/C/A/R |

FIGURE 38

FACSIMILE MACHINE APPARATUS

This is a continuation-in-part of Ser. No. 07/346,211, now U.S. Pat. No. 5,339,174 "Facsimile time shifting and converting apparatus", filed May 2, 1989.

BACKGROUND AND SUMMARY OF THE INVENTION

The present invention relates to a device for storing and converting facsimile communications. More specifically, the present invention makes greater use of a facsimile machine, by storing a facsimile communication which is received.

Facsimile machines are devices for communicating image information between a local machine and a remote machine. Since the original advent of facsimile machines, they have become progressively more sophisticated and complicated. One of the problems that the sophistication has caused is the incompatibility between different generations of facsimile machines, which operate in different facsimile formats. The first generation of facsimile machines is now known as Group I, and is almost completely outdated. A second generation of facsimile machines, called Group II, transmits analog information at a relatively slow pace (approximately six minutes per page). The current (1989) state of the art is known as Group III, and transmits information relatively quickly at approximately 1 page per minute. The information transmitted is in compressed digital form, using a relatively simple compression code (Huffman code and others), and is transmitted having different grades of resolution. By decreasing the resolution, the speed of sending can be increased.

Each time a new generation of facsimile machines has been introduced, it makes obsolete the previous generation of facsimile machines. Many Group III machines currently on the market can operate in Group II or Group III modes, and thereby allow communication with either Group II or Group III machines. Group II machines, however, were never designed for use with Group III and cannot be used with the incompatible Group III format. The Group II machines can not receive and decode nor encode the compressed digital signals produced in Group III.

Group IV facsimile machines are a practical certainty within the next few years. The introduction of Group IV will make the Group III machines obsolete, (or at least less desirable) and many facsimile users will buy a new machine just to get the faster speeds of Group IV.

Many of the currently available Group III machines are extremely sophisticated machines. Some machines have the ability, for instance, to print on plain paper. Moreover, the electronics and auto-dial functions of many of these machines are quite advanced and reliable. However, many people will sell or salvage these machines in their zeal to receive the state of the art Group IV machine.

Moreover, most of the cost of a facsimile machine, especially a complex one as described above, is the scanner and printer etc., while the actual communications electronics represent a less significant part of the cost.

Until the advent of the present invention, no satisfactory way was available for converting from a lower group (eg, Group III) to a higher group (eg, Group IV) in a machine that was not designed for this higher group. The faster transmission speed of the higher group has made it impossible to do a real time conversion between the two groups. I have first realized this problem, and have devised a technique to overcome this problem.

While overcoming this problem, I have also realized that invention enables significant advantages in other types of communications besides facsimile communications, and also provides advantages in facsimile communications other than mere conversion between one group and another. For instance, another problem in facsimile communications is in the field of secure facsimile communications. Secure transmissions involve sending encoded data to a remote facsimile machine. This remote machine cannot receive and print the data without the proper decryption key. The decryption key must always be supervised to maintain its security. Therefore, either an operator must be present with the machine at all times, or the machine is essentially useless during off-hours. If the machine receives the encrypted data without the encryption key therein, it will be received as gibberish. Until the advent of the present invention there has been no satisfactory way of dealing with this problem, and therefore secure facsimile transmission could only be sent during hours when it was known that an operator would be present with the decryption key.

The prior art of facsimile machines has also required that each one facsimile machine be provided for each telephone line, and vice versa. It was impossible to allow one facsimile machine to effectively service two telephone lines, as the facsimile machine would be busy whenever one of the lines was in use. The present invention enables one facsimile machine to service two lines or even more telephone lines.

Moreover, the present invention allows the fastest possible group of facsimile communications to be used, even when the site at which the invention is installed (the local) has only a lower group facsimile machine. This allows savings in the telephone bill, by minimizing the amount of telephone connect time. The present invention also enables time-shift-type sending to minimize the telephone bills by making use of off-peak hours to send the transmission. The time difference to most foreign countries, and notably Japan, is at least a few hours. Therefore, it makes sense to send many communications to these countries during the off-peak hours (typically beginning at 11 p.m. at night). However, this is currently not usually done, because an operator would have to be present to send it. Another aspect of the present invention enables it to be used for just such a purpose.

It is therefore an object of the present invention to provide a facsimile time shifting and converting device which performs all of the above-discussed functions. The device of the present invention enables conversion from any one facsimile group to any other facsimile group now known or later devised. Therefore, any facsimile machine now in use will be compatible with any later facsimile formats via use of the present invention.

Another object of the present invention is to produce a device which time-shifts facsimile information that is received to a later time, to enable it to be properly processed at this later time.

Still another object of the present invention is to time shift facsimile sending until a later time to minimize telephone connect charges.

The present invention overcomes all of these problems in a new and unobvious way. Specifically, the present invention recognizes that all of these problems can be overcome by time shifting the facsimile communications. I have recognized that off-the-shelf audio equipment has a dynamic range which is at least as great as the dynamic range of any standard telephone line. Accordingly, I have recognized that such audio recording technology can be most advantageously used to record any signal from a fax machine. Of course, any other sound recording means or data recording means could be used in place of such audio technology. Once the data is stored on an audio medium, it can be processed as slowly as desired, since the constraints of real-time no longer need to be followed. The conversions of the present invention between groups are therefore done without regard to real time. The tape may be slowed to a half or a quarter its normal speed in order for this conversion to be carried out. Alternately, a circuit may determine certain characteristics from the signal and create an entirely new signal "emulating" the desired group in which to transmit.

The present invention includes means for communicating with a remote facsimile machine, that is sending and receiving the necessary handshaking signals to initiate the remote fax machine to send a message. This message is recorded. It is later played to the local fax machine by emulating a call coming into the local machine and playing back the converted signal.

According to the encryption technique of the present invention, data is detected as being non-standard facsimile format, and is stored on the audio recording means whenever this non-standard format is detected. Alternately, all incoming faxes could be stored to allow playback of any that are later determined after printing to be encoded. Any storage on the storing means initiates an indicator indicating that a reception has been obtained. Upon the user returning with the proper decryption key, the user initiates the storage means to play back the stored information. The stored information is then coupled to the facsimile machine with the decryption key in place, and the facsimile machine recognizes and decrypts the data being played back as though it were the original transmission from the secure facsimile machine. The device of the present invention provides the necessary handshaking signals followed by a playback of the facsimile transmission.

The device of the present invention enables a time-shifting mode in which the telephone number of the receiving facsimile is entered along with a command to wait until a certain time to transmit it. The present invention then stores the facsimile transmission to be sent, on a sound recording means, along with the proper data. At the proper time, the machine of the present invention begins dialing the proper telephone numbers, creates the handshaking signals necessary to communicate with the remote facsimile machine, and finally the recorded information.

The inventor of the present invention discovered another problem in the art resulting from the way in which a fax is usually scanned for transmission. Usually a rectangular sheet of paper is of A4 size or 8½×11 size. There is a shorter edge (e.g., 8½") that is parallel with the lines of print on the page (in portrait mode), and a longer edge (e g., 11"). These rectangular sheets are scanned via a feeder with the shorter edge of the paper sheet facing the machine. The sheet of paper is scanned along a short axis of the page that is parallel to the short edge such that scanning lines are parallel to the short axis. The scanner typically uses an entire line of scanning elements. Lines of text on the page are scanned in parallel with the lines by either moving the document compared with the scanner or moving the scanner relative to the document.

In some machines, the document is moved relative to the scanner. If the document is inserted in a slightly crooked direction relative to the scanning axis, the scan will be blurred or skewed due to the incorrect scanning angle. In those machines where the document is held stationary, the scan can nonetheless be skewed if its location is less-than-perfectly straight relative to the scanner. Therefore, the scanning quality is dependent on the positioning of the document.

Prior art facsimile machines have used various mechanical structures to maintain the desired orientation. None of these have proved completely satisfactory. Moreover, straightening a crooked document during the scan can actually smear the scanning.

This problem is solved herein by a scanner whereby the paper can be at any desired orientation relative to the scanner. The information is scanned from the randomly-oriented paper and stored as a video image. The image is processed to rotate the image to a proper orientation before sending.

According to this aspect of the invention, the scanner is preferably made longer than usual, so that any orientation of the paper can still be properly scanned.

According to an alternate aspect of the invention, the papers are scanned in the opposite direction to that in which they are normally scanned for fax transmission, with the scan lines parallel to the long axis. For example, an 8½×11 sheet will be scanned in parallel with its 11 inch side. This requires a longer scanner, but enables faster scans. The image may be rotated before sending, so that the receiving fax machine receives the image in a normal orientation. This scanning can occur between 25 and 50% faster because of the longer scan.

Another aspect of this invention scans at a diagonal relative to the page, and uses a point of the page, between two edges, to align the page.

Another aspect of the present invention recognizes that a fax machine is conceptually formed of two basic parts: a facsimile processor that processes the information between the document and the telephone line, and a printer. Typically the printer is one of the more important and expensive parts of the facsimile machine. However, stand-alone facsimile machines usually waste most of their printing capability. Plain paper fax machines include laser print capability, but that laser printing can only be used to print the facsimile (and sometimes to make copies).

According to an improved embodiment of the present invention, the fax machine is a faxing and printing system in which multiple fax processors, and/or printer requests, use a single printer. A print spooler may be used within the facsimile machine to multiplex the various print inputs.

Yet another aspect of the present invention is directed to storage and encoding of faxes. Facsimiles are encoded and transmitted using standard run length algorithms such as Huffman code. A fax can be stored using a graphics format such as a so-called PCX, GIF or TIFF format. Computer-based facsimile machines usually store the sent and received information in this way.

However, these techniques are inefficient for fax storage because the storage technique is not intended for the facsimile environment. The present invention discusses many storage schemes that are intended for facsimiles and optimized for use in facsimile machines. These storage techniques use simple algorithms that compress the information because of their optimization for a fax document. All these compression algorithms are based on the recognition that a facsimile document consists of two parts: large contiguous areas of blank space and large contiguous areas of dark space.

According to yet another aspect of this embodiment, the facsimile machine stores its information before sending, and electronically processes this information to produce a better final image. On the receiving end, the image is electronically processed and supplanted to form a better image. On the sending end, similarly, the image is processed in various ways which improve the final image. This processing includes a recognition system that processes the overall image to make it look perfect. It includes text edge linearizing, and other improvements.

Another aspect of the invention is directed to security issues in facsimile machines. Often, a manager may want absolute control over all facsimiles that have been sent or received. This is one way to determine, for example, what the employees are doing or if any unauthorized communications may have been sent or received. According to the preferred machine of the present invention, all faxes, both sent and received, are stored in a non-volatile memory. Of course, only all the sent information may be stored or only all the received information may be stored.

This information is maintained in the memory, which must be nonvolatile and is preferably removable, until requested by the facsimile supervisor, using a password or a key. The fax machine allows the supervisor to either remove the media including the information (which will be in graphics format, or in one of the preferred formats of the present invention, in standard G3 or G4 form, or in some kind of compressed format) or will automatically print out all pages of the stored information.

According to another aspect of the invention, the facsimile machine includes a small camera such as a CCD camera. The CCD camera can be a low resolution, monochrome type camera, with a wide angle lens. According to this aspect of the invention, the machine acquires and stores an image of the person sending the fax as part of a package of information indicating the length of the fax and indicating where the fax was sent. Every fax that is sent has a stored image indicating who sent it.

Another aspect of this embodiment uses the CCD camera on the fax machine as above, along with an external sound pickup device attached to the fax machine, as a surveillance system. According to this aspect of the present invention, any time a noise is detected when in a surveillance mode, the CCD camera is enabled to acquire images at one second intervals. These images are converted to facsimile format and then automatically and silently sent to a specified location.

Answering machines and telephones of the prior art have sometimes had functions which allowed them to become a surveillance device. The area around the answering machine could be eavesdropped upon, after call up. This has a number of drawbacks. First, the answering machine or telephone needs to be called. This causes a ringing tone and alerts everyone to its existence. Second, sound is not enough. If a person stands still, he typically makes no sound. I, for the first time, recognized that since a fax machine sends graphics information, it could send graphic snapshots of the area as a surveillance mechanism. I also recognized that this could be done totally silently and at the direction of the monitoring machine: without the need for a polled call-in. While, of course, a call-in could be used to initiate this information, the preferred mode allows the information to be automatically sent.

When facsimile transmission was first invented, technology was still in a monochrome age. Even now, most printers are monochrome, e.g. black and white. Color printers are becoming more and more prevalent, and most offices use word processors with color screens. In the future it is believed that most printers will print in color.

Facsimile, however, lags behind this trend towards color display. The third embodiment of the present invention enables practical color faxing by disclosing a faxing machine which transmits either monochrome or color documents. This facsimile machine is intended to be used with either a scanner type facsimile system, or with a personal computer type facsimile system. For the personal computer facsimile system, the information is encoded from the color file, and is sent to the receiving facsimile machine in color. For the scanning type facsimile machine, a technique of color sensing using monochrome sensors is preferably used. These systems allow both monochrome and color faxes to be sent.

According to one aspect of this embodiment, the facsimile system "decides" whether it makes any sense to send the document in color once it determines that both the send fax and receiving fax are color capable.

According to another aspect of the present invention, the color information is encoded in a way that the monochrome system will not recognize. Therefore, a color facsimile can be sent to a monochrome machine which will ignore the color information and print only a monochrome facsimile.

The first embodiment of this invention embodied my realization that fax information which is in any case sent over a telephone line and therefore sound-based, could be stored on an audio recording medium of any type. The following embodiments require video processing capabilities, and therefore the information to be transmitted must be manipulated as a video image. Unfortunately, current techniques for storing video images, while suited for storing generalized video, are very inefficient at storage of facsimile information.

One common graphics format in which facsimile information is commonly stored is the so-called "PCX" format. This stores the facsimile as straight graphics information. An incredible amount of redundancy is present in this stored information and software compression can compress these files by 50-80%. Various compressed forms of graphics information have also been used. All these forms of information must be decompressed prior to sending.

Another storage format is shown in U.S. Pat. No. 4,491,873 which is herewith incorporated by references.

The present embodiment discloses a number of different facsimile storage formats, all of which are optimized for storing facsimile information. The storage formats are by their nature, compressed. No decompression is necessary on read-back.

Throughout this specification, the terms "facsimile" and "fax" are used interchangeably.

BRIEF DESCRIPTION OF THE DRAWINGS

These and other aspects of the present invention will now be described in detail with reference to the accompanying drawings, wherein

FIG. 24A shows a flowchart of a second modification, in which luminance and chrominance components are separately sent;

FIG. 31 shows a preferred data structure according to the FIG. 30 embodiment;

FIG. 32 shows a modification of the FIG. 31 structure to add sound;

FIG. 38 shows a representative message used according to the FIG. 37 embodiment;

DESCRIPTION OF THE PREFERRED EXEMPLARY EMBODIMENTS

This specification assumes a working familiarity with facsimile machines, including the specific techniques used by existing facsimile machines to communicate with one another. Of course, throughout the specification, all flowcharts can be carried out by a suitably-programmed microprocessor or alternately by discrete logic gates properly connected to carry out these functions.

Figure 1:
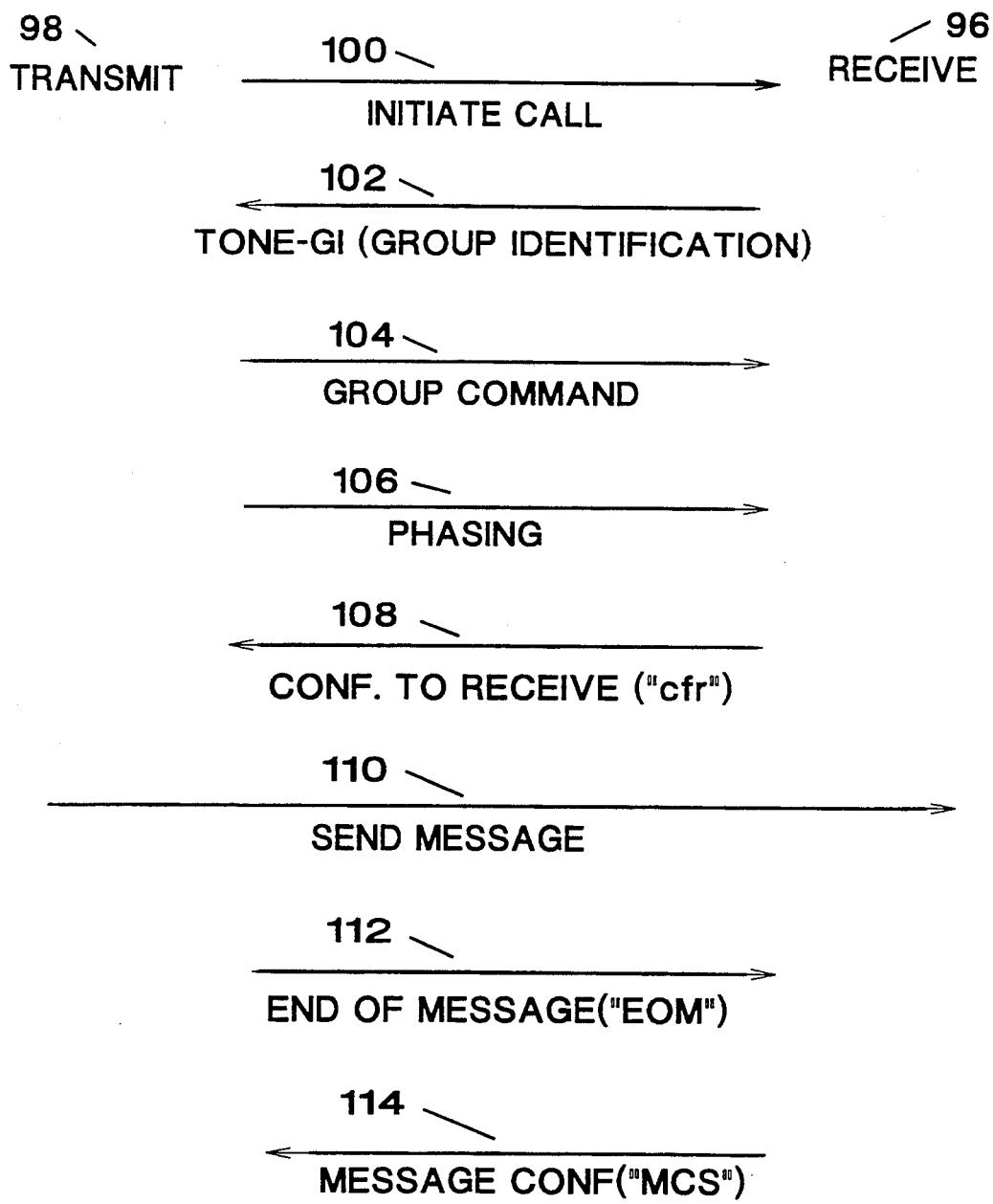
FIG. 1 shows a summary diagram of facsimile communication including the substantive communication and the handshaking signals.

However, as a brief background, the appropriate handshaking signals between facsimile machines in order to make a substantive communication will be described in a summary form with reference to FIG. 1. This information can be found in CCITT (International Telegraph and Telephone Consultive Committee) recommendation T.30.

Step 100 designates the transmitting facsimile machine or fax 98 initiating the call to the receiving facsimile 96. This causes an electronic path to be made through the telephone network, and the receive facsimile 96 eventually receives a ring tone from the telephone network. The receive facsimile responds in step 102 with a receive tone, which includes a group identification signal (GI). The group identification signal has a spectral content which depends on the capabilities of the receive facsimile machine. For instance, this tone or group of tones will indicate whether the receive facsimile 96 can accommodate Group II, III, IV or combinations of the above. The GI signal is sent to transmit facsimile 98 until such time as it is acknowledged. At step 104, the transmit facsimile 98 sends a group command signal to the receive facsimile 96. The group command signal uses different frequencies than the group identification signal, and selects one of the available groups indicated by the group identification signal. The group command signal is then followed by phasing information at step 106.

The receiver responds at step 108 with a confirmation to receive (CFR) signal. This confirmation to receive signal indicates that the phasing and command information is received properly, and comprises a burst of information indicative of the group to be received. Assuming that this all done properly, the transmitter will immediately begin to send the substantive communication at step 110.

At the end of the message, the transmitter sends an end of message (EOM) signal at step 112. The receive facsimile 96 responds to the end of message signal 112 with a message confirmation signal (MCS) at step 114. This MCS signal 114 is identical to the CFR signal at step 108 indicating the substantive communication has been received.

All of the above signals except for the substantive communication (that is, signals 100, 102, 104, 106, 108, 112, and 114) will be described throughout this specification and claims as handshaking signals.

Many different aspects of this sequence are possible, and some modifications in this sequence may be expected. However, this is the basic system used by today's facsimile machines, and the system with respect to which the present invention will be described.

It should be understood that all of these special format codes, described throughout the specification, will involve a modification of the facsimile handshaking signals to determine if both facsimile machines have the capability of these modified format commands.

Figure 2:
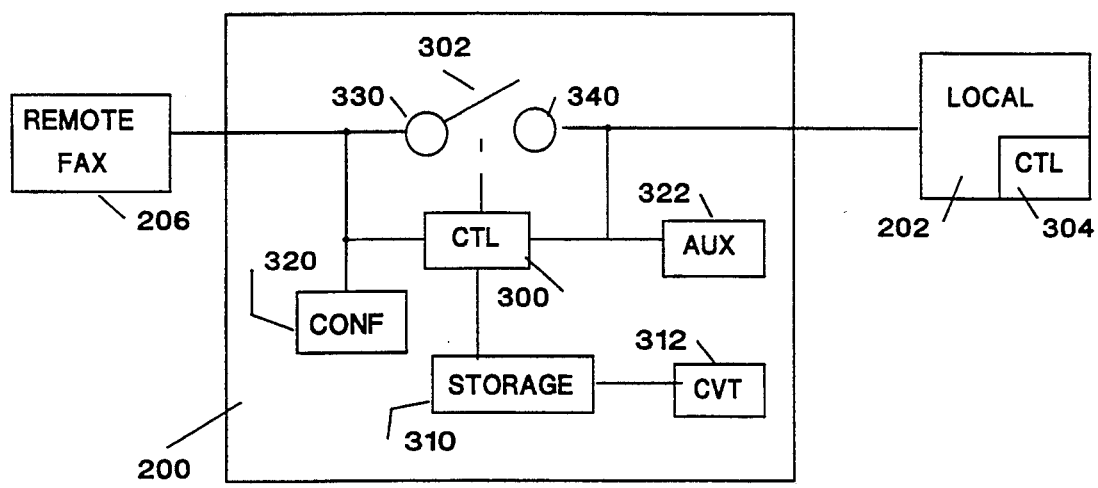
FIG. 2 shows a first embodiment of the invention.

FIG. 2 shows a first embodiment of the first embodiment of the facsimile interface 200 of the present invention in basic block diagram form. The telephone trunk 204 is shown coming from remote fax 206 and connected to facsimile interface 200 where it is input in parallel to a first contact 330 of a normally open switch 302 and to controller 300. The other end of switch 302 is connected to local fax 202, where it is input to the internal controller 304 of local fax 202. No special operations need be taken in the controller 304 of local fax 202. However, this is shown because communications will be carried out with this local controller 304 to emulate normal operation.

The FIG. 2 embodiment operates by using the controller 300 of the facsimile interface 200 in place of the controller 304 of local fax 202 to communicate with remote fax 204. Controller 300 provides the necessary handshaking responses, and also provides signals to local fax 202 to allow local fax 202 to operate properly in certain modes.

Associated with controller 300 is a storage circuit 310, and a converting circuit 312. I have recognized that off-the-shelf audio equipment has a dynamic range which is at least as great as the dynamic range of any standard telephone line. Accordingly, I have recognized that such audio recording technology can be most advantageously used to record any signal from a fax machine, and therefore the storage circuit 310 is preferably an audio recorder. Of course, any other sound recording means or data recording means could be used in place of such audio technology. Once the data is stored on an audio medium, it can be processed as slowly as desired, since the constraints of real-time no longer need to be followed.

Additional structure associated with the facsimile interface 200 is also shown as auxiliary circuitry 320 and will be in discussed in detail with reference to further FIGURES.

The first embodiment of the invention operates by having the controller 300 perform the functions that are usually performed by controller 304 of local fax 202. The operation of this embodiment will now be described with reference to the flow chart of FIG. 3.

A call is detected at step 400, by controller 300. (Note that switch 302 is open at this time). This call detect corresponds to step 100 in FIG. 1. Since switch 302 is open, this call is not detected by controller 304 of local 202. Upon detecting this call, controller 300 sends two signals at step 402. Controller 300 sends a call initiate to the local 202, which the local 202 recognizes as an incoming call. In this way controller 300 emulates a call coming in to local 202 whenever it receives an incoming call. Local 202 respects with which a its group identification (GI) signal which is sent to the open switch, and therefore not further conducted. Controller 300 also sends its own group identification signal to the remote on telephone trunk 204.

Local fax 202 receives the call initiate, and responds with its own group identification signal. However, this group identification signal will indicate less groups than can be handled by the present invention. The controller 300 sends a group identification signal which includes all of the available groups.

The embodiment of this invention will be described as though local 202 is a Group II/III facsimile machine, and facsimile interface 200 is configured to accept Groups II/III/IV. Therefore, the group identification signal sent by local 202 to facsimile interface 200 will be a group identification signal for Group III being the highest group. However, facsimile interface will ignore this group identification signal, and will send a group identification signal indicating Group IV as the highest group to remote facsimile 206.

The remote facsimile 206 responds by sending a group command (step 104) which is received by facsimile interface 200 at step 404. At step 406, a decision is made as to whether the group that is commanded is a higher group than the group which local fax 202 can handle. In the example used in this preferred embodiment, the decision determines whether Group IV has been commanded. If the result of the decision at step 406 is negative, and the group is not greater than the local can handle, the facsimile interface 200 is not necessary as a converter for this particular communication. Therefore, it sends a group command to the local 202 at step 408, this group command corresponding to the group command received from the remote (step 104). Switch 302 is then closed at step 410 enabling the communications from the remote facsimile to be passed through directly to the local facsimile 202. According to this the incoming communication is of a group which is compatible with the existing local facsimile 202, and therefore the communication is passed directly through to local facsimile machine 202, and communications carries on with the existing facsimile 202 without the facsimile interface 200, from this point on. Facsimile interface 200 does detect when the message is over at step 412, and opens the switch 302 at step 414 so that the next communication can begin as above.

If the result at step 406 is positive, and the group commanded is greater than the group which can be handled by local 202, control passes to step 420.

Step 420 starts recording the information on storage unit 310 and sends the CFR signal to the remote fax 206. When remote fax 206 receives the CFR signal, it sends the message (step 110) which is then recorded on storage medium 310. Step 422 continually monitors for the end of message (EOM) signal. When the end of message signal is received, the recording is stopped and the message confirmation signal is sent to the remote at step 424. This ends the message receive phase.

A modification of FIG. 2 is possible in which the switch 302 is normally closed. In this case, the flow chart of FIG. 4 is used in place of the FIG. 3 flow chart. The call is detected at step 450 the same as in FIG. 3. However, the call initiate to the local is never sent, because the local simultaneously receives the call. A supplemental GI signal is sent at step 452, which mixes with the GI signal sent by the local. This supplemental GI signal, in this embodiment, is the signal for Group IV, which is sent along with the signal from Group III that is sent from the local. The group command is received at step 454, and step 456 determines if this group command commands a group greater than the capacity of the local similar to step 406. If the command is greater than the local, switch 302 is opened at step 458 followed by an execution of the same steps as are executed in FIG. 4 in step 420 to the end. If the group is not greater than local capacity, a return is executed at step 460, allowing the local fax machine 202 to communicate normally.

Figure 3:
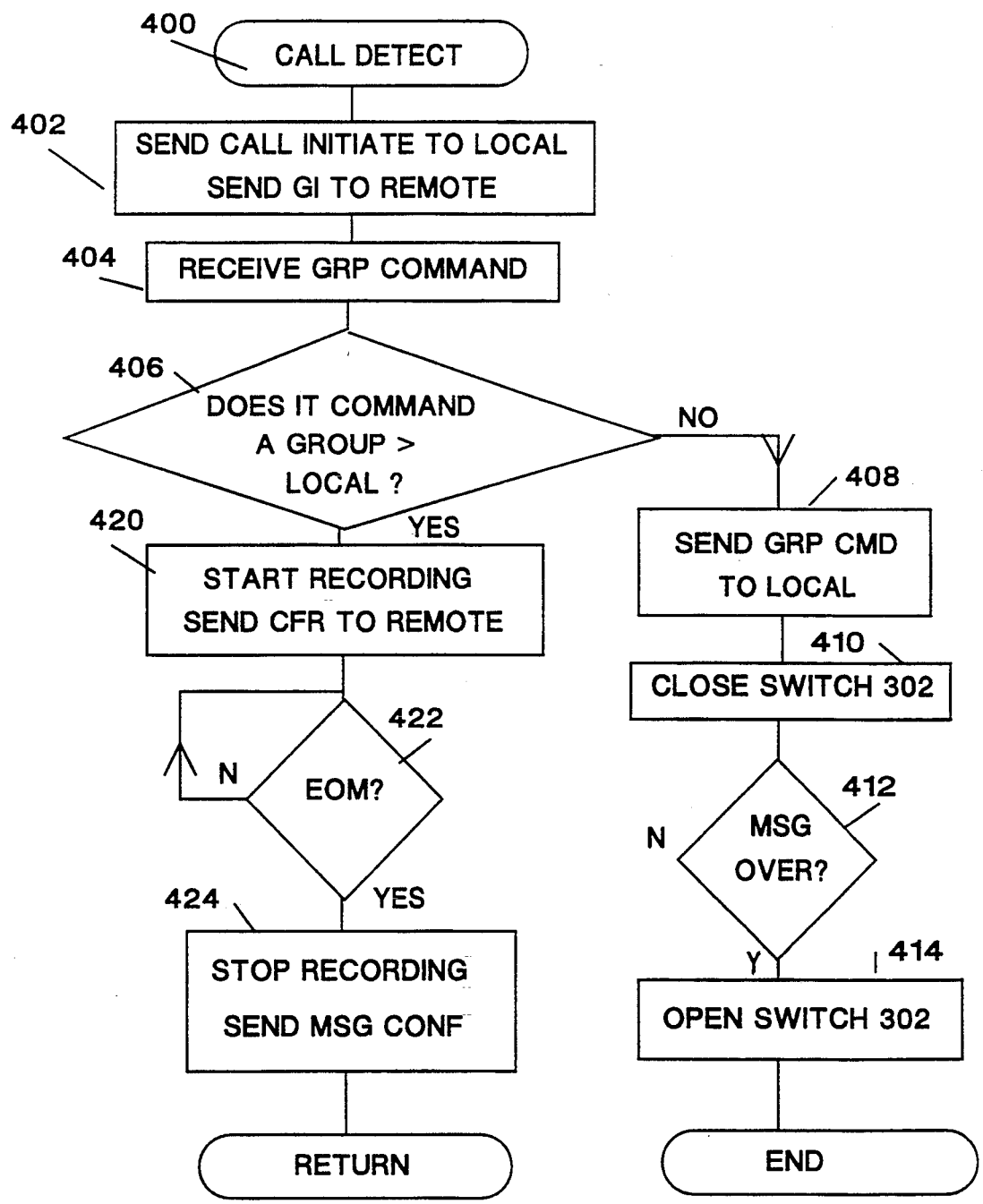
FIG. 3 shows a flowchart of operation of this first embodiment.
Figure 4:
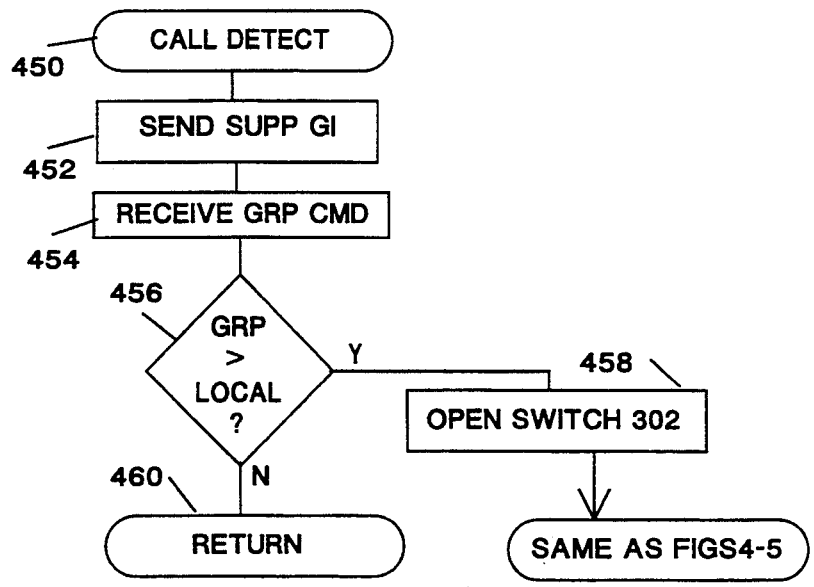
FIG. 4 shows a flowchart of operation of an alternate embodiment.
Figure 5:
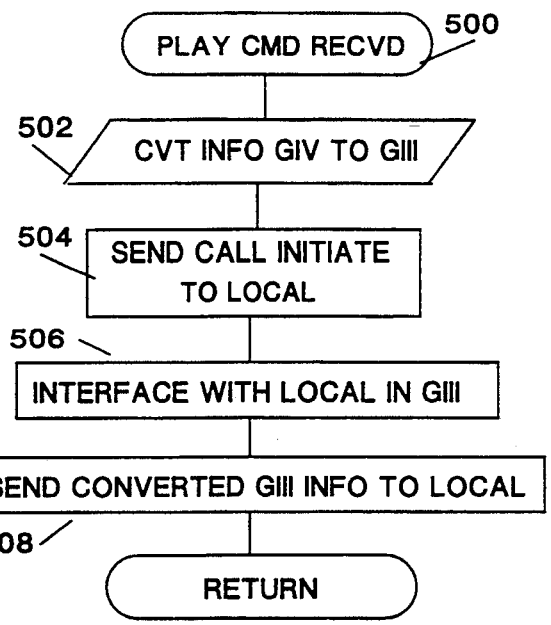
FIG. 5 shows a flowchart of operation of the playback sequence.

FIGS. 3 AND 4 illustrate the first and second embodiments, respectively, of the receive sequence. FIG. 5 illustrates a flow chart used in the playback sequence of this embodiment.

FIG. 5 starts at step 500 when a playback command is received. Control then passes to step 502 where the information is converted from Group IV to Group III. This will be discussed in more detail with reference to FIGS. 6 and 7. After or during the conversion process, a call initiate signal is sent to the local fax 202. This call initiate signal is the same as the signal sent in step 402 of FIG. 3. This is followed at step 506 by sending the necessary handshaking signals to interface with the local in Group III. Finally, step 508 converts the stored Group IV information to Group III, and sends the converted Group III information to the local fax 202. It is again emphasized that although the example given involves communication between Group IV and Group III machines, this is by no means limiting.

Figure 6:
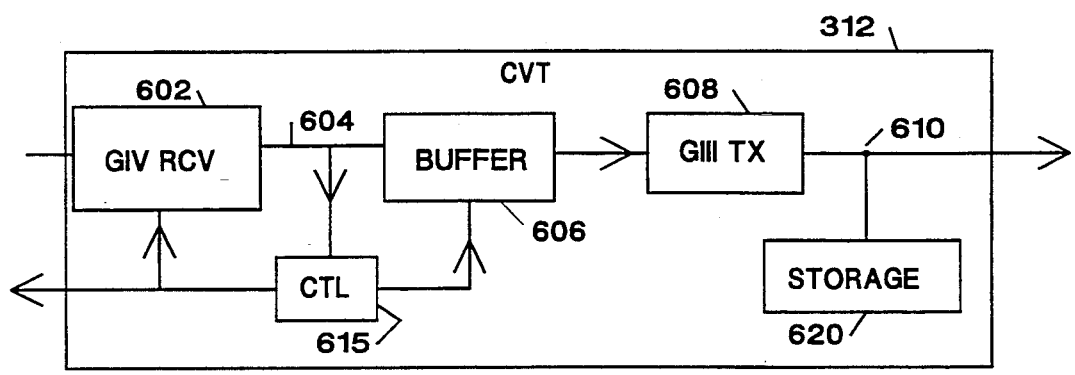
FIG. 6 shows a representative conversion apparatus.

FIG. 6 shows a representative circuit for converting between Group IV and Group III. The representative technique of FIG. 6 is merely exemplary, it being understood that there may be simpler ways to convert between Group IV and Group III than those shown by FIG. 6. However, this provides one way in which those of ordinary skill in the art could make this conversion, it being understood that many other ways are possible.

Convert module 312 (from interface 200) is shown in FIG. 6 as having signals input to a Group IV receive module 602. This Group IV receive module would be a similar module to that which is normally used by Group IV facsimile machines, which receives the facsimile coded information, and produces an output signal which would normally be sent to the facsimile printing apparatus. This output signal 604 is then appropriately buffered by buffer 606, and sent to a Group III transmitting module 608. This Group III transmitting module would be the module that is normally used by a Group III fax machine, to convert the electrical signals produced by the scanner into signals to be sent on the telephone trunk line. These signals, shown as signals 610, are then output from the convert module 312 of FIG. 6.

The system is shown as being controlled by a controller 615 which may be controller 300, a separate microprocessor, or may be dedicated logic. The controller 615 operates according to the flow chart of FIG. 7.

Figure 7:
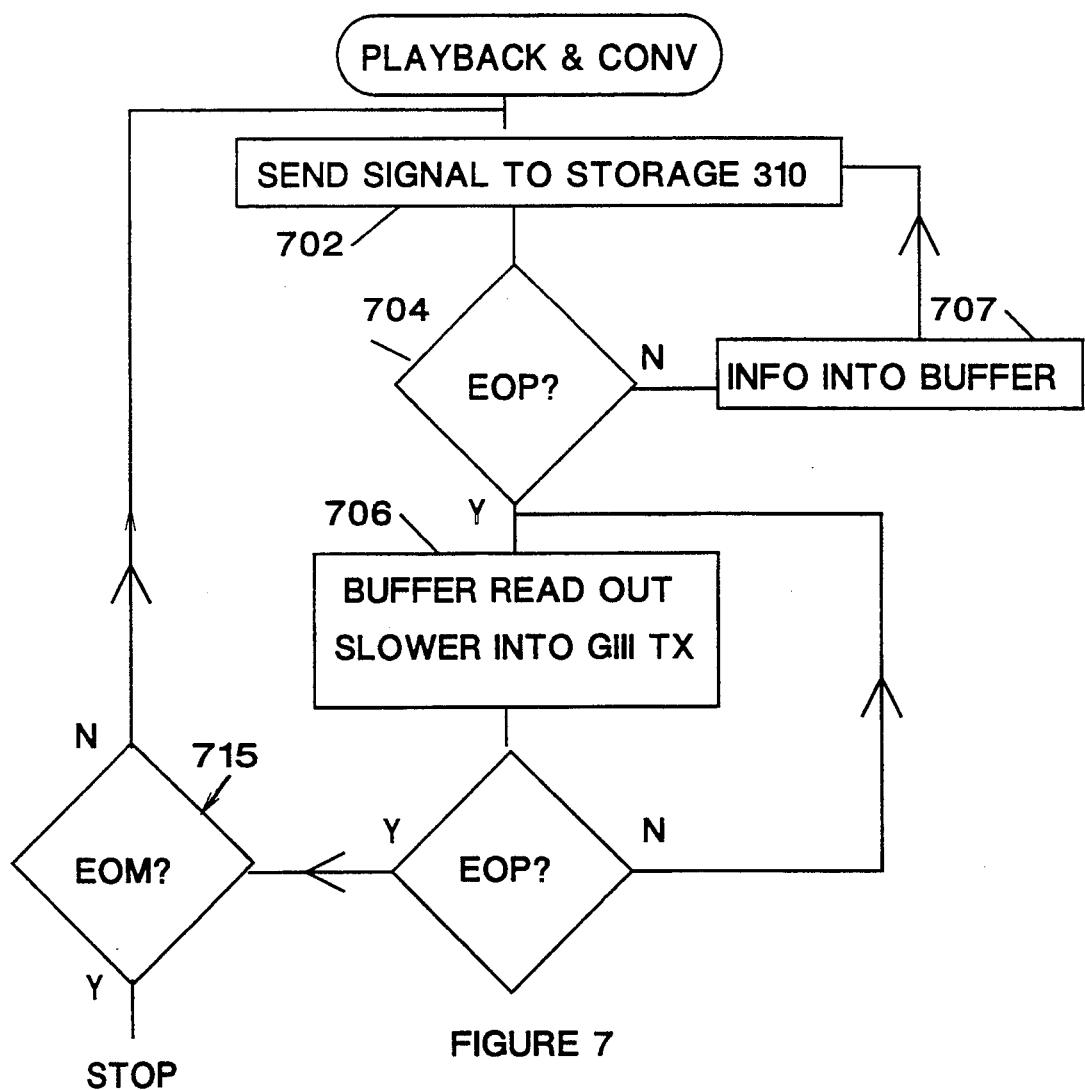
FIG. 7 shows a flowchart of operation of this conversion apparatus.

FIG. 7 shows the convert operation and therefore elaborates step 502 of FIG. 5. The controller 610 starts the convert mode by sending a send signal to storage medium 310, enabling the Group III transmitter 608 to send. Controller 610 also monitors the output of Group IV receiver 604 for an end of page marker at step 704. The information from Group IV receiver 602 is coupled into buffer 706 at step 704, which in this embodiment can be a FIFO shift register, a bucket-brigade type register or an audio tape, having a capability of storing the entire information for one page. The information is continually input into buffer 606 until the end of page marker is detected at step 704. At this time, the contents of buffer 606 are is read out into the Group III transmitter 608, at a slower speed, at step 706. The Group III transmitter appropriately formats the buffered information, and sends it on line 610. When the end of page signal is received, control then passes to step 702 which again sends the send signal to the storage unit 310 to begin reading another page. The end of message signal detected at step 715 will terminate this routine at the proper place.

According to this embodiment, the Group IV signals are received, converted to print-quality signals, buffered, converted to Group III transmit signals, and then transmitted. Some of the appropriate characteristics of Group IV signals can be found in "Measurement of Data Compression in Advanced Group 4 Facsimile Systems" by Bodson et al; Proceedings of the IEEE, vol 73, no 4, April 1985. However, many modifications are possible. The Group III signals produced as signals 610 may be themselves stored in a second storage device 620. Alternately the Group III transmitter may be continually transmitting, and the Group IV receiver and recording medium may be enabled to begin their operation before the end of page so that the Group III transmitter is never empty. For instance, the controller 615 may detect when the buffer 606 is 80 percent empty, and may send the send signal at that time. The playback from storage unit 310 may be at slower than normal speed so that the conversion can be accomplished without interrupting the playback. Other modifications are also possible. However, the simplified system of FIG. 6–7 may be used without concern for speed differences. This is because the Group III system is so much slower than the Group IV system that the time delay to read in the Group IV and begin conversion will be an acceptable time delay from Group III point of view.

Figure 8:
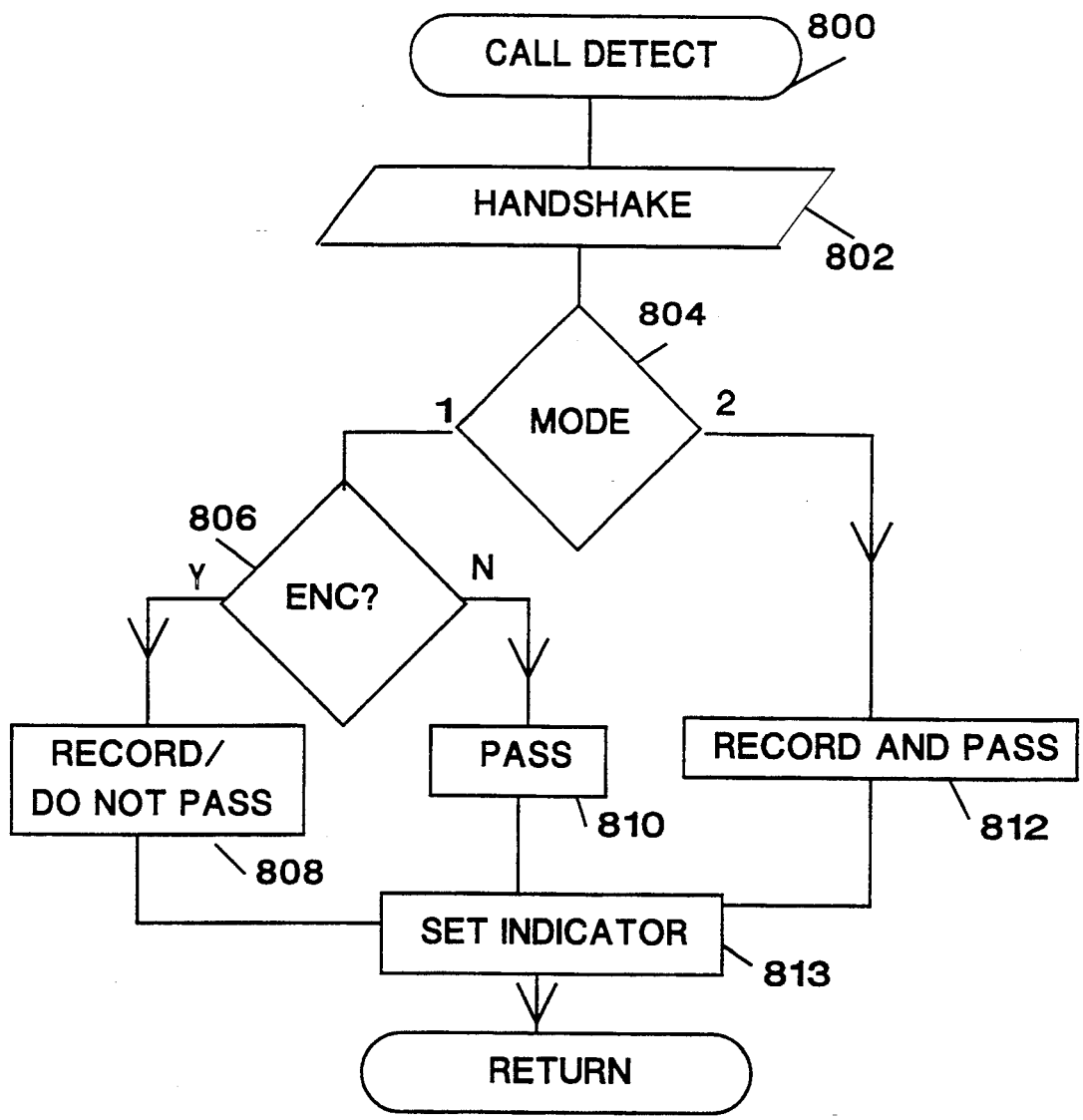
FIG. 8 shows a flowchart of operation of the encryption embodiment of the invention.

Another modification of the present invention enables the invention to be used in a time-shifting mode to decrypt encoded facsimile communications. The facsimile interface 200 of FIG. 2 is used in this mode, but used according to a slightly different flow chart. The specific flow chart is shown in FIG. 8, and will be explained herein. The first embodiment of this invention is intended for converting between one format (group) of facsimile communications and another. This second embodiment is not intended to convert information, per se, at all. Rather, this embodiment either determines when the information cannot be used in its present form and stores this unusable information, or always stores incoming information. This information is intended to be stored when the facsimile machine is being operated unattended such as during hours other than normal working hours. Accordingly, most of the operation of FIG. 8 is similar to the operation of FIG. 3. Moreover, the FIG. 8 flow chart can be used in conjunction with FIG. 3, so that encoded information may be received in Group IV format and converted to Group III before the playback.

FIG. 8 shows a call being detected at step 800, followed by handshaking signals being exchanged at step 802. These handshaking signals may be similar to those exchanged throughout FIG. 3. A mode determination is made in step 804. This mode determination indicates which of the different decryption modes of the facsimile interface is selected. Mode 1 requires the device to make a determination of whether the incoming communication is encrypted or not. This determination is made at step 806, and may be done in any conventional way. If the information is encrypted, the information is recorded at step 808, and no information or handshaking signals are passed to the facsimile machine. The ways in which this can be accomplished is described for instance in steps 420-424 of FIG. 3. If the information is detected as not having been encoded at step 806, control passes to step 810 wherein the information is passed to the local facsimile machine 202, such as shown in steps 408-414 of FIG. 3.

Mode 2 does not require any determination of whether the information is encoded or not. Mode 2 only uses step 812, in which the information is recorded and passed to the facsimile machine at the same time. Therefore, the local facsimile machine 202 will print all incoming communications in real time. However, it can be later determined that any of these communications are encoded. The encoded communications could later be retrieved from the storage medium, and played back with the decryption key in place.

All of these steps of recording are followed by the indicator set step 812, which indicates that a message has been recorded. This prompts the user to play back the recorded message if necessary.

The playback operation of this system is similar to that shown in FIG. 500 except without step 502. Those of ordinary skill in the art would certainly understand that FIG. 8 could also be incorporated within the flow charts of FIG. 3 and/or 4 so that a combination mode having conversion/decryption could be accomplished.

Figure 9:
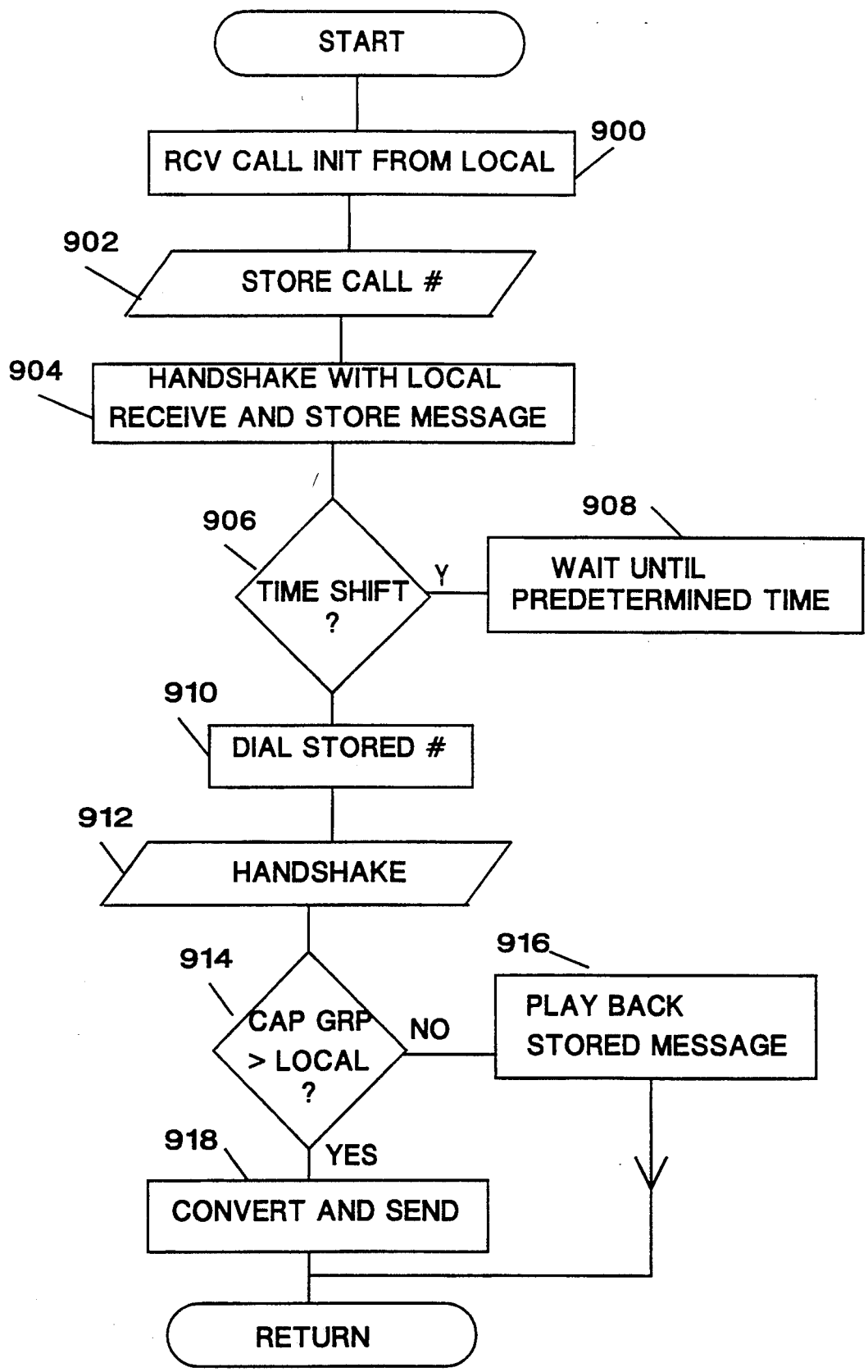
FIG. 9 shows a flowchart of operation of the time shift embodiment of the invention.

All modes until this point have described what happens to incoming facsimile transmissions (incoming to the local 202). FIG. 9 is used with the apparatus of FIG. 2, and appropriately processes and converts transmissions from the local 202 to be compatible with a higher group remote 206. The flow chart of FIG. 9 also shows the time-shifting operation of the present invention.

FIG. 9 starts with a call initiate being received at step 900 from local 202. This call initiate is to a predetermined facsimile telephone exchange. The number being called is stored at step 902. Step 904 shows the facsimile interface 200 appropriately handshaking with the local 202 to cause local 202 to send its facsimile message. The facsimile message is received and stored on storage medium 310.

A test is made at step 906 to determine whether the device is in time-shift mode. The control of time-shift mode will be described later with reference to the make-up of configuration circuit 320. If the device is determined to be in time-shift mode at step 906, step 908 causes the device to wait until the predetermined time to send.

The send operation begins at step 910, where the stored number, stored in step 902 is dialed up. Appropriate handshaking signals are then sent to the remote facsimile 206 at step 912. Among these handshaking signals, it is determined whether the remote facsimile 206 has a group capacity greater than the group capacity of the local 202. If not, the information stored on the tape is already in proper format, and it can merely be played back at step 916. However, if the group capacity is larger than that of the local 202, it is converted to the higher group at step 918 and sent.

Use of the flow chart of FIG. 9 allows savings in telephone connect charges by ensuring that facsimile communications are sent in their most efficient format, and sent at the least expensive time for sending such communications. The telephone connect charges are minimized by ensuring that all facsimile communications are sent in the highest possible group. The time-shift mode can be set to send these communications for instance during off-peak hours. The sending at off-peak hours has the additional advantage that it keeps the facsimile telephone lines open during the peak hours, so that the device can receive communications during these times rather than taking up the devices time with sending communications. Alternately, the time-shift mode can be set to send the communication at 9 am Tokyo time, for example.

The conversion step included in step 918 can use the device and flow chart of FIGS. 6 and 7, operated in reverse. The time-shifting sequence will be discussed in detail later Previous reasons have been given for buying a new facsimile machine, eg that a user may want the top of the line facsimile machine. Another reason would be if the user made so many facsimile transmissions that the machine and/or telephone lines were frequently busy, so that a second machine was warranted. The use of the present invention can decrease the connect time by operating in Group IV mode, and therefore minimizing the amount of time that the telephone line is in use. However, the final embodiment of this invention relates to a device which can make the maximum use of a single facsimile machine. This device enables one facsimile machine to be used along with two (or more) telephone lines, thereby doubling (or more) the effective messages that the one facsimile machine can receive or send. When used in conjunction with the time-shifting apparatus described above, this interface allows a single facsimile machine to have the capacity only obtained from a number of facsimile machines in the prior art.

Figure 10:
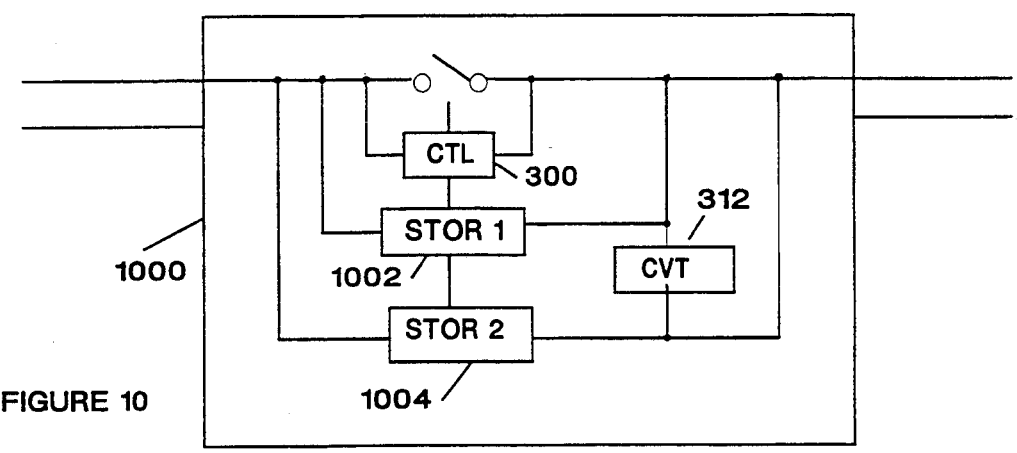
FIG. 10 shows a first embodiment of the two-line operation of the present invention.

FIG. 10 shows a first embodiment of such a device, which is really a modification of the FIG. 2 embodiment. According to the embodiment of FIG. 10, the facsimile interface 1000 includes two storage units in place of the single storage unit 310 of facsimile interface 200; a first storage unit 1002 and a second storage unit 1004. The conversion device 312 is connected to both the first and the second storage units. The controller 300 is substantially the same as the controller used in FIG. 2. This embodiment requires two storage units, capable of operating simultaneously, two receive messages on the appropriate lines. This enables the device to be used to receive an incoming call and store it on one of the storage units, even when the other storage unit is sending its stored contents to its associated local facsimile machine 202 or the other storage unit is also receiving a call The flowchart of operation is substantially the same as that in FIG. 3, except that a detection of an incoming call should be interrupt driven to enable the recording on the second storage medium. A flag should also be set indicating that the facsimile machine is in use, and the flowchart needs to be configured such that the incoming message will always be stored while the facsimile machine is in use.

This device has a limited usage, but by merely adding a second storage unit 1004, enables the facsimile machine to be used with two lines. By adding a third unit, the fax can be used with three lines, and so on with a limit only being circumscribed by practical reality.

Figure 11:
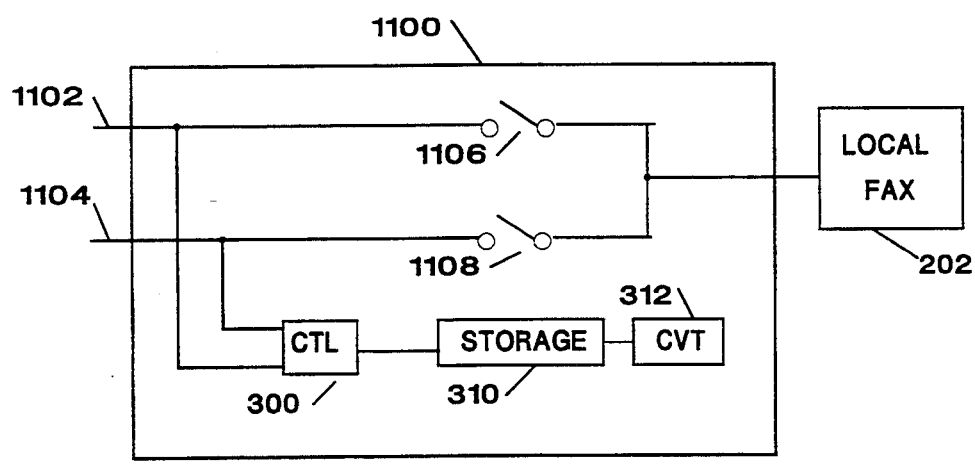
FIG. 11 shows a second embodiment of the two-line operation.

The device of FIG. 11 also allows a single facsimile machine to be used with two telephone lines, using only one storage unit. FIG. 11 shows the single facsimile machine local 202 as being interfaced with two telephone trunk lines through facsimile interface 1100.

Facsimile interface 1100 is shown as receiving two telephone trunk lines, 1102 and 1104. Each trunk line has its associated switch 1106 and 1108. These switches are used in the same way as switch 302 of FIG. 2. Both trunk lines are also connected to controller 300, which has its associated storage 310 and conversion circuit 312. The operation of the system is described with reference to the flowchart of FIG. 12.

Figure 12:
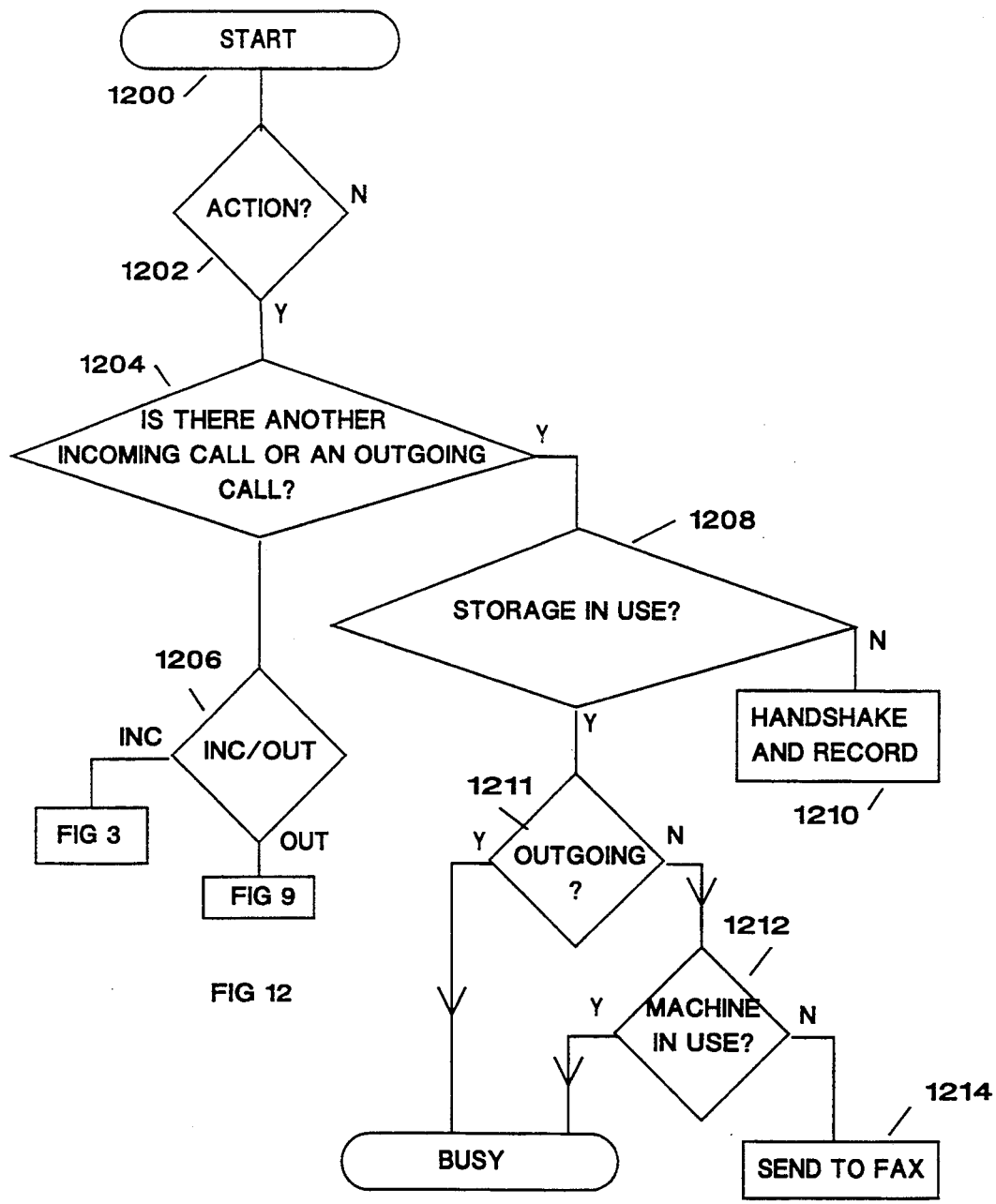
FIG. 12 shows a flowchart of operation of the two-line embodiment of the invention.

FIG. 12 begins at step 1200, and an immediate determination is made at step 1202 as to whether there is any action, which can be an incoming call or an outgoing call. If there is action at step 1202, a determination is made at step 1204 as to whether there is another incoming call or an outgoing call being currently processed by the local fax 202. If there is not, the routine of FIG. 3 is executed for an incoming call, or the routine of FIG. 9 is executed for an outgoing call, based on a decision at step 1240. However, if there is another incoming call or an outgoing call, a determination is made at step 1208 as to whether the storage 310 is in use. If the storage 310 is not in use, the call is simply recorded without any further tests, at step 1210, using the techniques already discussed. If the storage is in use, however, a test is made at step 1212 to determine if the facsimile machine is in use. If the storage 310 is not in use, the incoming call is simply recorded without any tests at step 1210. If the storage is in use, however, a test is made at step 1211 to determine if the request is for outgoing. If so, a busy signal is produced and sent to local fax 202. If the call is incoming (a negative result at step 1211), a further test is made at step 1212 to determine if the local fax is in use. If the local fax 202 is not in use, the incoming message is sent directly to the local fax 202 without conversion. If both the memory and the facsimile are simultaneously in use, a busy signal is sent at step 1216.

The FIG. 11 embodiment can be modified in the same way as the modification to FIG. 10, thus greatly simplifying the flowchart. If two storage units are used (that is storage unit 310 is actually two separate, simultaneously usable storage units) the routine of FIGS. 3 and 9 can simply be used for incoming and outgoing calls respectively.

The embodiment of the present invention operates in a number of different modes, and accordingly it has been required that a configuration circuit 320 be used to choose between the modes. This configuration circuit 320 will now be described with reference to FIG. 13, along with the modes it controls.

Figure 13:
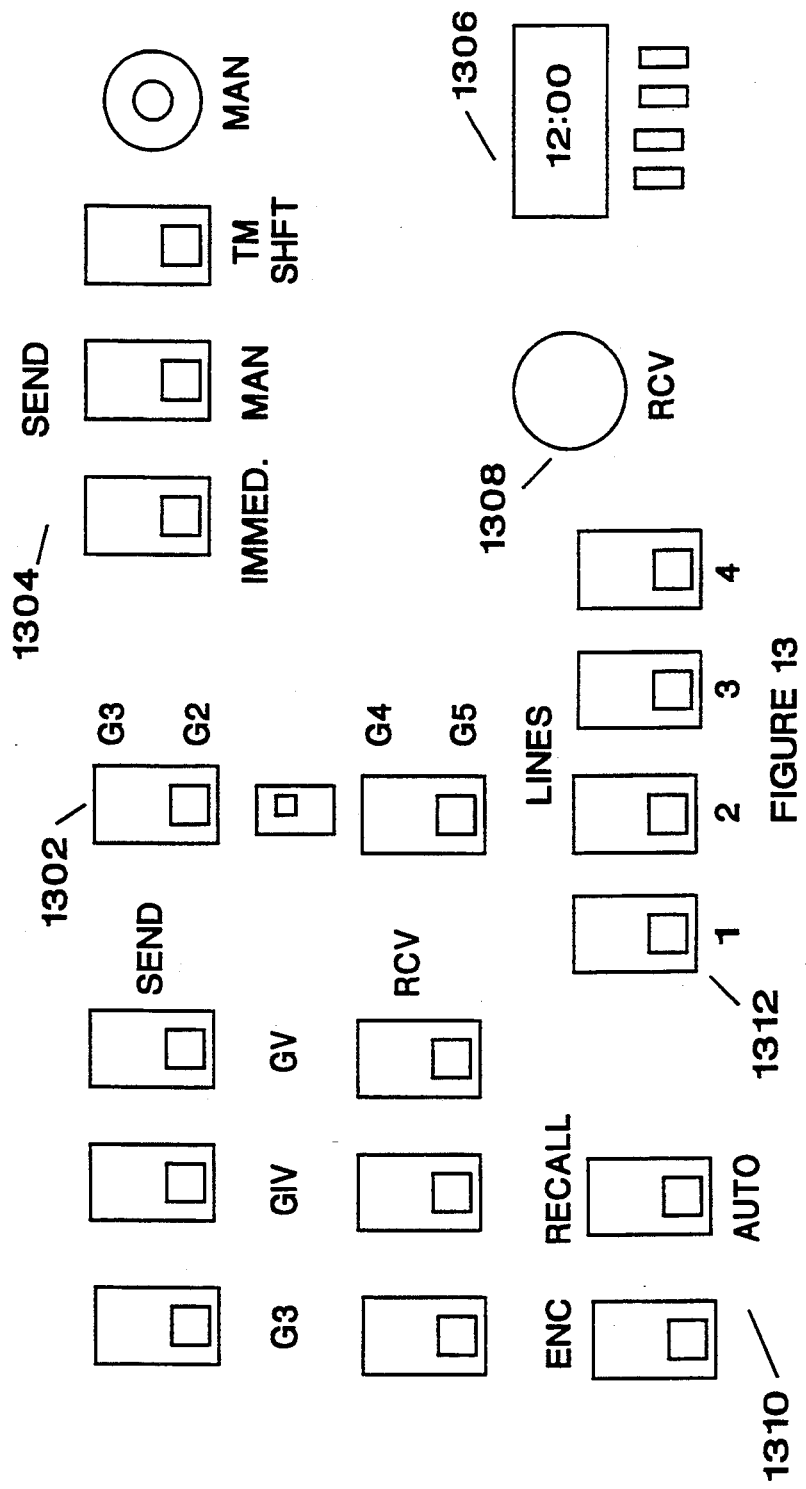
FIG. 13 shows a representative control panel layout.

FIG. 13 shows a controlling panel for the device, reading on configuration circuit 320. A number of controls are provided. Group mode switches 1300 include switches for Group III, Group IV and Group V mode. The sending switches indicate the highest group in which it is desired to send and/or receive. Group configuration switches 1302 are set to indicate the highest group that the local facsimile can accommodate. The settings shown in FIG. 13 indicate send and receive in Group IV and that local fax 202 can only accommodate Group III. The send mode 1304 choose when a received communication which is stored will be sent to the appropriate place. The send immediate switch sends the communications as soon as they are recorded, and as soon as they can be appropriately sent. The send manual mode sends the communications responsive to the manual push button switch. Time-shift mode allows data which is sent to be stored in the memory, and sent at a predetermined time which is also set. A clock with appropriate numbers and settings 1306 is provided. This clock is used to set the time of day, and the time at which time-shift communications should be sent. A receive indicator light 1308 is provided which may light or flash to indicate that a message has been received. This is used in conjunction with the manual switch and manual push button to determine when a manual operation should occur.

The encryption controllers 1310 include the encryption mode on, and the auto recall button, while the number of line switches 1312 enable from one to four incoming lines to be used.

It is necessary that the receive indicator 1308 and the clock information 1306 be placed in an accessible location. However, the remaining controls may be placed under an access hatch or the like, and may be accomplished by dip switches.

Those of ordinary skill in the art will certainly understand that many modifications are possible in the preferred embodiments without materially departing from the teachings thereof. For instance, any one of these embodiments could be used separately or in conjunction with any others of the embodiments. The storage unit described could be an audio tape, or could be solid state memory storage or any other type of known storage. The converting apparatus has been described as merely exemplary, it being understood that there are many other ways of converting from one group of facsimile machines to another group, in a more elegant manner. Similarly, the technique of selectively interrupting communications between the remote and the local is merely exemplary. Many other equivalent ways would be known by those of ordinary skill in the art to accomplish all of these functions.

Figure 14:
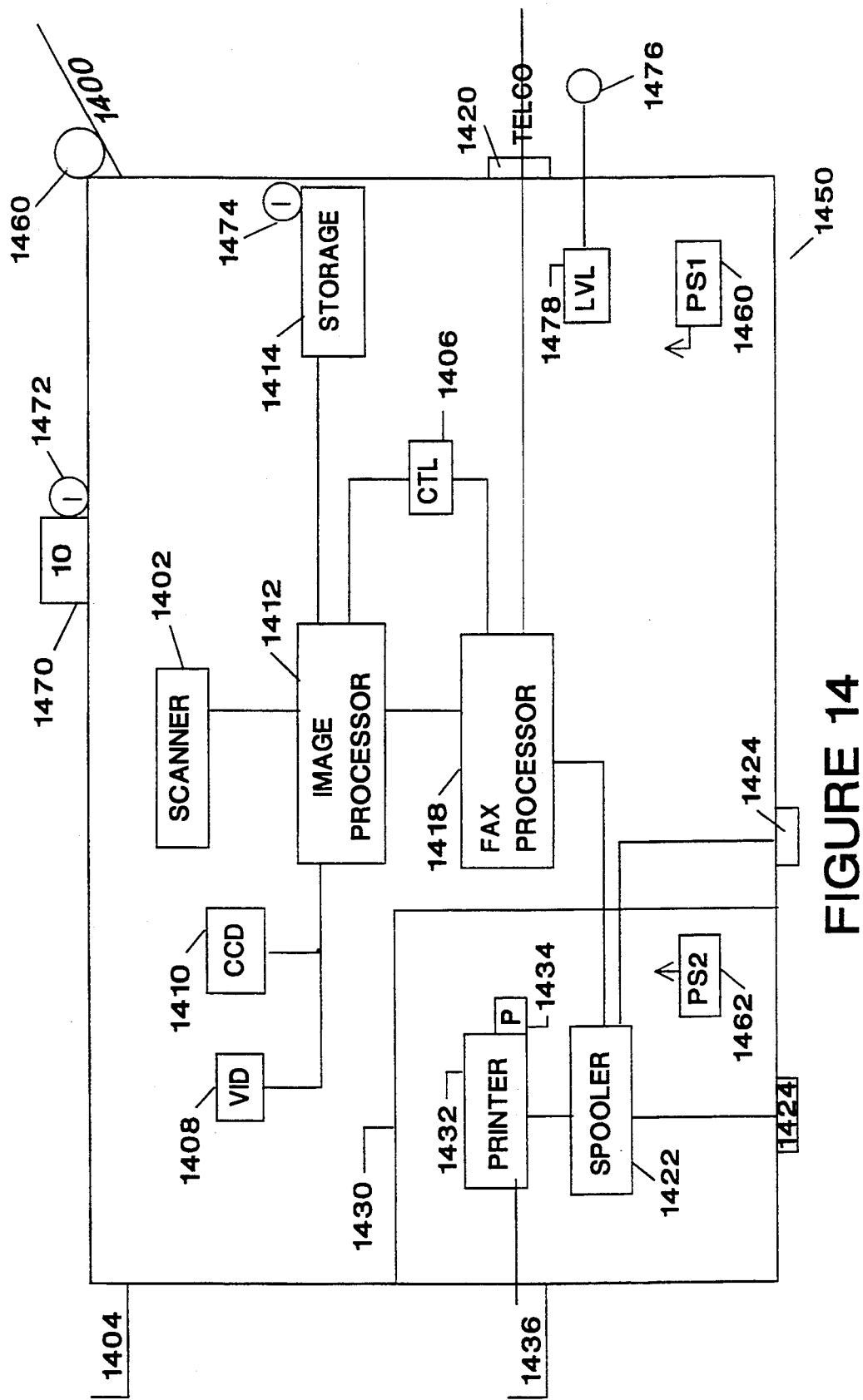
FIG. 14 shows a block diagram of a second embodiment of the invention which uses an image processor to carry out various functions of its operation.

FIG. 14 shows the preferred facsimile machine used according to the second embodiment of the present invention. Paper holder 1400 is a document feeder that feeds the original documents over image scanner 1402 and to exhaust tray 1404. The paper holder also has a sheet scanning table that receives a sheet which is to be scanned. The scanner and paper holder may be embodied using parts from a Hewlett-Packard Scan-Jet(TM) II. Most scanners have a line of separate scan elements. More generally, the scanner has a line of scanning along which the scanning occurs. A ten-key control panel 1470 is used for entering commands to control the operation of the facsimile machine; such as the destination number to be called and various other information which will be discussed herein. Optionally, a small video screen 1408 is placed in a location so that the user can view the facsimile information. Preferably, the system also includes a inexpensive monochrome type CCD camera 1410 with a wide angle lens, which takes a video snapshot of the area surrounding the facsimile machine at selected times.

The outputs of the scanner 1402 and the CCD camera 1410 are coupled to an image processor 1412 which receives the images therefrom, and stores them in a storage element 1414. The storage element 1414 can be an audio medium such as discussed with reference to the first embodiment, a computer-based storage element such as a floppy disk or a Bernoulli (TM) or Sysquest (TM) disk, or any kind of memory. The preferred mode of this second embodiment uses both high speed random access memory (RAM) as well as a removable disk drive, as embodying the memory 1414. The information can be stored in any known fax or video storage format, or in the special format discussed herein with respect to the preferred embodiment.

Throughout this specification, the discussion assumes that the reader is familiar with conversions between images on a medium such as paper, and video information; and conversions between video information and fax information. Software package which effect this conversion can be purchased off-the-shelf, in the form of various software packages, including but not limited to WINFAX, DOSFAX, MTEZ, Smart Fax, Faxcom, and many other image processing software packages which are conventionally available. Therefore, one of ordinary skill in the art could either use any of these software packages or modify them as appropriate. It is therefore assumed throughout this specification that a person having ordinary skill in the art is familiar with how to convert from paper image or electrical image to video image or stored image and then to a fax format.

The output of the image processor 1412 is a standard image in image format, which is sent to fax processor 1418. The fax processor 1418 is found in conventional fax machines and is the same as that described with reference to the first embodiment. This includes the control electronics which sends the handshaking signals, determines the proper group of communication based on the handshaking signals, dials the number and the like. Such devices are relatively inexpensive. They can be found on many computer-based facsimile boards such as those made by Zoom Telephonics (TM) or Hayes (TM). Chip sets for carrying out these functions are also available from Rockwell Semiconductor. The fax processor assembles the scan information into a facsimile transmission, or in the receive case, assembles the image information from the incoming fax.

Fax processor 1418 controls the various handshaking signals of the facsimile operation as well as receiving the received faxes from telephone line 1420.

The output of fax processor 1418 is connected to a print spooler 1422 which can be any commercially-available print spooler of any usual type. The print spooler receives one input from the fax processor 1418 and receives another input from a 25-pin parallel connector 1424 of the type typically used on personal computers.

The printing portion 1430 conceptually includes a printer 1432 and a paper supply 1434. The paper, once printed, is exhausted into an output tray 1436.

FIG. 14 shows a preferred fax machine used according to these embodiments of the invention. The facsimile machine includes an internal printing portion 1430. Other faxes or other information to be printed, can be input through connector 1404. However, according to an alternate aspect of the invention shown in FIG. 15, the facsimile machine is divided into two separated parts, a facsimile controlling part 1450 which includes all of the elements including the scanner 1402, the image processor 1412, the fax processor 1418 and the CCD camera 1410, and a totally separated printing part 1430 which includes a print spooler 1422 and a printer 1432, preferably a high speed printer such a laser printer. The output of the facsimile control device 1452 is a print signal, which is a signal in a printable form. It is output in parallel form, on a 25-pin parallel connector similar to the type typically used on personal computers. The spooler 1422 is shown with a number of other inputs and it is intended that this spooler receive multiple inputs both from personal computers and from other facsimile machines.

The main advantage of this architecture is that the facsimile processing is carried out by a machine which does not need to have its own dedicated printer. The printing is done by printer 1432, which can be shared among a number of different facsimile processors 1450, 1504. I recognized that the 5–10 second printing time of a laser printer is at least three times as fast as G3 fax. Therefore, when operating in "batch" mode (when a whole page or a whole fax is received before printing) at least three fax processors, and more realistically five or six, can share a single printer. The facsimile machines, however, would be less expensive since they would be only include the controlling and scanning devices and the like, and not all would include associated printing elements. Also, when the technology is outdated, only those parts which become outdated need be replaced; e.g., the printer and spooler could be retained.

Figure 15:
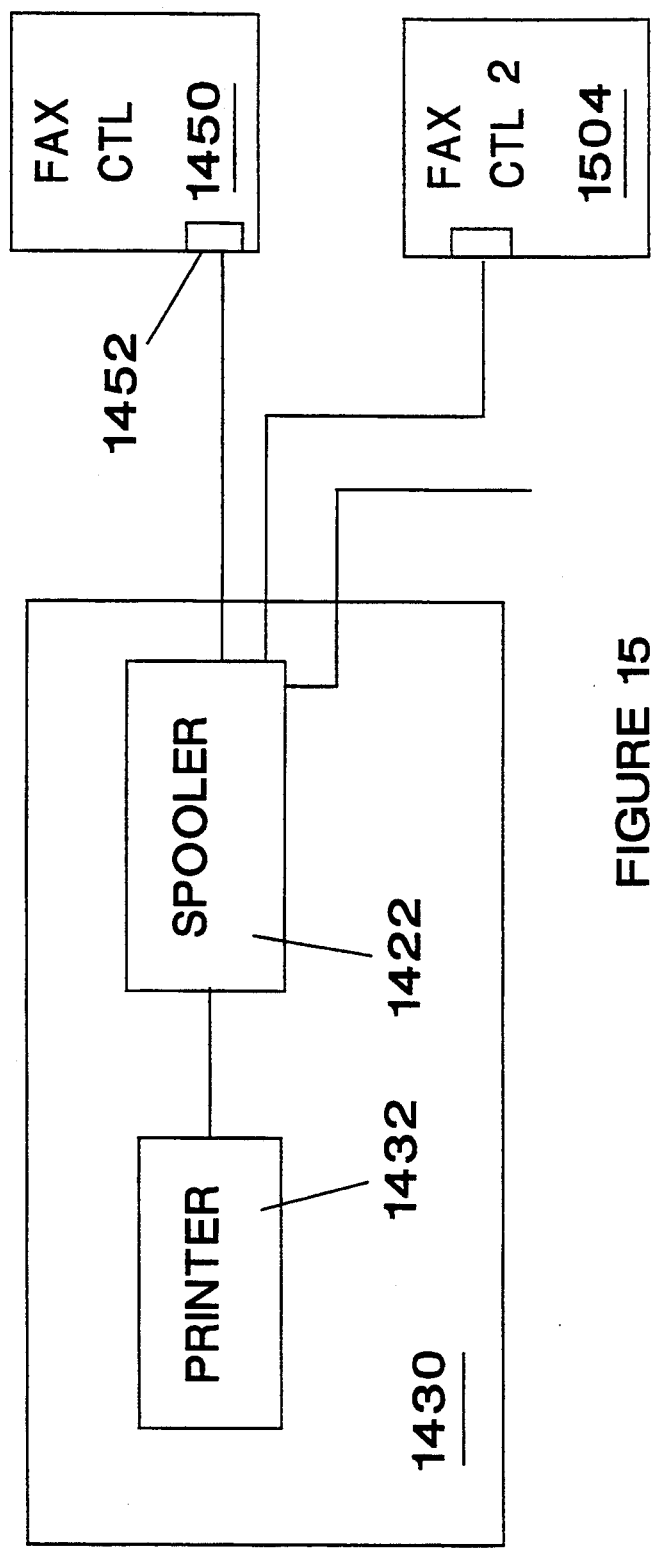
FIG. 15 shows a preferred architecture used according to the present invention.

The print spooler used according to the present invention and shown in FIG. 15 could be any of a number of commercially available print spoolers or could be effected by processor-driven software. A print spooler is typically a software application which stores incoming print jobs in a file until a printer is available to print them. A number of line printer ports shown are input into spooler 1422, which includes a small computer system. Each line printer port is immediately received by and stored in a file in memory. The file is stored until either an end of file message is received, or until, for example, there are no characters for 10 seconds. At that point, the file is released to print. If more than one file is present, files are placed into a print queue where they wait in line for the printer. The earliest file to be placed in the queue is printed first and then the next file is printed. Such print spoolers are commonly used in the art, one of which is the Windows (TM) print manager. Many others could alternately used.

Another aspect of this invention relates to the way in which the information from a facsimile to be sent is converted into an electrical format. The preferred embodiment shown in FIG. 14 is a single line, fixed scanner 1402. The paper containing the image is moved relative to the scanner by a paper conveying means 1460.

Figure 16:
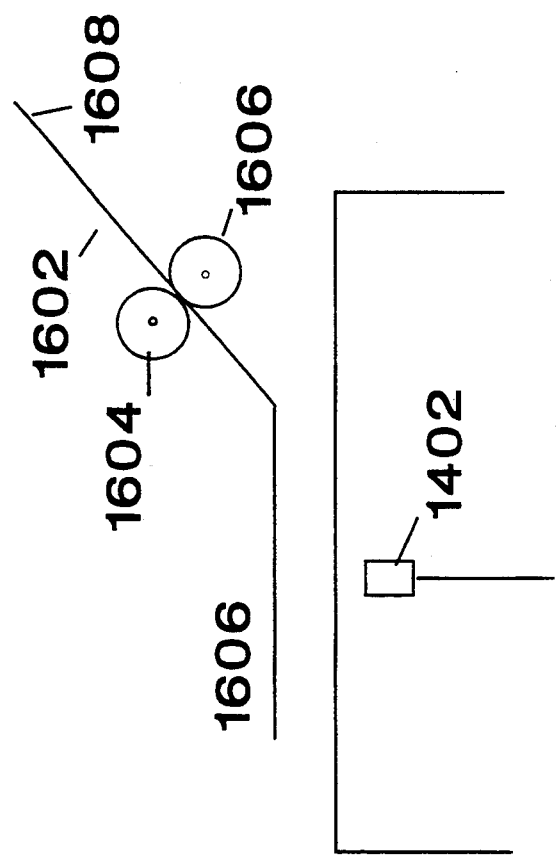
FIG. 16 shows the paper feeding technique used according to the present invention.

The paper conveying system is shown in more detail in FIG. 16. The information-containing page 1602 is fed, in a known way, using nip rollers 1604 and 1606. The leading edge 1606 of the paper is fed into the area of the one line scanner 1402. Scanner 1402 is continually energized and as the paper passes thereover, at each unit time, information indicative of the line immediately overlaying the scanner is sent to the image processor 1412.

In the prior art, the facsimile has been fed, using two separated sets of nip rollers, one near each edge of the sheet. This was done to ensure that the sheet maintains proper orientation relative to scanner 1402.

The scanning carried out according to FIG. 16 goes against this established teaching by eliminating any structure for maintaining straightness of the sheet relative to the scanner. The image processor 1412 of this embodiment rotates the image so that the output facsimile is of the proper orientation.

Figure 17:
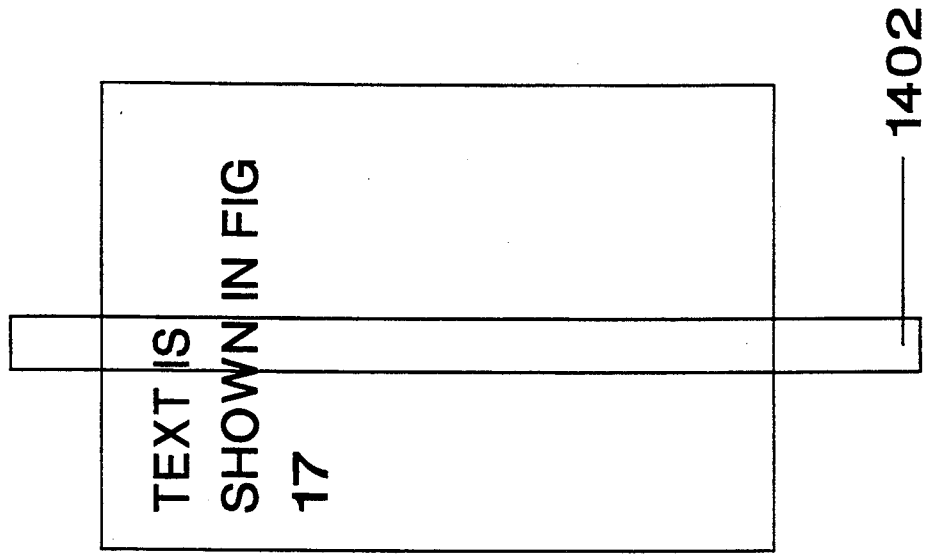
FIG. 17 shows the relationship between the scanner of the present invention and a usual facsimile sheet.

According to the preferred embodiment of FIG. 16, the scanner 1402 is longer than a standard size. Usually these scanners are about $8\frac{1}{2}$ inches long to accommodate an $8\frac{1}{2}$ inch width (of the $8\frac{1}{2} \times 11$ paper). The present embodiment uses a longer scanner and 90°-rotated orientation. The sheet is shown in FIG. 17 along with the one line scanner 1402. According to this embodiment, the sheet is preferably scanned in a direction parallel to the long axis of the page. In order to do this, the scanner 1402 must be longer than usual: at least $10\frac{3}{4}$ inches, and preferably 14 inches. This system takes proportionally less time to scan the sheet.

In a normal scanning situation, the scanning is done in a direction parallel to the short axis. Eleven inches of scanning, each scan $8\frac{1}{2}$ inches wide, must be carried out for each sheet. According to this preferred embodiment, an $8\frac{1}{2} \times 11$ sheet will only scan $8\frac{1}{2}$ inches, albeit 11 inches wide. Therefore, the sheet is scanned $(11-8.5)/8.5 = 20\%$ faster.

This could never be attempted in the prior art because receiving facsimile machines would not be able to receive an image which is 11 inches wide and $8\frac{1}{2}$ inches long. The printers and electronics could not handle an 11-inch width document. The present invention uses the image processor 1412 to overcome this problem. Image processor 1412 is preferably a microprocessor-based image processing system which operates according to the flow chart of FIG. 18. It should be understood that many of the flowcharts and descriptions given herein describe only a portion of the operation of the processor(s). These flowcharts should be understood as showing subroutines for carrying out their specific functions.

Figure 18:
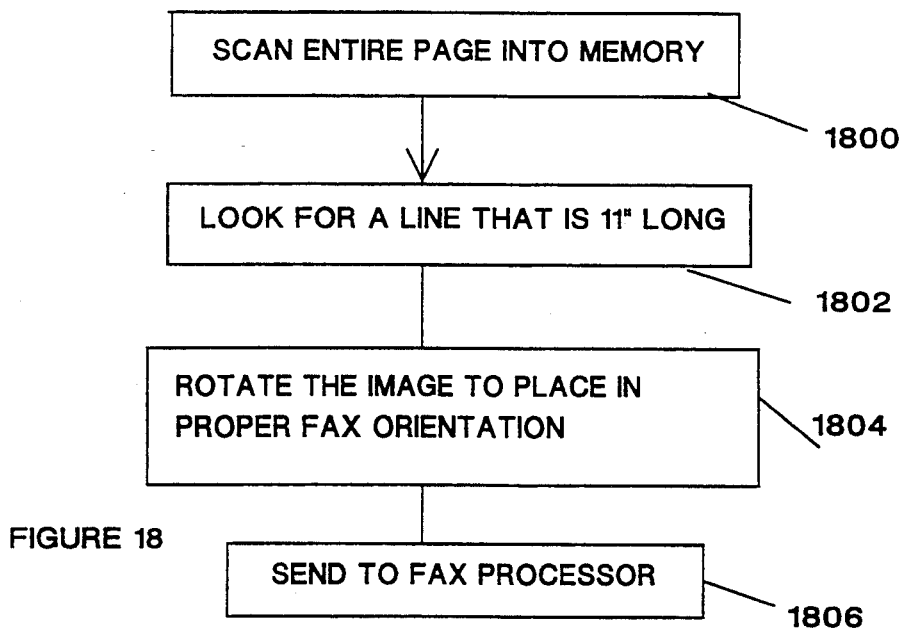
FIG. 18 shows a flowchart of operation of an embodiment of the invention which rotates the image prior to sending.

FIG. 18 begins by scanning in an entire page at step 1800. The entire page is scanned into a video memory of any conventional type. The contents of the video memory are then investigated at step 1802 to look for a line demarcating the paper edge from the background. The line should be either 11 inches, 11.69 inches (A4), 13 inches, or some partial segment thereof. This line is identified as the long axis of the video image defining the page to be sent. Step 1802 looks for this long axis line by investigating the video memory to look for a continuous line which is 11 inches long. If the image is known to be in a particular orientation, such as the long axis parallel to the line of scanning, then this identification step of 1802 is unnecessary.

Step 1804 rotates the image to place the long axis line in a direction precisely perpendicular to the direction of scanning. This rotation therefore re-orients the image in the proper and usual facsimile orientation, with the short axis parallel to the scanner line.

This preferred mode allows two distinct advantages. First, as discussed above, the image can be straightened and therefore no special means need be used for straightening the sheet as it is fed onto the fax table. If the sheet is crooked relative to the scanner, the image processor will automatically straighten it.

Second, the facsimile can be scanned in the opposite direction to the usual scanning direction, to enable a 20% increase in the speed of scanning an $8\frac{1}{2} \times 11$ document, or an up to 40% improvement in the speed of scanning an $8\frac{1}{2} \times 14''$ inch document. This is especially important when sending or receiving in batch mode, where it is important to get the information scanned as quickly as possible.

According to an alternate aspect of the present invention, the facsimile machine is of the movable scanner type. In this type of machine, the sheet is placed on the flat table, and the scanner is moved relative to the sheet to scan the information, or the whole image is scanned at once. This embodiment operates similar to the FIG. 16 embodiment; the overall operation is otherwise the same as that described previously.

The video rotation of the present invention can be done by any commercially-available image rotating software, such as by MTEZ (TM) software or by Delrina Software's WINFAX and DOSFAX products. The software package "Graphic Workshop" by Alchemy Mindworks Inc., P.O. Box 502, Beeton, Ontario, Canada also performs rotation of graphic images. It should also be understood that the image need not be rotated before sending. If a receiving fax machine has the capability to receive such documents, they could be rotated at the receiving end, or printed as 11" wide documents.

Figure 19:
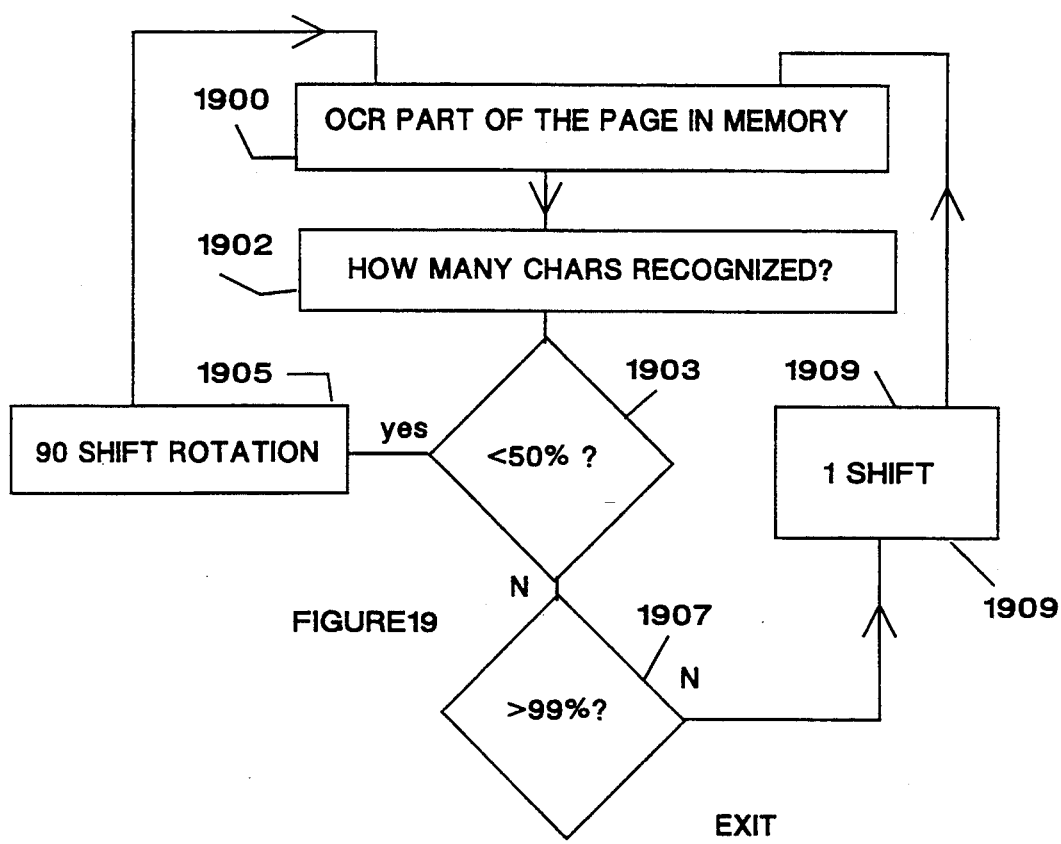
FIG. 19 shows a flowchart of operation which determines whether the image should be rotated or not.

An alternate embodiment of this invention uses the process of FIG. 19 to determine orientation of the image in place of step 1802. First, a certain part of the page in memory is identified as a representative portion. At step 1900, this part of the page in memory is optically character recognized ("OCR"). This can be done using any commercially available optically character recognition computer program. Step 1902 uses a file to maintain a count of how many characters have been recognized. At step 1903 a test is made to determine whether 50% or more of the characters have been recognized. The number of characters intended to be in the part of the page in memory are determined using a usual 10 or 12 character per inch ratio. If less than 50% of the characters are recognized, a decision is made that the image is probably 90° shifted and a 90° rotation is made at step 1905. Flow then returns to step 1900. If more than 50% of the characters are recognized, an additional test is made at step 1907 to determine if more than 99% are recognized. If so, an assumption is made that the page has been properly aligned. If not, a one degree shift is made at step 1909, and flow returns to step 1900.

According to another aspect of the invention, the sheet is fed in a diagonal direction to the nip rollers. A point of the paper is identified as the boundary between two of the edges of the page which are identified as above. Angles of the paper edges are measured. When the two angles awe equal, the paper is taken to be at a perfect diagonal, and appropriate image rotation is made.

Another aspect of this invention provides additional security in the fax machine environment.

The first security issue requires investigating the kind of information that gets sent on the facsimile machines. Many offices have elaborate precautions on mailing: for example, many times all outgoing mail and all incoming mail is screened. A facsimile machine may constitute a weak spot in this system: facsimiles might be sent and received outside the usual mailing facilities—and without screening.

Having recognized this need, I also invented a solution. This embodiment of the present invention uses the facsimile machine shown in FIG. 14 with the memory element 1414 being a non-volatile memory: preferably a disk drive or Bernoulli TM disk. This embodiment operates according to the flowchart of FIG. 20: every facsimile which is sent or received is converted to a video image, stored in memory 1414, and maintained therein until requested by a supervisor having an appropriate security authorization indicia. Received facsimiles are processed as described previously, e.g. with reference to FIG. 14. They are converted to video prior to printing. Transmitted facsimiles are converted to video prior to the actual transmission. The video image is stored in a format appropriate for facsimile transmission, e.g. in the preferred format described herein with reference to FIGS. 40–46 or a graphics format such as PCX format. Every facsimile which is sent or received is stored in the memory 1414. The memory retains a copy of each facsimile until it is reset by the supervisor having an appropriate security indicia.

Figure 20:
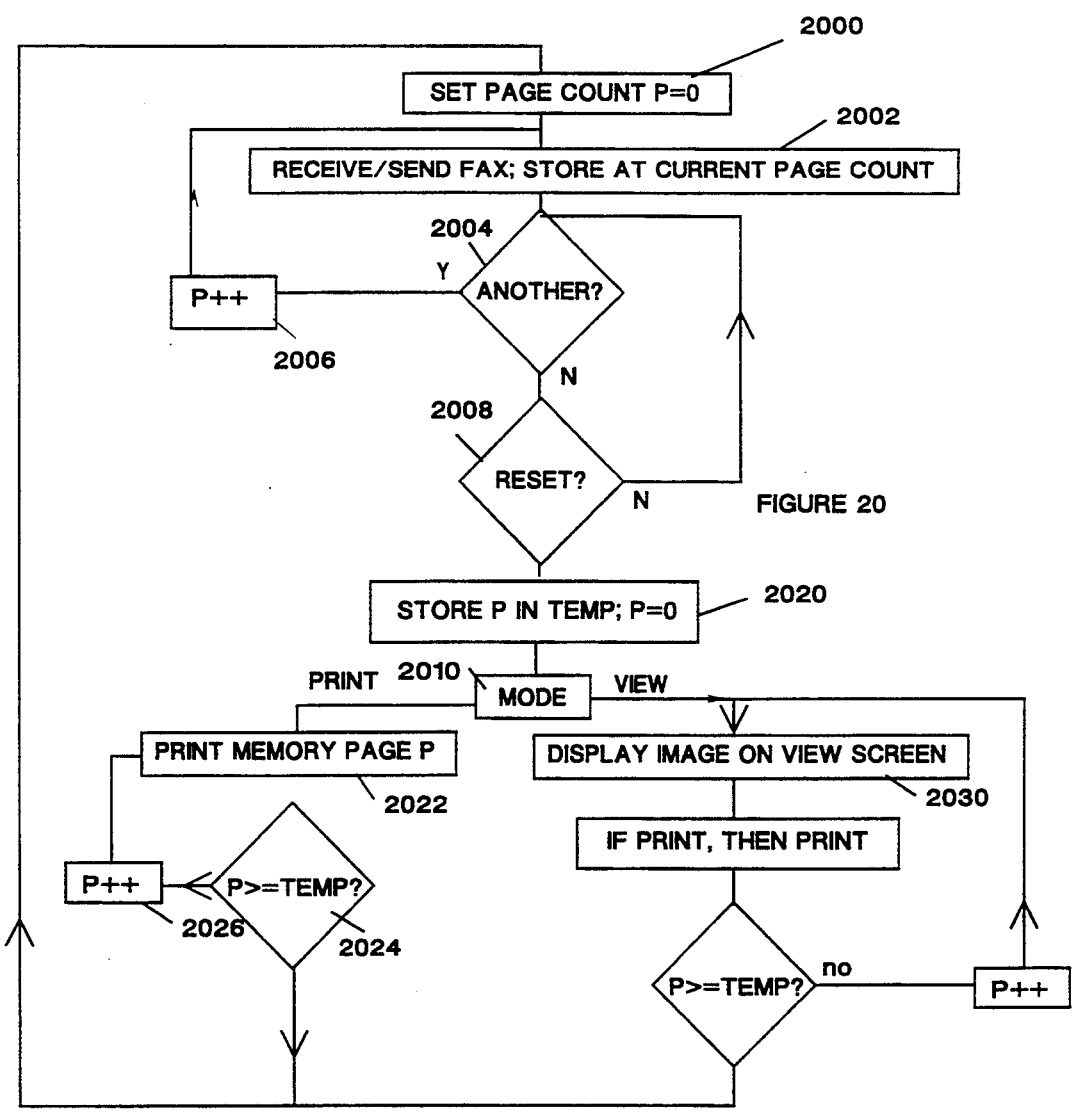
FIG. 20 shows a flowchart of operation of an embodiment of the invention whereby information is always stored until a supervisor retrieves it.

FIG. 20 begins with step 2000, which defines the reset state. Each document is defined by a number of pages in memory. An appropriate machine might have 500 or so pages of memory, and accordingly would require enough memory storage to store these 500 pages. At step 2000 the page count is initialized to zero. After the initial reset, any time a fax is sent or received, the image from the fax is stored at a location addressed by the current page count.

A fax send/receive event is shown at step 2002. The current page is digitized and stored at a location addressed by the current page count. Once the page is in memory, that page can be sent or printed, if the transmission is in standard fax mode. In batch fax mode, no action of sending or receiving is taken until all pages of the document are in memory. Once the newly-received documents are in memory, and have been appropriately processed (sent or printed), the marker indicating the current page is moved forward as shown in steps 2004 and 2006. Therefore, once pages 1–8 are sent, for example, the next document sent/received will begin at page 9. The marker is continually incremented, leaving all previous pages stored in the memory. The memory continues filling in this way until it is reset.

A system supervisor has a security indicia which can be used to reset the memory. The preferred security indicia include either a key in lock 1472 which locks closed the disc 1414, or a password entered on the 10-key input means 1470. The lock includes a sensor to detect proper opening thereof. When the software detects an appropriate security indicia, the reset sequence is started as shown in step 2008. The system recognizes the password or key actuation at step 2008. The current position of the pointer P is stored in memory at position TEMP, and then the pointer is reset to position 0 at step 2020. Control then passes to step 2010, which selects a mode based on information entered via the input device 1470. A number of modes are possible.

In a print mode, step 2022 commands that the memory page indicated by the current marker P be printed. Step 2024 tests whether the current page P is greater than or equal to TEMP, the highest page number. If not, P is incremented at step 2026 and control returns to step 2022 to print another page. Printing continues in this way. Once the entire contents of the memory have been read out and printed, the result of step 2024 is positive, and control passes to step 2000 where the memory pointer is reset to 0, so that all pages of memory can be used once again.

If view mode is selected at step 2010, the current page is first shown on view screen 1408 at step 2030. The user is then prompted for a decision whether that page should be printed at step 2032. For this purpose, the view screen will also display a message such as "For print enter 1, do not print enter 0." The response can be entered on the 10-key pad 1470. The information will be printed only if requested.

Figure 21:
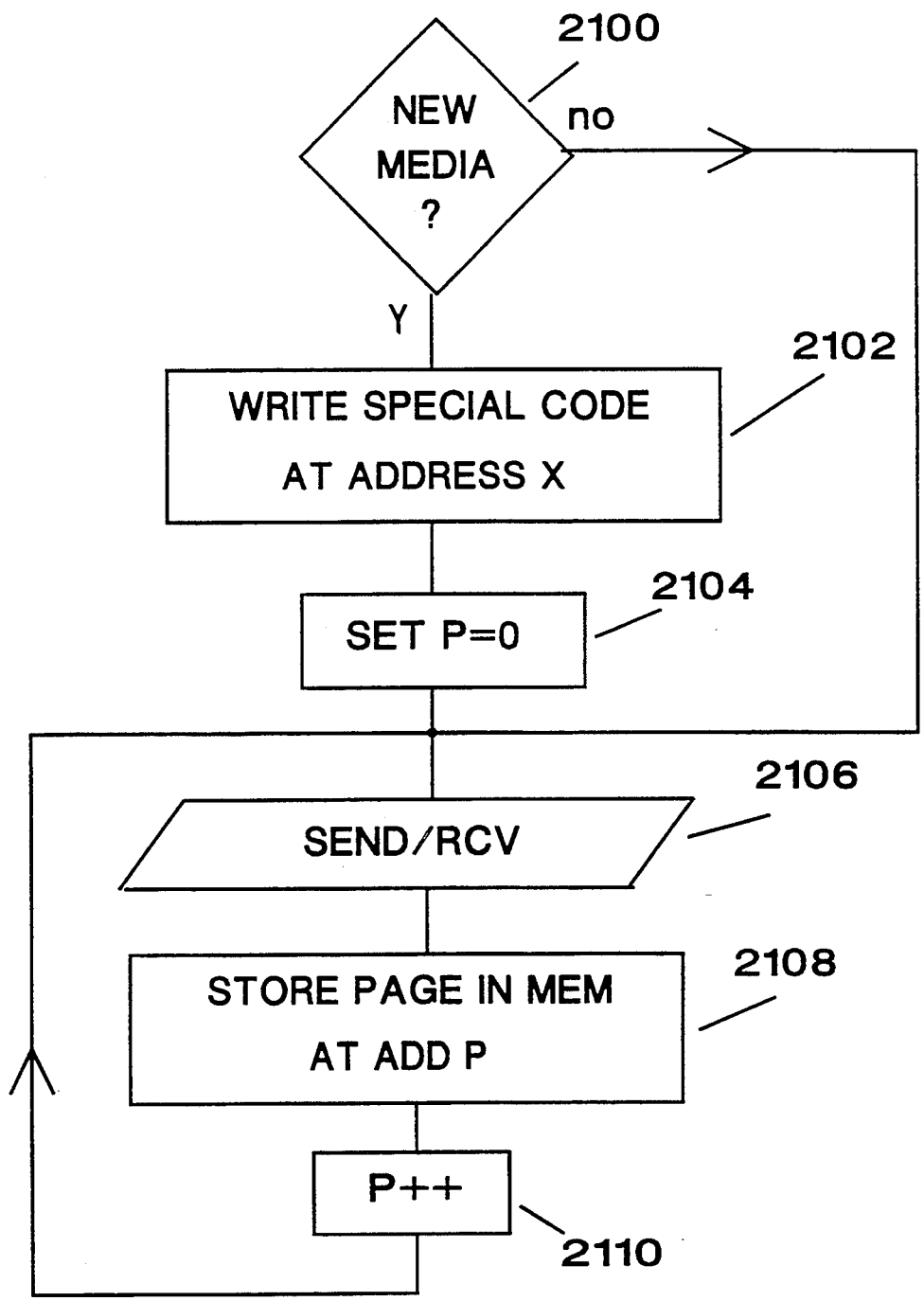
FIG. 21 shows a flowchart of operation of storing the information in this media.

A second alternative embodiment operates according to the flowchart of FIG. 21. In this embodiment memory 1414 is a removable storage media such as a high capacity floppy disk or removable Bernoulli TM or SysQuest TM drive to store the image. The drive is locked with lock 1474. The supervisor uses the supervisory key to open the lock and allows access to the removable media. A new movable media must be inserted, and when inserted and locked, the machine is reset to memory address 0.

FIG. 21 shows the flowchart of operation of this embodiment. Step 2100 shows a determination of whether a new media has been installed as an initial step of the scanning process. This determination can be made, for example, by determining if any information is on the disk. More preferably, a special predetermined code is placed in a special predetermined sector of the disk any time the media is first used. When step 2100 determines that the media is new, the special code is written at address X at step 2102 and the page number is set to 0 at step 2104. A send/receive operation is shown beginning at step 2106, where a page is stored in the memory at address P at step 2108. The value P is incremented at step 2110 and control returns to step 2106.

The supervisor must either install a new media, or copy all the contents from the media and then erase it entirely. This could be done on any personal computer with a graphics function, using software packages such as WINFAX or DOSFAX made by Delrina Industries, MTEZ Software from Word Perfect Corporation or any other commercially-available fax processing software. The fax processing software will recognize the faxes on the disk as being incoming faxes and process them appropriately. The disk can then be erased either using a DOS format command or by using DOS erase commands.

An alternative embodiment stores compressed format information, such as described herein with reference to FIGS. 40–46, instead of storing the entire video image.

This allows a system supervisor to determine every fax which has been sent or received on their fax machine.

Yet another security aspect of the invention uses the built-in CCD camera 1410 in the fax machine of FIG. 14. This CCD camera is preferably a low resolution, low cost CCD camera having a wide angle lens. It is intended for obtaining a rough monochrome image of its surroundings preferably of the entire area.

Whenever a fax is sent, it is customary to generate a fax transmission page which indicates the sender and receiver by telephone number, entered logo, or answerback, this indicates that the fax has been sent properly, and indicates the number of pages and the like. According to this embodiment, this fax cover page is stored in the memory 1414 along with the other information. However, since the fax cover page is generated by the fax machine, the video constituting the image that is usually printed need not be stored—only the information constituting that cover page needs to be stored to conserve space in memory 1414.

According to this alternative aspect of the present invention, whenever a fax is sent, the CCD camera will automatically take a number of video snapshots of the area around the fax machine. For example, the camera might take 10 different snapshots at 5 second intervals. According to this mode of the invention, these snapshots are stored along with the send fax information. The supervisor reviewing the faxes will therefore have the snapshots available to determine who sent the fax, if necessary.

If the snapshot system is used, preferably the supervisor should have the option of whether the snapshot will be printed.

Figure 22:
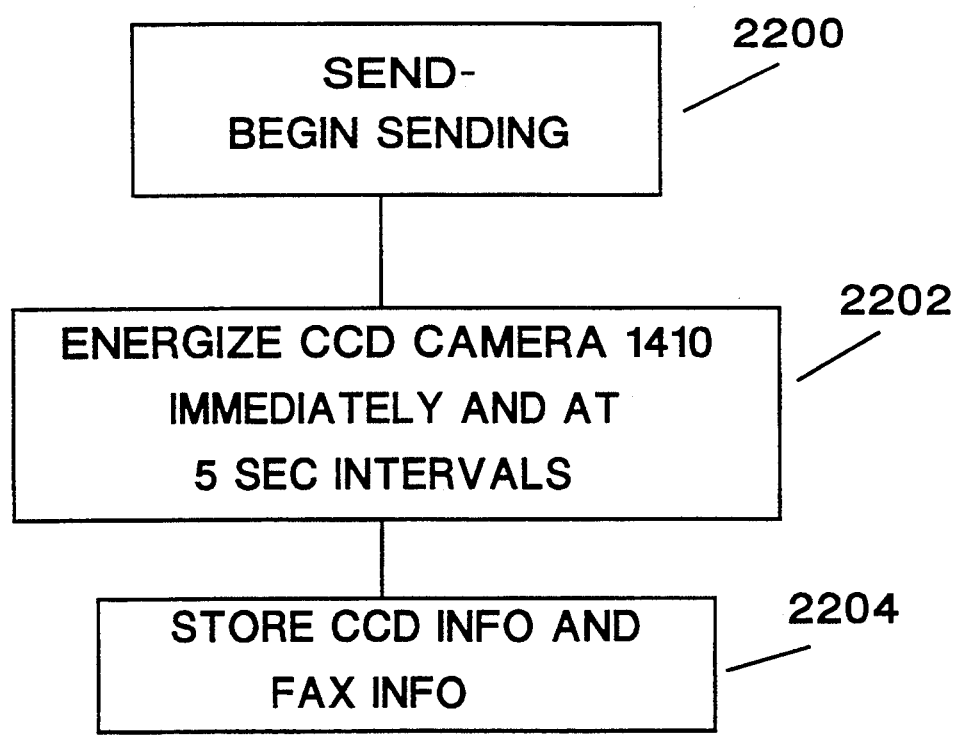
FIG. 22 shows a flowchart of operation of an embodiment using a camera.

A flowchart of this operation is shown in FIG. 22. A send event is detected beginning at step 2200, and the fax machine is actuated to begin sending the fax. Step 2202 shows the step of energizing the CCD camera 1410 immediately and at five second intervals. The information from the camera is stored along with the fax information such as recipient, telephone number, pages and time at step 2204.

Another aspect of the invention involves using the facsimile machine for surveillance of its installed area. For example, a facsimile machine might be conveniently installed in a secure area. During times when the area is unattended, the facsimile machine can be used as a means of surveillance of the unattended area.

The system must determine when a security transmission needs to be made. For this purpose, the preferred embodiment of FIG. 14 may also include a microphone 1476 and a sound level detector 1478. Sound level detectors are well known in the art and detect whether any sound over a threshold is present or not. The detector 1478 preferably also has a squelch control which adjusts the level above which the sound must rise before triggering the alarm.

Figure 23:
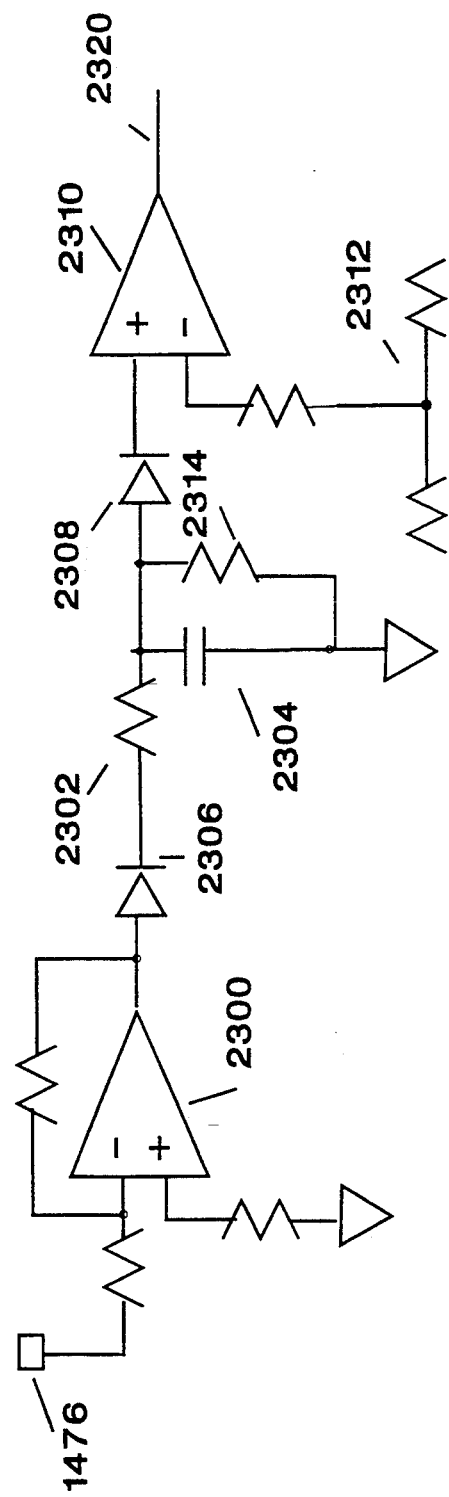
FIG. 23 shows a representative circuit used for a volume threshold.

A representative sound detecting circuit is shown in FIG. 23. The input from the microphone 1476 is sent to an OP amp 2300 which is configured to have a predetermined amplification factor dependent on the ratio of the external resistors. The output of the OP amp is rectified by diode 2306, current limited by resistor 2302, and then used to charge a capacitor 2304/resistor 2314 combination. The capacitor is input to one input of a comparator 2310, the other input of which receives a voltage from a voltage ladder 2312 having an adjustable threshold. The adjustable threshold sets the squelch, and can be adjusted to allow various amounts of ambient noise before actuation. Two diodes 2306 and 2308 isolate the resistor 2302/capacitor at 2304 from both the OP amp 2300 and comparator 2310.

In operation, when sound is received from the microphone, it is appropriately amplified and charges the capacitor 2304. The capacitor 2304 discharges at a predetermined rate across resistor 2314. The capacitor output is compared with the voltage of ladder 2312. Of course, various circuit characteristics such as the diode drops must be taken into account also, but the voltage ladder 2312 is adjustable to take into account all of these characteristics. When the voltage on capacitor 2304 exceeds that on the voltage ladder 2312, the comparator is switched to a different state, producing the output 2320.

Many more sophisticated systems can also be used, some of which are responsive only to various frequencies and the like. These systems are well known in the field of burglar alarms, for example. Also, video detection and processing the video to detect movement is possible. All of these techniques are generically referred to herein as the means for determining a time when a security transmission needs to be made.

When the transmission needs to be made, the system actuates an alarm indication which causes the CCD camera to record snapshots at 5 second intervals. While the camera is described as being a CCD type camera, more generally it is any video type camera capable of obtaining video images of a surrounding area in a format that can be digitally stored. These snapshots are first stored in memory 1414, and then assembled into a video signal, then converted to a fax format. The fax is then transmitted to a remote location, the fax number of which has been preprogrammed in advance. For example, this might be the police station, or the security supervisor's home fax number.

For purposes of this embodiment, it is preferable that the transmission be done silently to avoid anyone knowing that a transmission is occurring. Therefore, preferably the snapshot information is stored in video RAM, from which it is output directly to the fax processor and sent over the facsimile lines. In this way, the transmission is entirely silent. The silence is an important part of this embodiment: the intruders will never know that they are being observed, and hence will not try to hide from the surveillance device.

Figure 25:
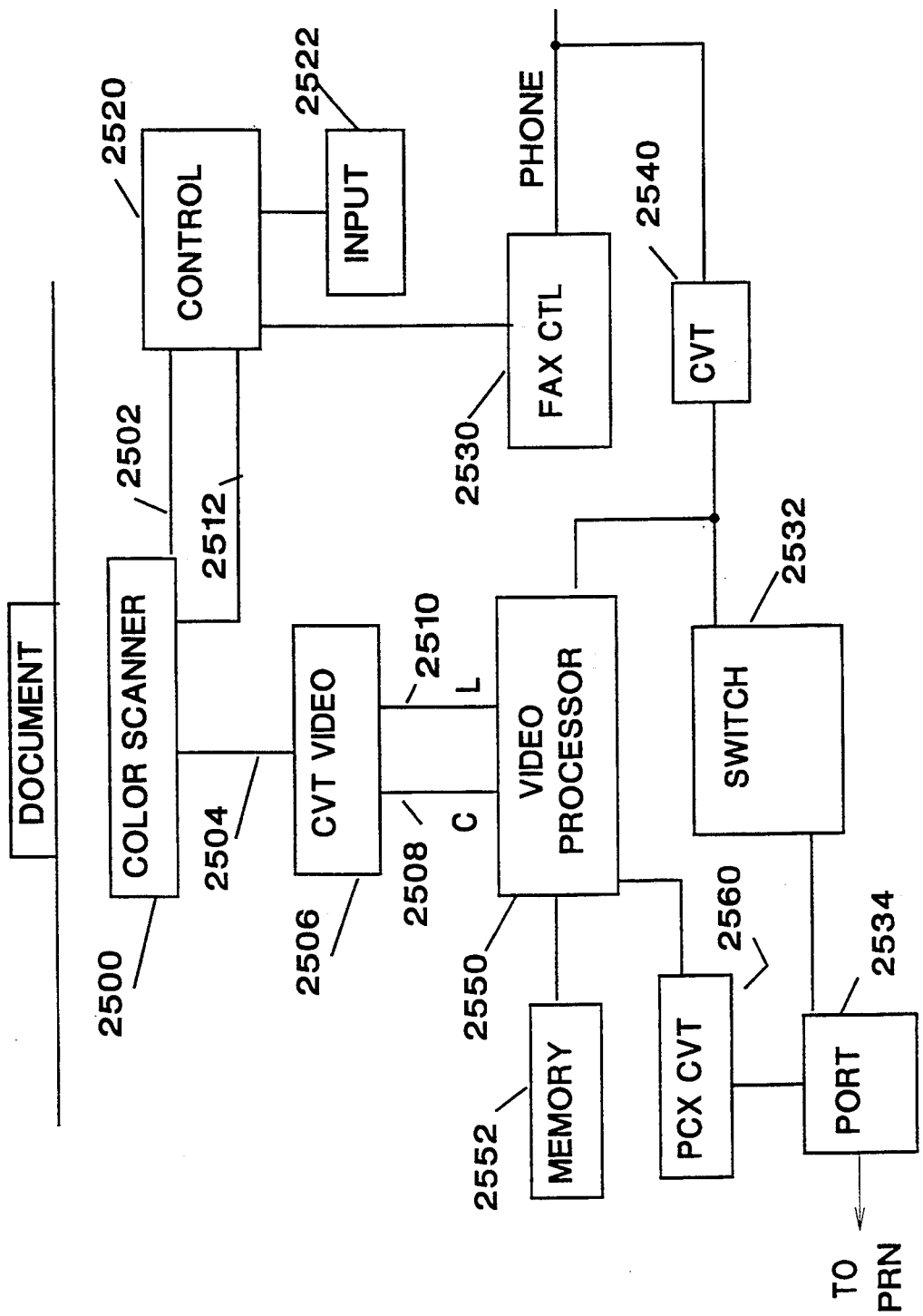
FIG. 25 shows a block diagram of a facsimile machine of a third embodiment of the present invention, which allows color facsimiles.

The third embodiment of the invention is shown in FIG. 25. This embodiment of the invention defines a system for sending color facsimiles and facsimile reports to a remote location.

Computers are firmly entrenched into the color market. It is a rarity nowadays to see a new computer that does not support color graphics. By comparison, facsimiles and even modem files are in the dark ages. The most advanced facsimile supports sending documents in gray scales, and many facsimiles do not even support that. Color brochures and the like are simply not faxable. I recognized that facsimile machines could send color documents and other color-based information, without disrupting the existing facsimile system.

Figure 24:
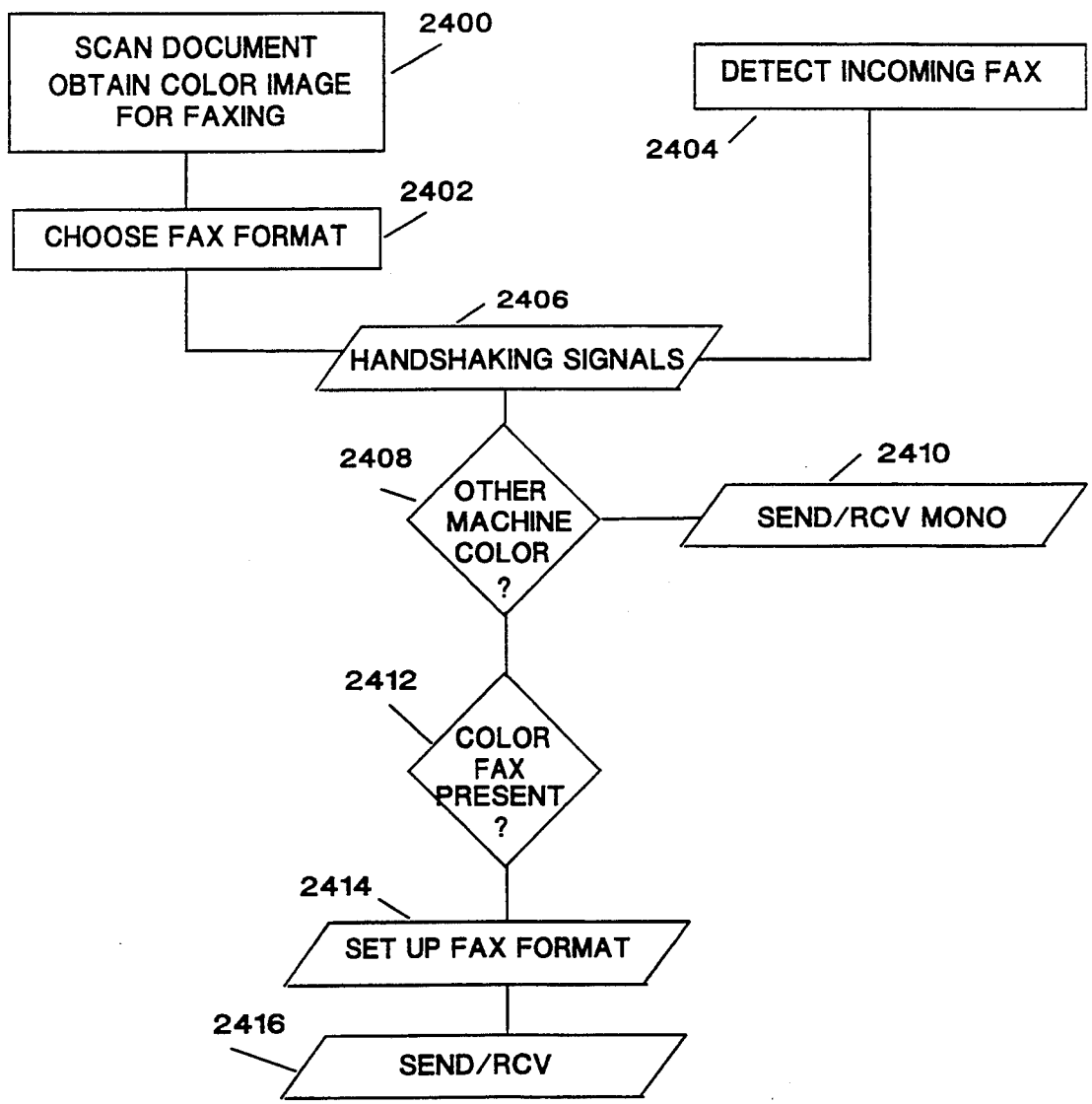
FIG. 24 shows a flowchart of operation of the handshaking used in the color facsimiles.

FIG. 24 shows a flowchart of a summary overview of the color facsimile process of the present invention and FIG. 25 shows a block diagram of a color facsimile machine preferably used according to this present embodiment. The FIG. 25 embodiment shows only those features which are necessary in order to allow color fax scanning. It should be understood that similar elements to the fax machines of FIG. 14 and FIG. 2 could also be added to this diagram, but there are omitted for simplicity.

The FIG. 25 embodiment operates according to the flowchart of FIG. 24. Step 2400 covers the basic technique of obtaining the color image for facsimile transmission. Step 2402 begins the send operation; it shows the step of choosing the format for a facsimile to be transmitted. Step 2404 shows the beginning of the receive operation: by detection of an incoming fax. In both cases, handshaking signals must be exchanged between the sending facsimile machine and the receiving facsimile machine as done at step 2406. These signals are modified such that each machine in which the color fax capabilities are installed can determine if the other facsimile machine has color capabilities or not at step 2408; however if the other machine does not have color capabilities then the other machine still recognizes the handshaking signals as those for a monochrome fax.

If the other facsimile machine is determined not to have color capabilities or not at step 2408, a monochrome fax is sent at step 2410. If so, a determination is made at step 2412 whether the fax to be sent or received will include color. Even if two color fax machines are communicating, it makes no sense to send a color fax if the incoming image is a letter or only monochrome information. Therefore, the color fax sending process preferably must include two substeps: determining by handshaking signals if both facsimile machines have color capability (step 2408) and then determining if the fax (or if the page) should be sent in color (step 2412).

Step 2414 sets up the fax format according to the determinations made. This requires sending a monochrome fax or a color fax. If the color fax is sent, the special color fax format described in more detail herein is preferably used.

Finally, step 2416 sends or a receives the fax.

This basic flowchart is expanded throughout the rest of the description of this embodiment.

Step 2400 requires obtaining the color information. FIG. 25 shows this in block diagram form as a color scanner 2500. According to this first preferred color fax technique, the color scanner is any commercially available color scanner such as those available from Hewlett Packard TM in the Scanjet TM series. Devices of this type produce output in a graphics file format, e.g., the "PCX" or "TIFF" format. This format can be converted for use by the facsimile machine. Another preferred mode of the invention uses a color scanner of a new type which will be described herein with reference to FIG. 28.

The format input signal 2502 controls whether the output 2504 is a color scanning output or a monochrome output. FIG. 25 shows the scanner 2500 as being controlled by the color/monochrome control line 2502. Signal 2504 therefore, is either color or monochrome information. The preferred embodiment of the invention shows this being converted into video information by converter 2506: if color, it is resolved into chrominance 2508 and luminance 2510, and if monochrome it is resolved only into luminance signal 2510.

Figure 26:
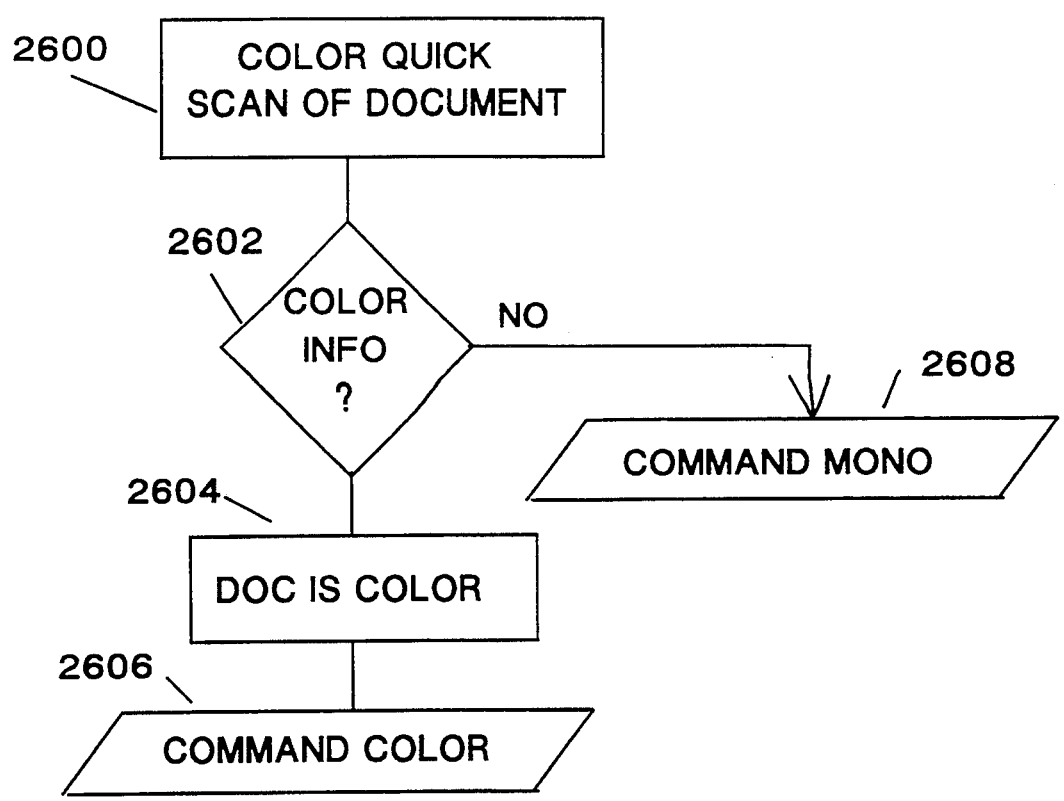
FIG. 26 shows a flowchart of determination of how the color scan will be carried out.

In order to carry out step 2412, a determination must be made as to whether the fax to be sent includes information which would be useful to have in color. Therefore, as a prelude to full scanning, the controller 2520, which is preferably a microprocessor with associated control hardware, controls the scanner to be turned on and by control line 2512 for a color scan of the entire document (step 2600 in FIG. 26). The output of the quick scan is analyzed at step 2602 to determine if there is a chrominance component indicative of color greater than a certain adjustable amount. Alternately, any other technique can be used to determine if the document includes a non-monochrome component. Even if the document is all in purple, for example, for purposes of this discussion it is still monochrome: meaning all information other than the page, is one color—monochrome. Another way to determine monochromacity is to analyze r, g, and b components and determine if they are the same. If the FIG. 28 embodiment is used, then the r image, g image, and b image could be compared.

If there is a chrominance component (no matter how detected), a decision of color is made for the entire document at step 2604. In that case, signal 2502 will command color scan by scanner 2500 for the entire document. If not, a decision of monochrome is made at step 2606, and signal 2502 then commands monochrome. This decision is preferably made on a page-by-page basis, although it may be done for the entire document.

According to an alternate preferred mode of the invention, the decision of whether to send in color or monochrome is made by a user entry on the input means 2522. This manual control, while less high tech than the other embodiment, nonetheless might enable saving money and also eliminate the time necessary for the initial fax scan.

If a color fax is chosen, this indication must be communicated to the remote facsimile machine, so that the transmit and received facsimile machines receive in the same mode. This requires modification of the basic facsimile handshaking formats shown and described in FIG.1. The preferred ways of modifying the facsimile format are described herein.

The first preferred format modification of the present invention requires a modification of the group identification signal 102 and/or the group command 104. Both of these signals include audio tones which indicate the highest group which the facsimile machine is capable of receiving. These tones are intended to be upwardly compatible: that is, all group 2 machines will recognize a tone sent by a group 3 or group 4 machine, and use that to send group 2. This first preferred format includes a tone indicative of color fax. This new tone can be multiplexed with the group command or the group identification signal as added in any other way.

Figure 27:
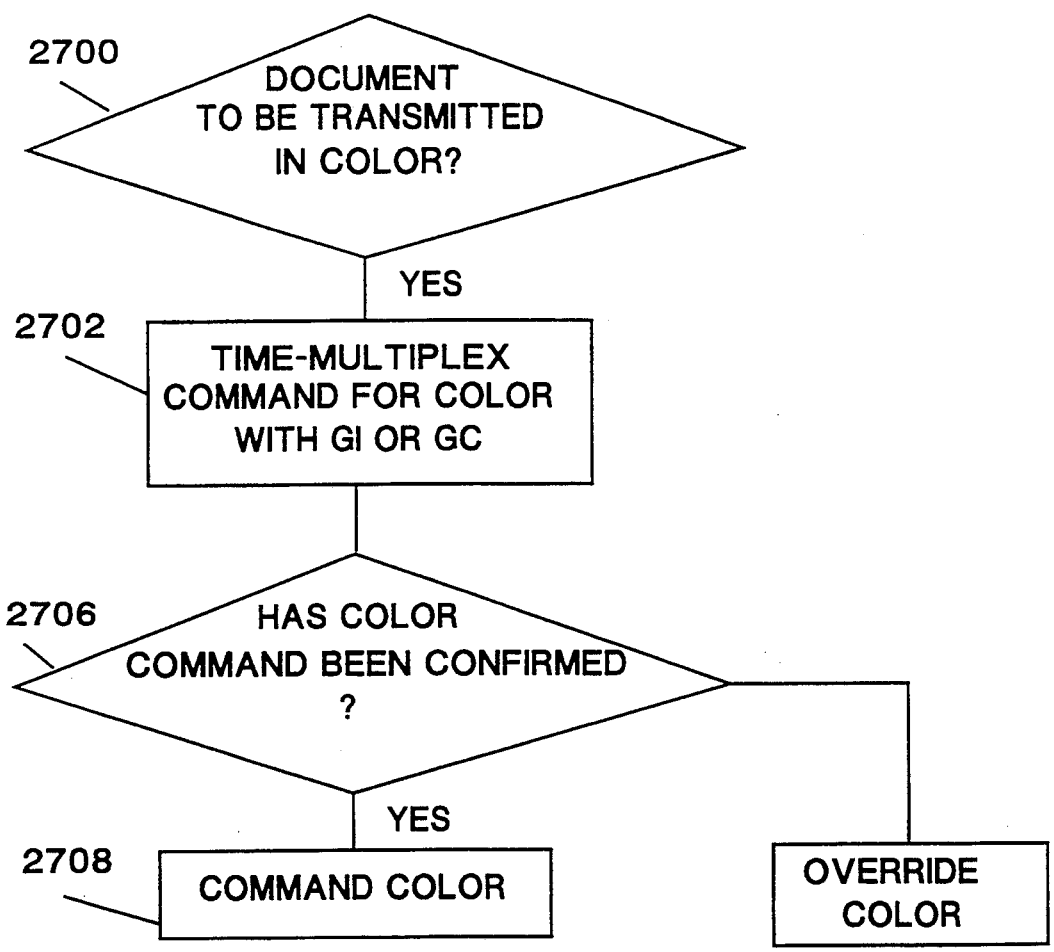
FIG. 27 shows a flowchart of operation of the handshaking signals used.

The steps necessary to use this format are shown in FIG. 27. At step 2700 a new command for color is time-multiplexed in with the group identification code or group command. At step 2702, a test is made to see if the color command is confirmed. If it is confirmed, color is commanded at step 2704, and if it is not confirmed, then color is overridden at step 2706.

Step 2700 represents an initial step in which a determination is made of whether the document is to be transmitted in color. Step 2700 is responsive to the outputs produced from FIG. 26, discussed above, and uses these outputs to determine whether the document is appropriate to be transmitted in color. If the document is color appropriate, then a positive determination is made and flow passes to step 2702. Step 2702 time-multiplexes a command for color along with the usual G3 or G4 command signals. If the document is determined as not appropriate for color, the decision at step 2700 is negative, and flow passes to step 2704 where color is overridden—the scanner is commanded to monochrome and the usual G3 handshaking signals are used.

Otherwise, step 2706 makes a determination of whether the color signal has been confirmed from the remote facsimile machine. If not, no color document can be sent, and flow passes to step 2704 where color is again overridden. If the remove facsimile, however, includes color, then color is commanded at step 2708. This command includes commanding the color scanner to scan in color and commanding the color operation described further herein.

Many modifications are possible in this technique. A second modification of the color system of the present invention is shown in FIG. 24A. In this modification, the normal handshaking signals shown in FIG. 1 are used to send a normal facsimile document. If the sending document has been scanned in color, then only the luminance portion of the document (the monochrome information) is sent as an initial transmission at step 2650. According to this aspect of the invention, at the end of message signal 112, (FIG. 1), a color signal is sent as a next part of the transmission at step 2652. According to this aspect, the end of message signal is multiplexed with at least one additional signal indicating that additional information will be forthcoming. This is multiplexed with the end of message signal such that the receiving facsimile machine will recognize an end of message and also will recognize a color signal. The message confirmation signal 114 shown in FIG. 1, and confirms whether the message should be ended or whether the color signal should be sent, depending on the capabilities of the receiving machine. If the color signal should be sent, then the chrominance information from the color scan is sent as a separate page following the initial message.

FIG. 25 also shows a fax controller 2530 which can be similar to those described above. This device produces the handshaking signals shown in FIG. 1, and also controls both the transmit and receive facsimile operation along with main controller 2520. Fax controller 2530 receives the incoming telephone signals. From these telephone signals, it determines if the incoming facsimile is monochrome or color using one of the techniques described above. Converter 2540 converts the fax information to video. If the fax is a monochrome fax, fax controller 2530 closes switch 2532 to send this information directly to printer port 2534 which is similar to the spooler/printer assembly of FIG. 15. If the fax is color, however, the video processor 2550 is enabled by the fax controller 2530. Video processor 2550 is controlled by fax controller 2530 to store the information in an associated memory 2552. The fax controller determines from the handshaking signals whether the information which is received is luminance (monochrome fax) or chrominance (color information for the monochrome fax).

Video processor 2550 stores each page of luminance information in the memory 2552. Upon receiving the chrominance information, video processor 2550 merges the L+C information together into a standard color video signal. The video signal is output to graphics converter 2560 which converts the video information to graphics and output to the printer port 2534.

Such video processors are well known in the art: for example, they are used in television sets, all of which receive the luminance and chrominance information separately and appropriately combine this information. While FIG. 25 shows both sets of information being output to the same printer port, very likely the information that included luminance only would be output to a monochrome printer but the color information would be output to a video screen or to a color printer.

Figure 28:
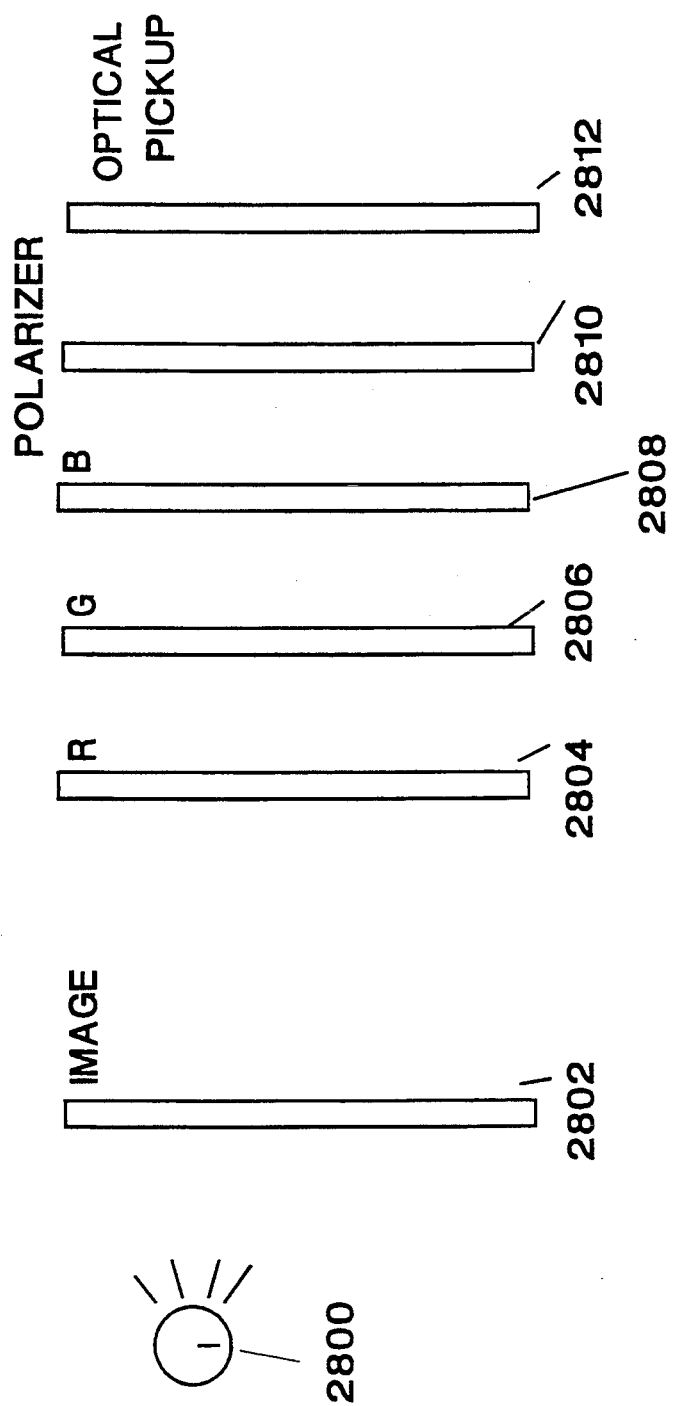
FIG. 28 shows a ferroelectric liquid crystal filter used according to a preferred color scanner of the present invention.

Another embodiment of the invention uses a scanner shown in FIG. 28 which uses frame sequential liquid crystal filters. A frame sequential filter produces three separate pictures of the same image: each picture representing a different part of the color spectrum. This embodiment of the invention recognizes that the three scans of this embodiment delimit the image into red, green and blue (or other similar representations of the) information. Each of these red, green and blue images are converted into a separate image, which together can synthesize the color information.

According to this embodiment, each of the red, green and blue signals are made into separate images, and the separate images are sent sequentially. All facsimile information includes page and frame information, saying, for example page 1 frame r, page 2 frame b, page 3 frame g and the like. For this embodiment, each page is made of three frames: red, green and blue image. Sometimes one of these images may be a null set. However, the three images are sent in that order. Interpage information is also used to confirm which color frame and which page the information is associated with. All of these images are preferably compressed as described herein to minimize the sending time. As described above, this format of using three separate images also facilitates determining if the information includes a color component. The characteristics of the three images are compared. If they are substantially the same, then there is no color component.

Frame sequential liquid crystal filters have been used in the art to produce a color image based on a monochrome driving signal. See for example U.S. Pat. No. 5,132,826, the disclosure of which is herewith incorporated by reference. According to the present invention, a plurality of liquid crystal cells such as disclosed in U.S. Pat. No. 5,132,826 are disposed in a row, to selectively form a color filter. The document to be imaged 2802 is illuminated by coherent light from illuminator 2800, or alternately the light from the image is linearly polarized by a linear polarizer. Three ferroelectric liquid crystal cells 2804, 2806, 2808 are disposed optically in series with the image. Each of the ferroelectric liquid crystal cells selectively changes an optical orientation of a different spectrum of light, depending on its electrical driving characteristic. By energizing the three cells at three different times, light having red, green and blue characteristics can be selectively passed at these three different times.

In order to obtain an image of only the red portion of the light, FLCs 2804, 2806, and 2808 must be selectively operated. Electrical actuation of the FLCs cause them to rotate the polarization of the light which passes therethrough of the appropriate color. For example, to obtain a red image, the green and blue FLCs 2806 and 2808 are energized. All green and blue light are altered by the FLCs 2806 and 2808 to have their polarization rotated. Only the red light maintains the polarization which is the same as the light source 2800.

A linear polarizer 2810 is located in series with the FLCs. Since the green and blue light has been rotated, light of those polarizations are not passed through the polarizer. Only the red light is passed through the polarizer.

By selectively operating the red, green and blue polarizers at different times, the optical pickup 2812 receives red, green and blue-related images at different operating times. Therefore, three consecutive images indicative respectively of red, green and blue are passed in this way.

The formats described above are highly advantageous, as they allow ready communication between color and monochrome fax machines. The next embodiment also allows such communication. However, while the previous embodiment sent the monochrome fax as the first page (which would in any case would be properly received by any receiving facsimile machine) the present embodiment, upon a determination of color signals, completely modifies the information which is sent.

This embodiment of the invention sends the video information as coefficients of a curve fit. For this embodiment, the techniques used in my copending application Ser. No. 07/933,751 are used, the contents of which are herewith incorporated by reference. Briefly, this technique described in my copending application accepts information from a video source. That video information has a particular waveform.

The Fourier theory proves that any such waveform can be expressed in terms of sines and cosines. Most of these waveforms could alternately be expressed as a mathematical progression. My copending application uses a standard form of sines and cosines, or a form of a mathematical progression, or both, which are stored in both the transmitter and receiver. The video signal is curve-fit to the standard equation, using any curve fitting technique, for example, table curve TM software, available from Jandel Scientific, San Rafael, Ca, or any other curve fitting software. Coefficients of the equation are obtained. Only the coefficients, and not the equation itself, are transmitted from transmitter to receiver.

In this embodiment of the invention, a similar technique is used. In FIG. 25, the information, if color, is sent to video processor 2550. Video processor converts the information into a video signal. The video signal is then analyzed using Curve-fit Software or, for example, a fast Fourier transform ("FFT") in order to define it in terms of a prestored mathematical equation which defines that video signal. The general form of the mathematical equation is preset and only its coefficients change. The coefficients of the mathematical equation are converted into facsimile information using a preset coding scheme, and transmitted.

Figure 29:
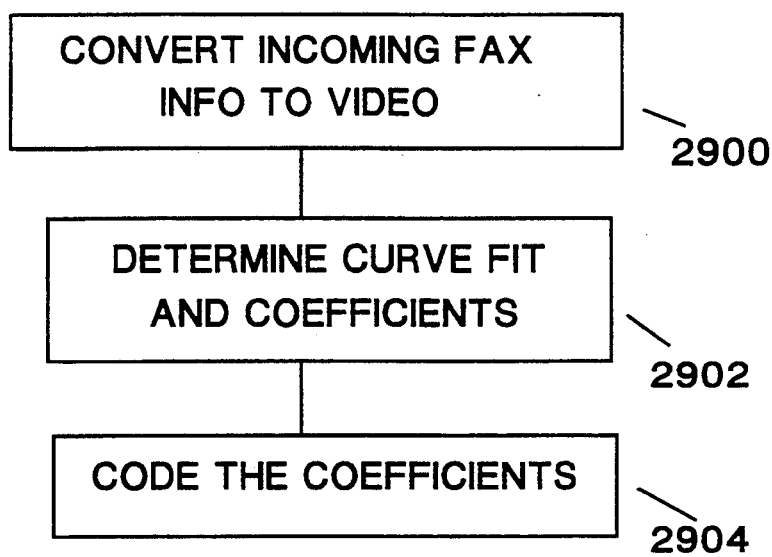
FIG. 29 shows a flowchart of operation of another preferred embodiment of the present invention which uses a curve fit operation.

The operation is shown in FIG. 29. At step 2900, the incoming information is converted into video. At step 2902, the video information is curve-fit to a predetermined and stored equation and coefficients of that equation are determined. The coefficients are coded at step 2904 into a facsimile transmission. According to other aspects of the invention, the curve may also be one of multiple curves and information identifying that curve may be transmitted also. Other aspects of the invention discussed herein with respect to FIGS. 40–46 could also be used, if appropriately modified for color.

Figure 30:
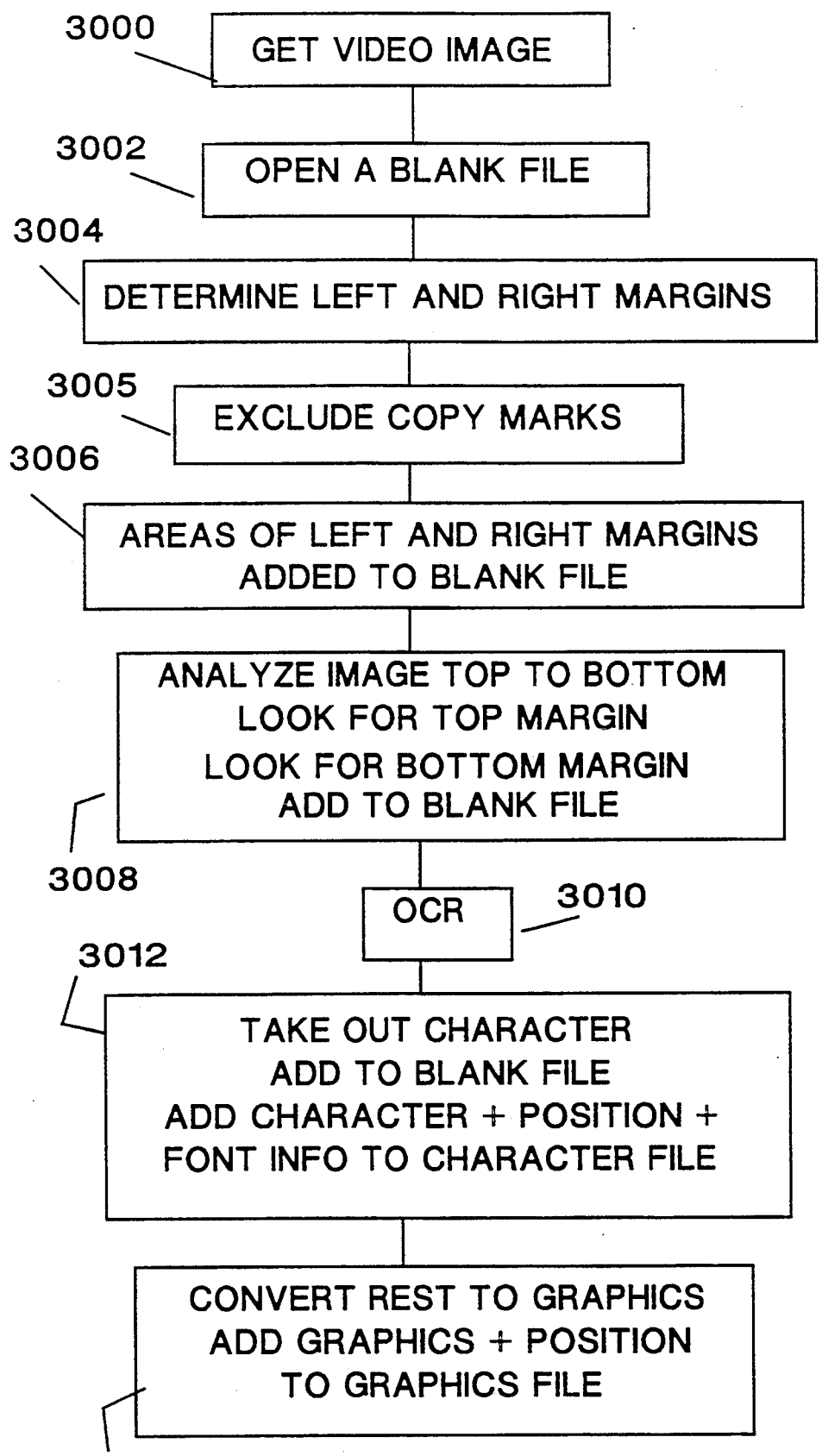
FIG. 30 shows a preferred coding mode of the present invention using blank detection and OCR to minimize the length of the information that is sent.

One preferred technique is described below with reference to the flowchart of FIG. 30. FIG. 30 shows an initial step 3000 of obtaining the video image. A blank file is opened at step 3002. This blank file includes coordinates of areas in the image which are blank. The blank file will be the first thing sent by the facsimile sending machine, and will be used by the receiving facsimile machine to reconstruct the image by placing blanks in the positions noted by the blank file.

The first blank information which is determined are the left and right margins. The left and right margins of the document are determined at step 3004 by analyzing the video image in memory to look, in a vertical direction, straight down the image. The left side of the image is analyzed beginning at the left edge of the paper. If looking down the line, a determination is made that the portion of the image is blank, then this is considered as a left margin. Similarly, a scan is made from the right side, to determine the extent of the right margins.

It is recognized that most documents which are sent have substantial margins; usually at least one inch and sometimes more. Accordingly, another aspect of this invention recognizes that many times facsimile images will include copy marks. For example, a document might be copied, and due to improper registration, there will be dark marks around the edges of the copy. According to this embodiment of the invention, if 90% of the area where the left margin is expected is blank, the present invention assumes this to be a left margin and excludes everything else as being copy marks. The area is treated as blank in the rest of this embodiment, and hence the marks are not copied or sent. Copy mark exclusion is shown at 3005.

Step 3006, areas indicative of the left and right margins are added to the blank file. The left most dot will always be blank—this indicates a margin. In fact, most scanners do not even scan the whole page so there must be some margin. The dots are examined by incrementing through one by one, and all dots forming a column are examined.

This embodiment recognizes that virtually all documents have some kind of margin thereon—typically one to one and one-half inches. Step 3004 determines the left and right margins, and adds that information to the "blank" file at step 3006. No information for those margins is sent. At step 3008, the image is analyzed from top to bottom to look for lines which are completely blank in the horizontal direction. This is done to look for a top margin, a bottom margin and areas between lines. Even single-spaced information typically has as much blank space between lines as it does in the lines itself. All of this information is added to the blank file.

This embodiment accomplishes this operation by investigating the video image from top to bottom. When a whole line is blank, it is indicated as a blank line. At least the top and bottom margins are found in step 3008.

Much of the information between lines is also blank. Even a single-spaced document includes about as much blank space between the lines as it includes in the lines themselves. Accordingly step 3008 preferably investigates the image from top to bottom to determine top and bottom margins and horizontal blank lines. All blank areas are added to the blank file.

Typically an image does not have contiguous vertical lines, although some special images might have such lines and in such case it might also be useful to scan and look for vertical blank lines.

This leaves a substantially reduced image to be coded. Step 3010 reduces this image even further by recognizing optical characters (henceforth "OCR"). The optical character recognition step is carried out at step 3010. This analyzes the parts of the video image which are left (non-blank) to determine which parts of this image can be recognized as characters If a character is recognized, then the area occupied by the recognized character is added to the blank file at step 3012. Information indicative of the character, such as its ASCII code, font, pitch, size, and position is used to form a character file. The character file, therefore, includes the character, position and font, and can be used to exactly reconstruct the character which was recognized in step 3010.

At this point, most documents will be 80 to 90% blank and almost everything will be in the blank file. The parts which are not are converted to a graphics format at step 3014 using any of the conversion factors known in the art or any of the ones previously described. These graphics files are stored along with their position information in a graphics file.

This information, therefore, includes three basic parts. First it includes blank information which indicates all of the areas which are to be blanks. Next it includes OCR information which indicates the character, position and font of each character which was recognized. For anything which was not recognized, such as signatures, handwriting, logos and the like, graphics files are sent. The graphics files are in standard facsimile format, for example, and certainly would take up no more room than a usual facsimile. However, the remainder of the information that is sent is substantially compressed as compared with standard facsimile information and moreover preferably includes color information advantageously recorded thereon.

70-90% of most documents will be recognized characters as in this manner. Therefore a substantial compression of the transmitted image is possible. The OCR'd part includes information bits indicating the recognized character as well as information bits indicating the recognized color. In a monochrome document, all OCR'd information will be a particular color, so the preferred mode of color for the OCR'd information includes a color on and color off bit, which only sets the background and foreground. FIG. 31 shows a sample message structure for the facsimile transmission of this embodiment. However, it should be understood that this system could be used with a standard fax machine handshaking system by determining, using the handshaking signals, whether the remote fax can accept this special format. If not, then only copy mark exclusion, for example, might be done, and a normal fax sent.

The transmission code begins with a start code 3100 which is one of a number of predetermined reserved sequences for special codes and commands and the like. All of the transmission formats of the present invention include a number of reserved codes which cannot be used to represent information but instead are used only for command codes. Start code 3100 is one such reserved code. The start code is followed by a blank code 3102 indicating that the areas that follow are indicative of blank areas. 3104 are coordinates of the first block of blank area, where X1 is the beginning of the blank space, X is the extent of the blank space in the X direction, Y1 is the beginning of the blank space in the Y direction and Y is the extent of the blank space in the Y direction. These four values together form a box, the box indicating the first box of blank area. Other areas of blank area will also follow and are summarily shown as element 3106.

Preferably, the elements 3106 refer to distances only, rather than absolute values, so that a value Z in the first field of element 3106 would refer to a starting point of X1+X+Z as the starting point.

optionally, element 3104 also includes a special command code for whole lines which are entirely blank. In that case only Y information and not X information will be necessary. Then, a command code indicative of whole vertical lines (Y+0), (Y+1) could be used.

Element 3108 is a command code for the OCR information. Element 3110 indicates font and pitch information for the OCR information. The font and pitch information will always immediately follow the first OCR command code 3108. Element 3112 indicates the beginning point of the OCR information in X and Y coordinates, and elements 3114 and 3116 represent ASCII codes of the information that follows. Since font and pitch information has been given, these ASCII codes may describe multiple lines of information.

If the font and pitch change, then a new OCR command code is sent as shown in element 3118, along with a new font and pitch and ASCII codes follow, shown schematically as elements 3120.

According to this embodiment of the invention, each page is sent as a separate message unit. However, the OCR codes are interrelated with one another. Therefore, if the OCR code for a first page includes a command code indicating the null set following it, this means that the font and pitch are the same as those previously used. The font and pitch are hence stored in the memory and retrieved for this purpose.

Element 3130 shows the graphics code GRX indicating that the information that follows is graphics information. This is followed by X,Y coordinates of some point of the graphics information, preferably the top left point, and then by the graphics information itself, shown as PCX 3134.

Any of the codes shown above may be repeated as many times as necessary to represent the entire message structure. Element 3136 indicates the page end command, and a new start code will indicate the beginning of a next page in the sequence.

A first modification of this embodiment of the invention generates the actual facsimile transmission using the computer. The transmission includes two parts: a first part being computer-generated parts such as character information which is sent as ASCII codes or the like, and a second part being graphics parts encoded in a graphics format. As in the preceding embodiment, this allows the fax to be broken down into: 1) information indicative of locations where there are spaces, 2) OCR information including font information, pitch information, ASCII codes and location information, and 3) graphics information. The graphics information includes the most complicated information, including color information if there is any. The graphics could be sent in the PCX format or in any other graphics format including those previously described herein.

Another modification of this embodiment festoons the computer-generated fax by including sound. The sound can be generated by the receiving machine using any commercially available sound board such as a Sound Blaster TM type sound board. The sound blaster adds a fourth part to the fax message shown in FIG. 32: sound to be played during the fax, and timing information indicative of the time at which the sound should be played.

FIG. 32 shows the sound command code 3200, which is preferably placed between the PCX 3134 and the page end code 3136 in FIG. 31. The sound command is followed by standard Sound Blaster (TM) commands which indicate the sound to be played. Preferably, these commands are compressed using a predetermined compression algorithm such as the PKZip algorithm available from PK Ware, Inc, and described in U.S. Pat. No. 5,051,745. Element 3204 indicates timing information if desired, this timing indication indicating how long after the callup of the fax the sound will be played. This embodiment preferably communicates between two personal computers in this way.

Figure 33:
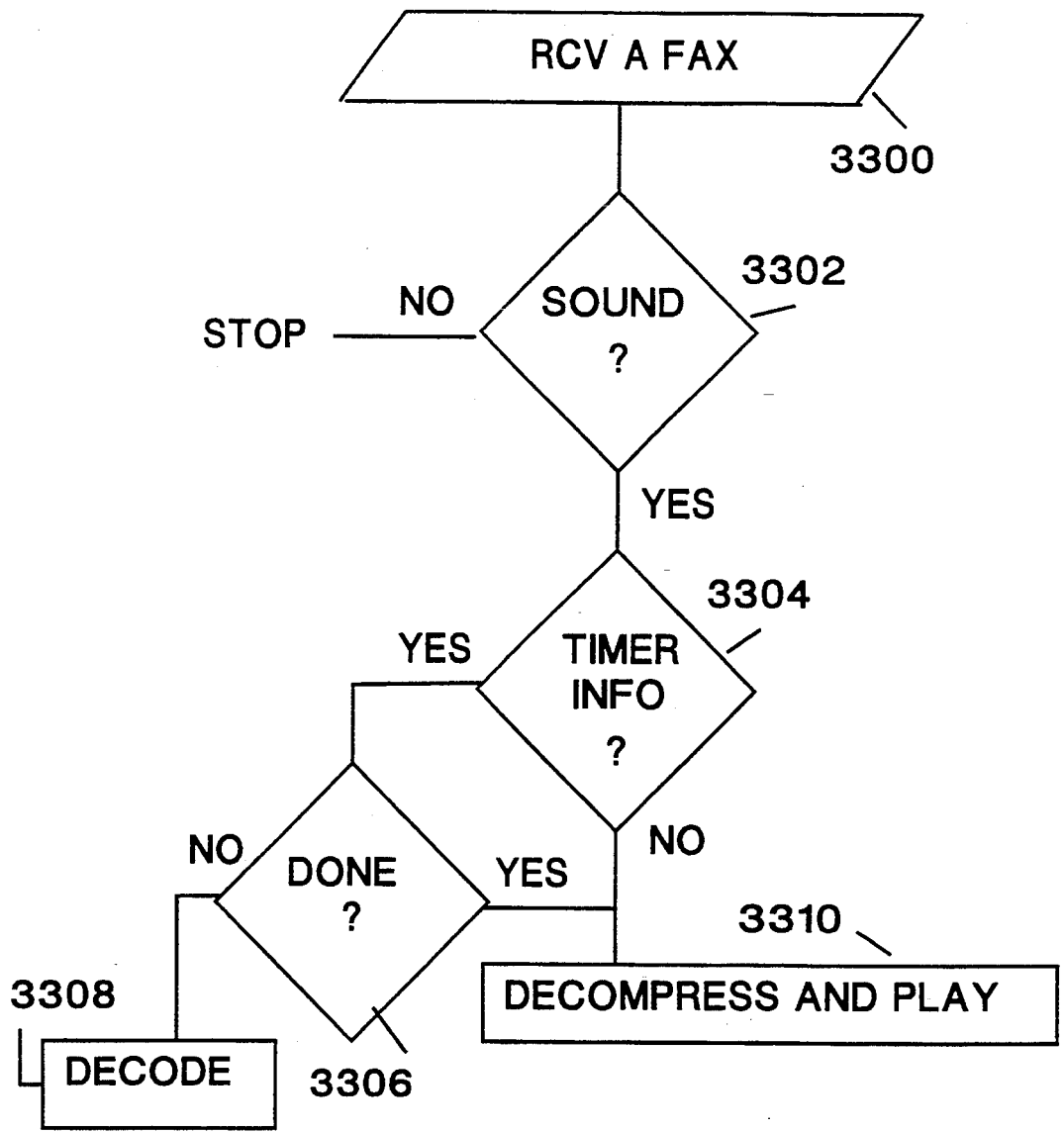
FIG. 33 shows the flowchart of operation of adding the sound.

The flowchart of operations that are executed upon receiving a facsimile is shown in FIG. 33. Step 3300 receives the facsimile, and step 3302 determines whether there is sound in the facsimile transmission. If there is sound present, then information indicative of the sound will be played at a predetermined time. Step 3304 determines whether timer information is present, and if so, a test is made at step 3306 to determine if the timer is timed out. If there is no sound, or if the timer has not yet timed out, a decoding of the facsimile is begun at step 3308. Preferably the timer then causes an interrupt in the decoding sequence when it has timed out. When the timer information has timed out, or if there is no timer information, the sound is decompressed from its compressed format and played in real time as it is decompressed. Preferably, this is carried on in parallel with the decoding of the facsimile so that the user sees the facsimile and hears the sound at the same time.

This embodiment preferably operates on fax communication from personal computer to personal computer. When the recipient calls up the fax, he also gets the sound. A receiving non-sound based facsimile machine would ignore the sound information.

These embodiments allows practical computer to computer communication without a modem link. One problem with modems is their requirement of interactivity between the two computers. Typically a file sent by modem requires that the receiving computer allow the sending computer some access to the computer "host". A "hacker" might be able to get more access to the computer. Moreover, file transfer and bulletin boards and the like are typically limited to single color, text-based information. By using the fax concepts of the present invention, multi-colored bulletin boards with graphics and sound become possible.

Figure 34:
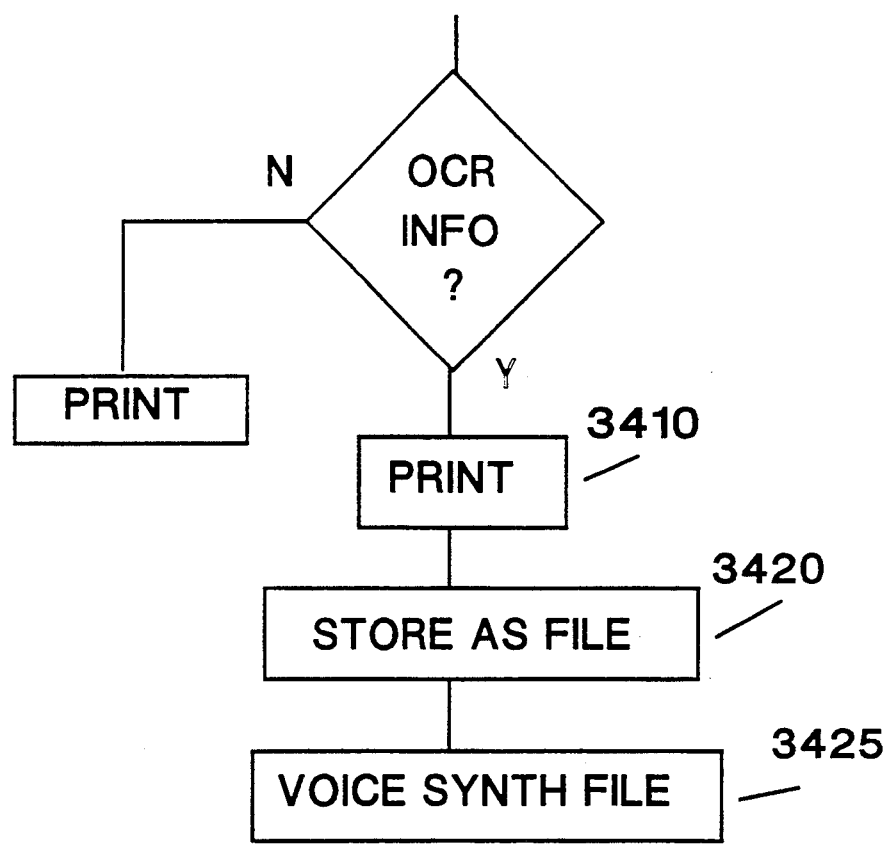
FIG. 34 shows a flowchart of operation for a voice synthesis mode of the present invention.

Yet another modification of the embodiment again modifies the basic premise of a facsimile machine to provide additional information between the sending and receiving facsimile machines. In this aspect of the present invention, the OCR'd part of the fax may be printed or handled as normally as at step 3410 of FIG. 34. However, it is also input into a reading text file as shown in step 3420. The reading text file is voice synthesized at step 3425 using a character recognition and reading program, such as MONOLOG ™. The fax information thus received is read in real time, or onto an audio recording media, so that the end user of the facsimile machine receives a audio facsimile message.

Figure 35:
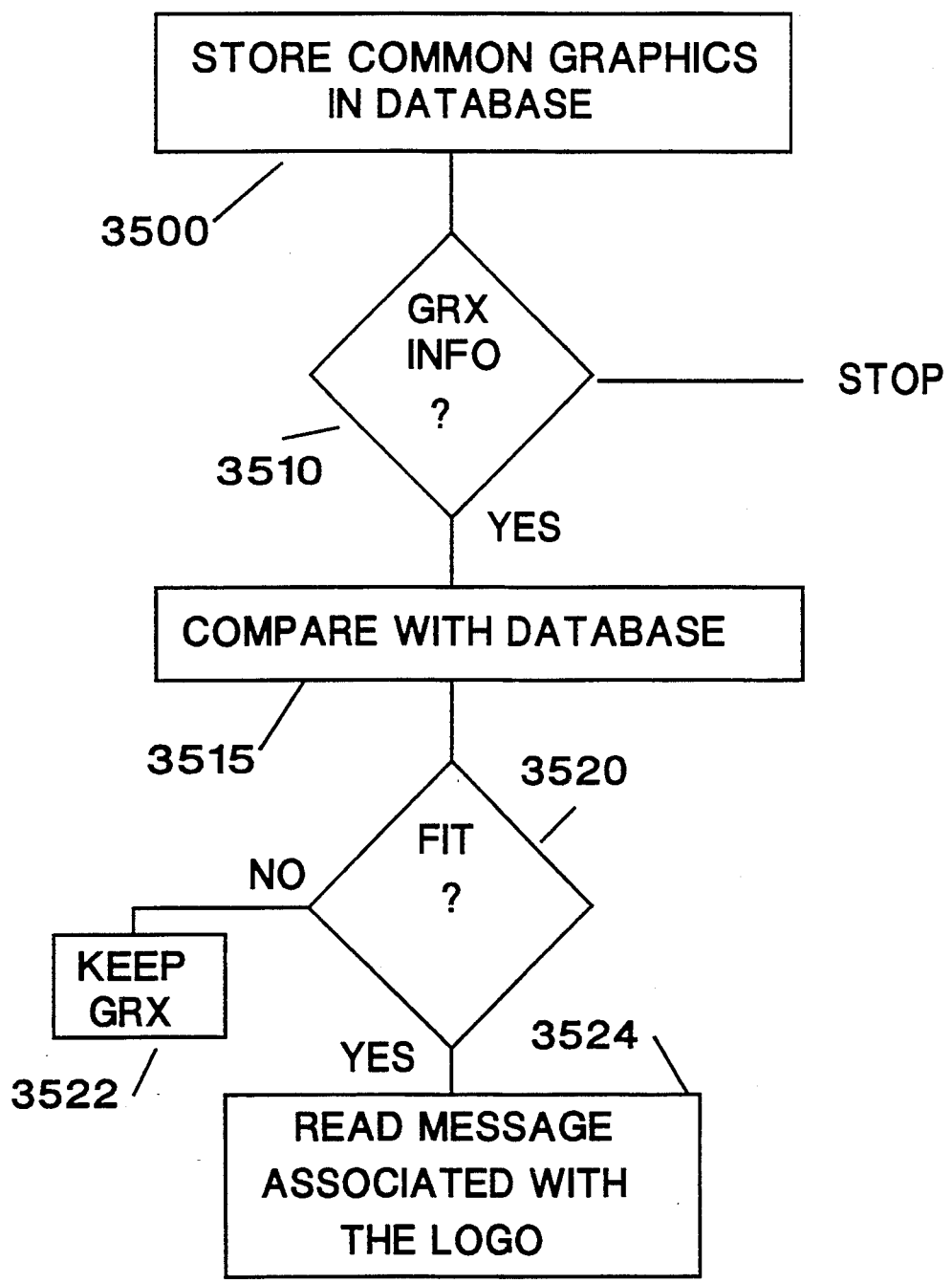
FIG. 35 shows adding graphics information to the FIG. 34 embodiment.

Another modification of the present invention requires teaching the recognition equipment to recognize certain commonly-received such as logos and signatures. Letterhead and logos of a common customers are stored in a database at step 3500 of FIG. 35. Any graphics information detected at step 3510 in the faxes is compared against the database using standard pattern recognition techniques at step 3515. Step 3520 determines whether there is a fit if not. If not, the information is maintained as graphics (step 3522). Whenever a fit is recognized, the receiving facsimile machine reads a pre-stored message associated with the graphics, at step 3524 e.g. "logo of XYZ company".

Similarly, the signature of a common customer could be recognized by comparing its graphics representation with a number of prestored graphics representation using any commercially available signature recognition system. The machine would then "read" the signature file as a "signature of John Smith."

Another modification is for a sending fax machine with similar capabilities to the above using voice recognition software such as so-called "Voice Blaster" ™ which can recognize a spoken voice. According to this embodiment of the invention, a facsimile is automatically generated based on spoken voice commands.

The user talks, giving both command words and words to be recognized and incorporated into text. Preferably, the command words are preceded and ended by a certain prohibited sequence such as "slash c". Therefore a command would be generated by saying/c include letterhead/c, c text/c, hello John, how are you today, sincerely yours,/c Scott Harris signature block/c. The computer identifies the term "/c" as a term meaning that all information until the next reserved sequence/c will be a command.

A command to include letterhead will access a prestored compressed graphics version of the letterhead. Similarly, a command to include a signature block accesses a prestored character signature portion including a graphics version of the signature therein.

This technique generates a fax in a form suitable for sending. Preferably, this fax is displayed on the facsimile machine display screen 1408. The user can look at it, edit it if necessary (using command keys for example) and then given an order/c send/c or can order it sent manually to either an entered or prestored telephone number.

Figure 36:
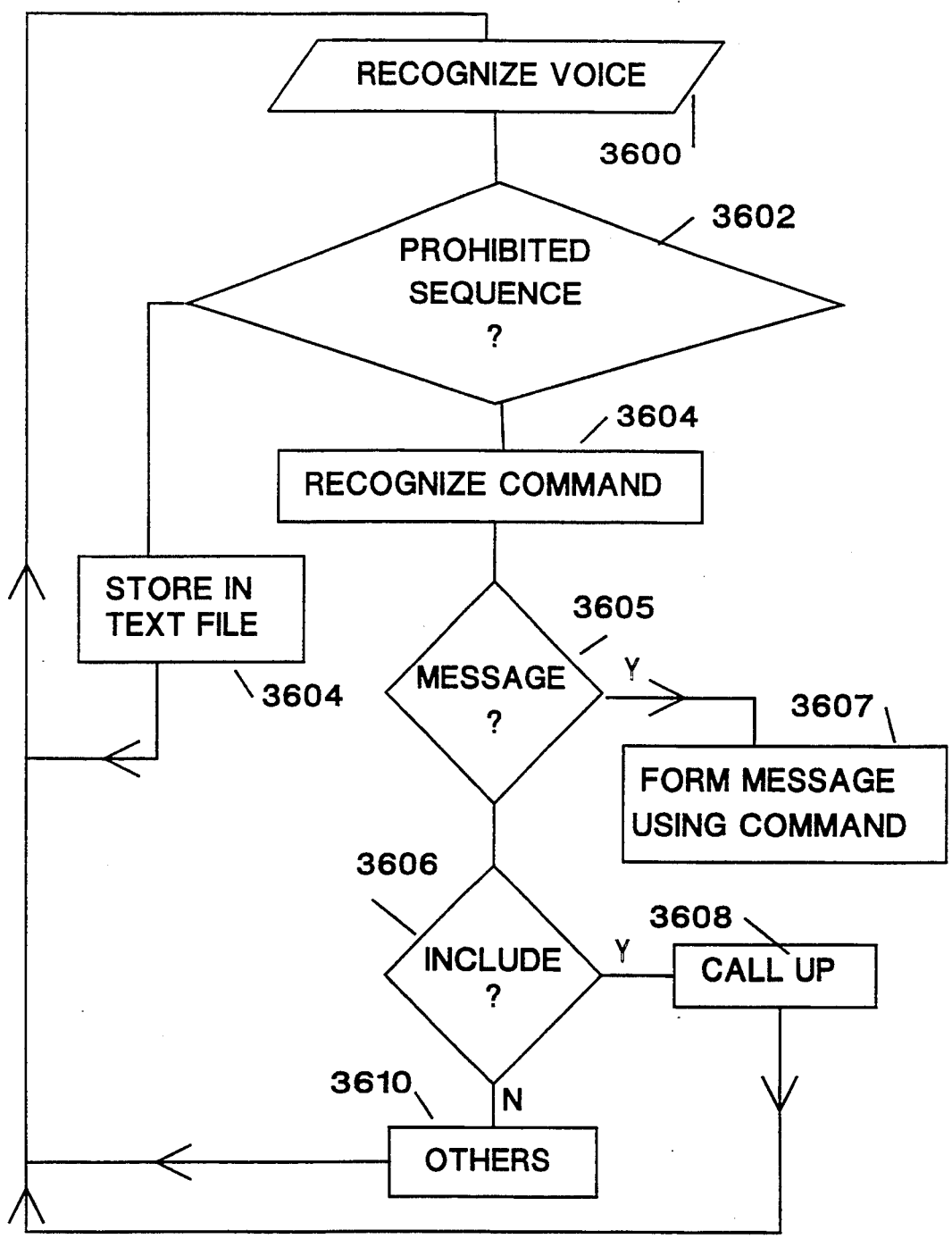
FIG. 36 shows a voice recognition operation embodiment of the present invention.

This technique is primarily intended as a convenience for hands-free sending of short faxes. The sender can simply walk up to the fax machine, dictate his comments, review it and immediately fax it. The fax machine of this embodiment can use the fax machine of FIG. 14, either as shown or as modified by the color information of FIG. 25. Memory 1414 must include information stored therein including the voice recognition programs and stored pattern blocks. Controller 1406 operates a flow chart shown in FIG. 36 for the specific pattern recognition of the present invention.

The flow chart begins by detecting a voice at step 3600, and next detecting whether the voice is saying a prohibited sequence such as/C, at step 3602. If the information is not one of the prohibited sequences, the information is stored in a file at step 3604 and control again passes to step 3600 where the next part of voice is recognized. If the information is recognized as being a prohibited sequence at step 3602, a command is recognized at step 3604. A command of the "message" type instructs the processor on forming a message or changing the current message. A message type command is recognized by a branch to the yes branch in step 3605. At step 3607, a command is made to form a message. The two most common message commands include start message, or simply "start" and end message: "end". The start message marks the text file with a start code. All words recognized thereafter will be part of the message to be sent. Similarly, the end code marks the file to indicate that at least the text part of the message is over.

Other message type commands include a format command, which requires a specific format for the message. The format is stored in memory, and has certain specific areas and locations where information should be entered. One example would be for a fax cover sheet, where the message will be at the bottom. A fax cover sheet could also be called up from memory using the include command, described herein.

A command of the "include" type is recognized at step 3606. These messages require call up of a stored segment, eg a graphics segment, from memory. A command is made to call up the information from memory at step 3608. A flag is also placed into the text file indicating where that particular inclusion should be located.

The include type commands include such commands as include letterhead, signature block and logo. In this case the information is called up from memory and placed into the image. Other commands are shown at step 3610. These include editing commands, and an oral command to dial a number and/or send a fax, for example.

When the sequences are finished, the information can be edited in any known way, not shown herein.

Yet another aspect of the present invention is directed to the "fax look" which every facsimile seems to have. Because of the inefficiencies in transmission, noise in the line and resolution of the fax format, a fax document has a different look than a printed document. This can be improved somewhat by the use of a plain paper fax printer and by computer-to-computer faxing, as well as by transmission in the "fine" mode. Still, however, a fax document is different looking than normal printed text, and at times it is hard to read.

The OCR embodiments of the present invention solve some of these problems. However, there will inevitably be non-OCR'd characters including handwriting, graphics, kanji or other foreign language characters and logos. Moreover, the OCR embodiment is only of use with another fax machine that has similar capabilities. The present embodiment of the present invention offers a solution to this problem.

According to the inventors' own tests, a majority of the problem is caused by the scanning of a fax. Other problems are from the telephone line and from the printing receiving machine. According to the present invention, the fax machine includes an information edge straightener, which straightens the edge of all lines, and linearizes edges of all elements which can be recognized as representing any kind of function.

Figure 37:
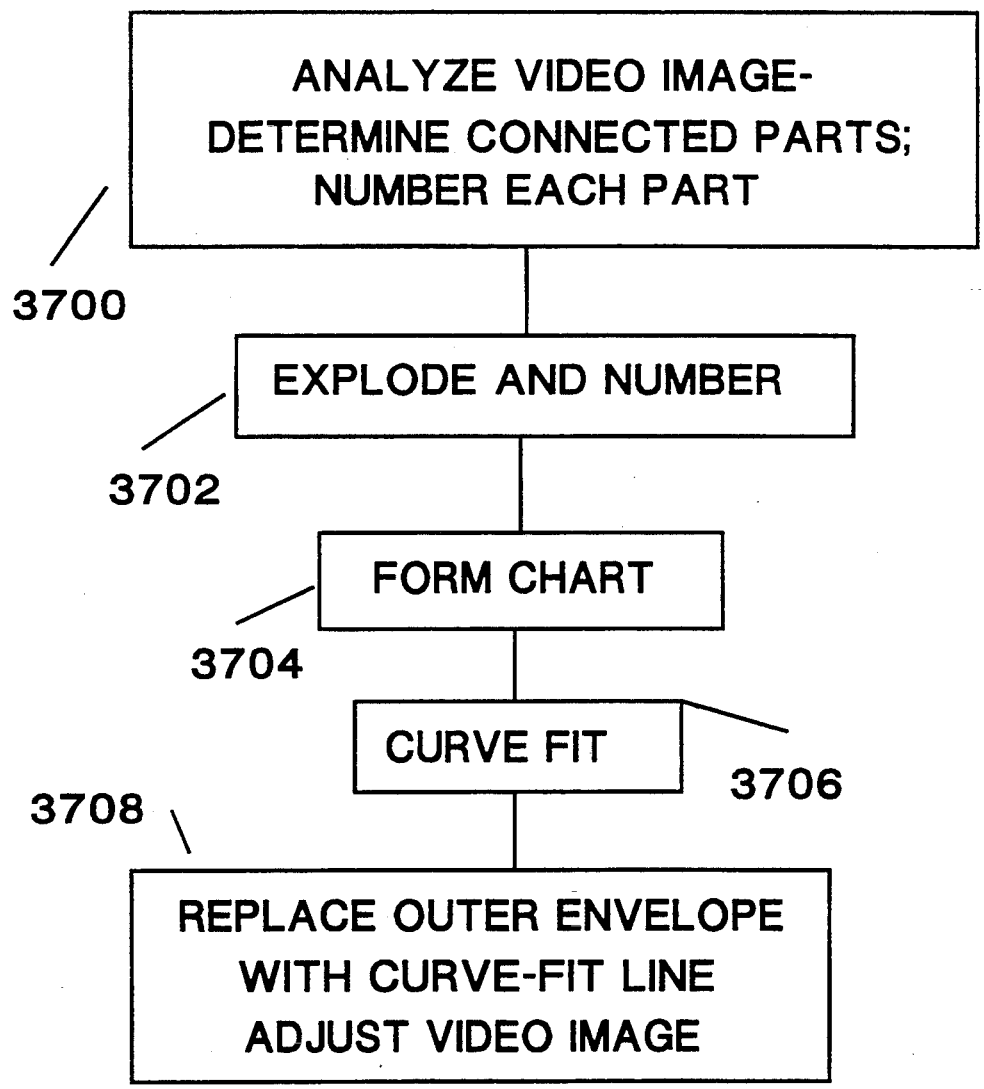
FIG. 37 shows a flowchart of operation of a line straightening embodiment of the present invention.

According to the preferred mode of the invention shown in FIG. 14, all send and receive information is stored in video memory, and is processed by a video processor. This stored video image is analyzed in step 3700 of FIG. 37 to resolve it into connected and unconnected parts. All connected parts are numbered and then analyzed at step 3702 to determine line segment and basic shape information for the connected parts. This is done by using an "explode" function used by many computer aided drafting ("CAD") programs. For example, all line segments and orientations are determined. Each thus identified line or function segment is numbered and placed in a chart at step 3704. A representative chart shown in FIG. 38 includes, as a subset of the numbered part, information on the line segment including its start point, its end point, and its width. A type code indicates the type of function being stored; where L=a line, C=a curve, A=an arc, R=a rectangle, and the like. Any of the curves represented by computer-aided drafting programs such as DesignCad (TM) could be stored with appropriate codes, in the "DW2" format used by Design Cad in storing their functions. Alternately, any other computer-aided drafting program could be used in a similar way.

An alternative to using the explode function is taking any angle greater than 90° as a point between two adjacent segments, and choosing every such point as dividing the basic part number into multiple segments. If the width of the line is uneven on the line segment, then it is treated as a filled-in rectangle and opposite edges of the rectangle are stored as start and end points with a code indicative of filling.

In the step 3706, each function segment is curve-fit to its closest function using a curve fitting program such as Table Curve TM from Jandel Scientific, Inc. The curve fitting function is used to correct any unevenness in the function. When a fax is sent and received, straight lines become fuzzy lines: their outer extremities are less than a perfect line or curve. The fuzzy line is then replaced with the improved line from the curve fit at step 3708. This can be used both on transmit and receive. The straightened line is used to adjust the video image in order to produce a more perfect image to be transmitted or printed. In this way, the resolution and appearance of the ultimate fax is improved.

Figure 39A:
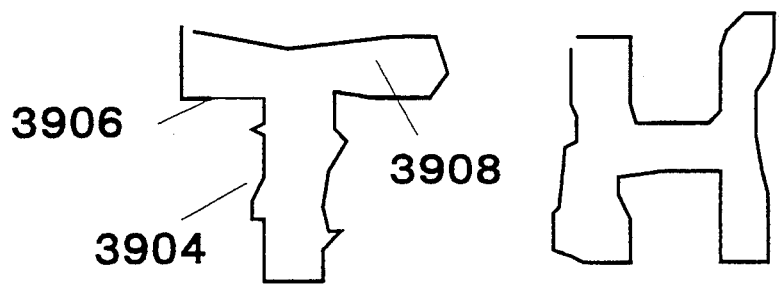
FIGS. 39A-39C show respective operations of the line straightening mode.
Figure 39B:
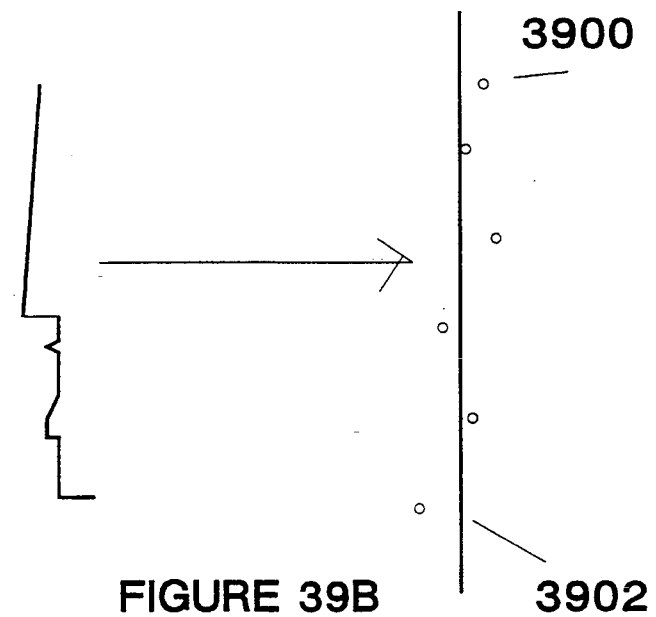

FIG. 39a shows a simulated portion of a faxed test document including exaggerated "fuzzy" lines as extremities. According to the present invention, these fuzzy lines are straightened prior to sending or printing. FIG. 39a a shows the letters first placed on a coordinate system. Representative sampling points at predetermined pitches are taken. These points are shown as elements 3900 in FIG. 39b. The points are interrelated using a curve fitting function or the like, to form a straight line 3902. This straight line replaces the left margin 3904 with a new left margin 3902. This has the effect of straightening the left margin.

Figure 39C:
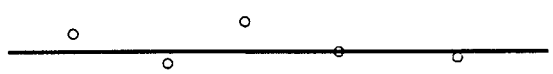

Similarly, the next straight portion 3906 of the letter 3908 is plotted into points as shown in FIG. 39c as points 3910, and interrelated to straight line 3912. This interrelated straight line 3912 is substituted into the final image as a new interrelated straight line.

In this way, the edges of the letters can be effectively straightened, both at the transmitting and receiving end, to provide a cleaner and more readable fax.

The present invention stores the fax information in a number of new and highly advantageous formats. The stored faxes can be sent directly, or can be simply stored in a form which is relatively compressed. These techniques make use of the recognition that a typical fax document is formed of information such as text and that the typical fax is mostly space, interspersed with lines of letters.

Figure 40:
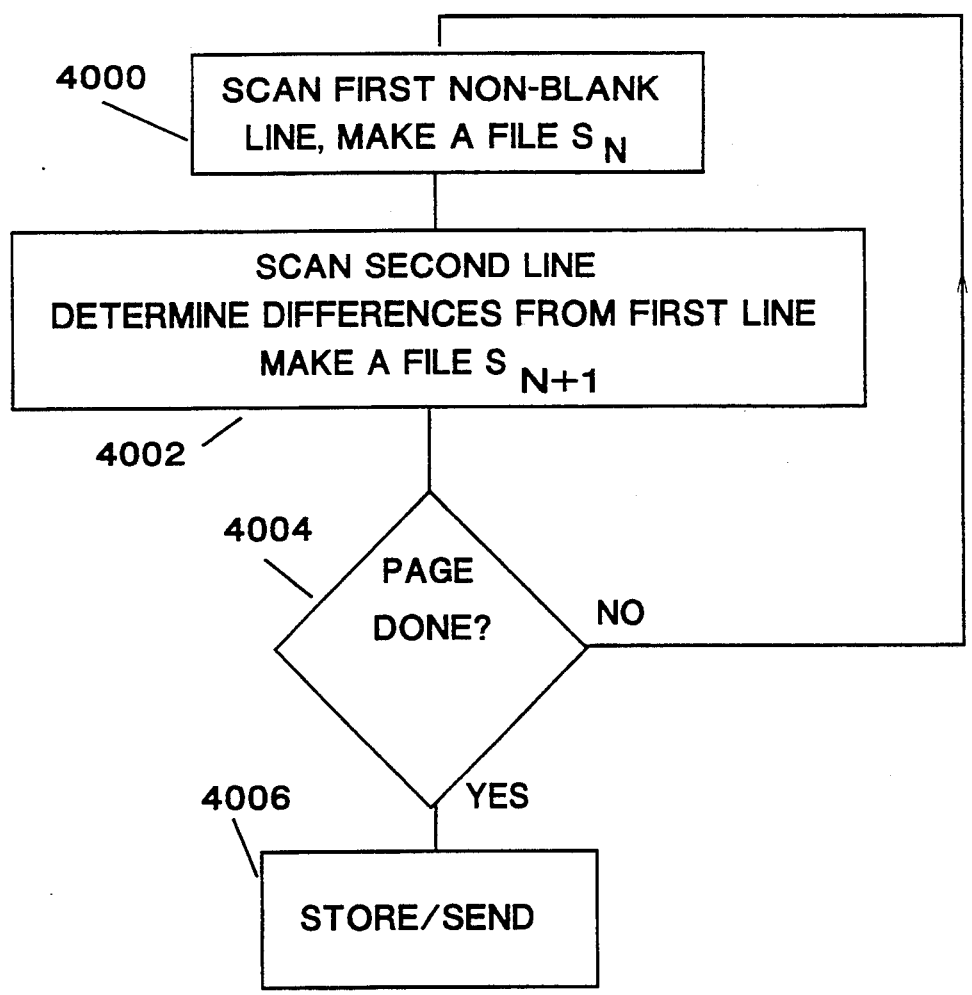
FIG. 40 shows an operation according to a first preferred format of the present invention which determines the changes between adjacent lines of facsimile coding.
Figure 41:
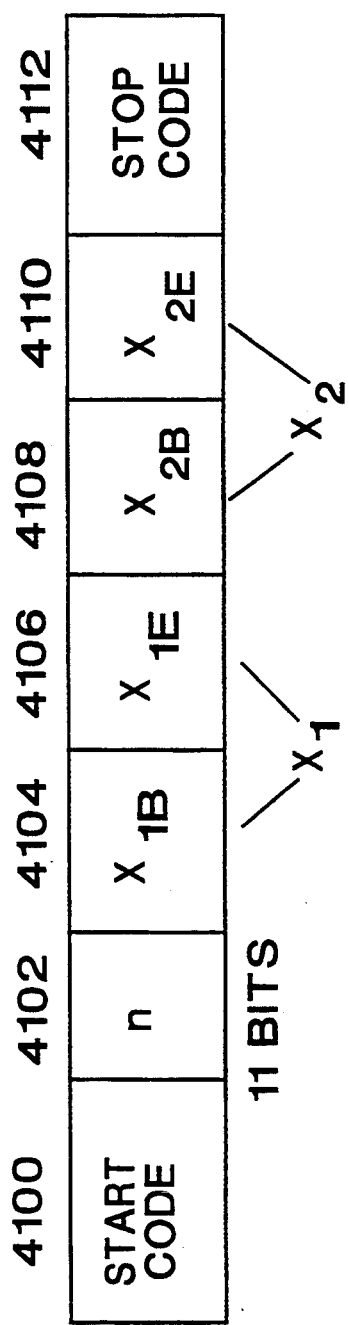
FIGS. 41 and 42 show preferred message structures according to the FIG. 39 embodiment.

The first embodiment of the coding scheme of the present invention is shown in FIG. 40. The information is preferably scanned by scanner 1402 into a video format for processing. The compression and storing according to the present invention is therefore carried out by image processor 1412 and controller 1406. According to this first aspect of the invention, each line is separately scanned.

In this embodiment of the invention, the video image is conceptualized as a number of coordinate dots; and these dots will be used to identify the coordinate system. Standard facsimile transmission is at 180 dots per inch, hence an 8½×11 sheet of paper requires $8\frac{1}{2} \times 180 = 1530$ positions in the x direction and 1980 positions in the Y direction (lines). Since there will typically be more blank space than non-blank space, only locations of the non-blank spaces will be noted. Preferably a blank removal technique as shown in FIG. 30 is used prior to this scanning.

Step 4000 begins the process by scanning the first non-blank line on the page. This is incorporated into a file Sn where n is the line number. The file has the form shown in FIG. 41. Eleven bits are necessary for this address, hence the first bits of the file include a start code 4100 and then 11 bits of line information identifying the line number being scanned. The line number is followed by an x coordinate of the beginning of the first dark space, 4104. The line number is followed by another x coordinate indicating the end of the first dark space 4106. These coordinates are shown in FIG. 4100 as X1b and X1e, and together form a pair referred to as couplet X1. The next dark space is similarly referred to using X2b and X2e as shown in reference 4108 and 4110.

Figure 42:
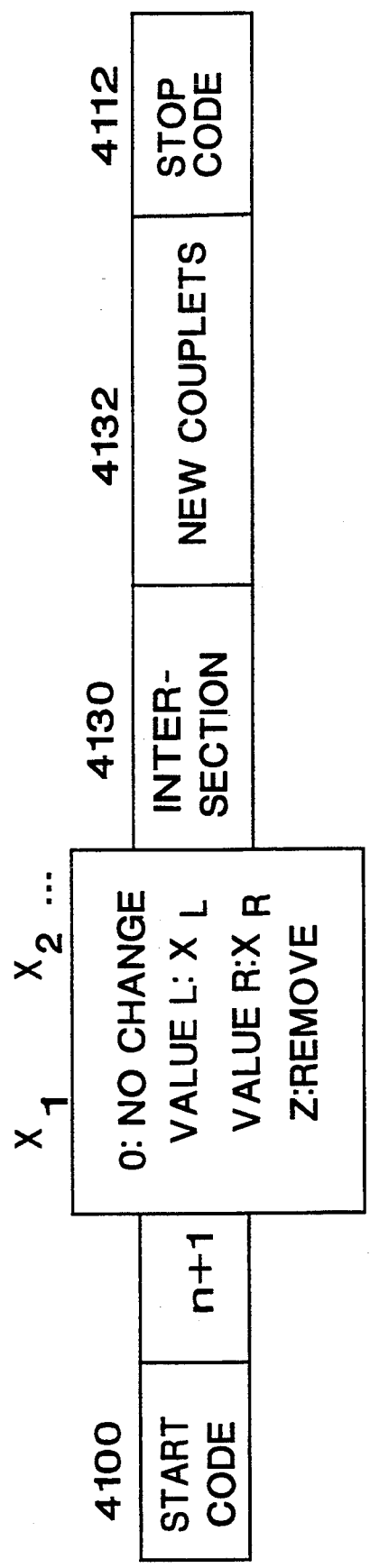

Once the file SN is made, the next line is scanned. The second line is scanned at step 4002, and the differences between the scans from the first and second line are determined. These differences are encoded into the second line scan shown in FIG. 42. After the start code 4100, and the line code N+1, the next value refers to the couplet $X_1$. The information defines the differences between $X_1$ for line N and $X_1$ for line N+1. A number of different change values are possible. As shown in FIG. 42, the value 0 refers to no change. The value L (appropriately coded) is followed by an amount by which the beginning of the couplet is moved to the left, shown as $X_L$. Similarly, a value R indicates the amount by which the couplet is moved to the right. Therefore, if the line gets thicker, it will have both XL and XR values. After all the couplets in FIG. 41 have been addressed in the next line, an intersection code 4130 is inserted, followed by new couplets 4132 indicating the new characters which have started. Stop code 4112 ends the transmission for the line.

This process is repeated for the entirety of the document, it being understood that any time there is no transmission for a line, that line is assumed to be the null set, and a command code indicative of null is stored. The packets of information which are obtained for the non-blank lines are indicative of the changes from the line before. Of course, if the line before was blank, the first line must be indicative of the totality of the line.

Certain reserved codes such as the start code, stop code, intersection code, null code, values L, R, Z and O are reserved sequences which are prohibited in the coding scheme. This relatively compressed system enables significant advantages.

Step 4004 checks to determine if the page has finished, and if so the information is stored or sent at step 4006.

Figure 43:
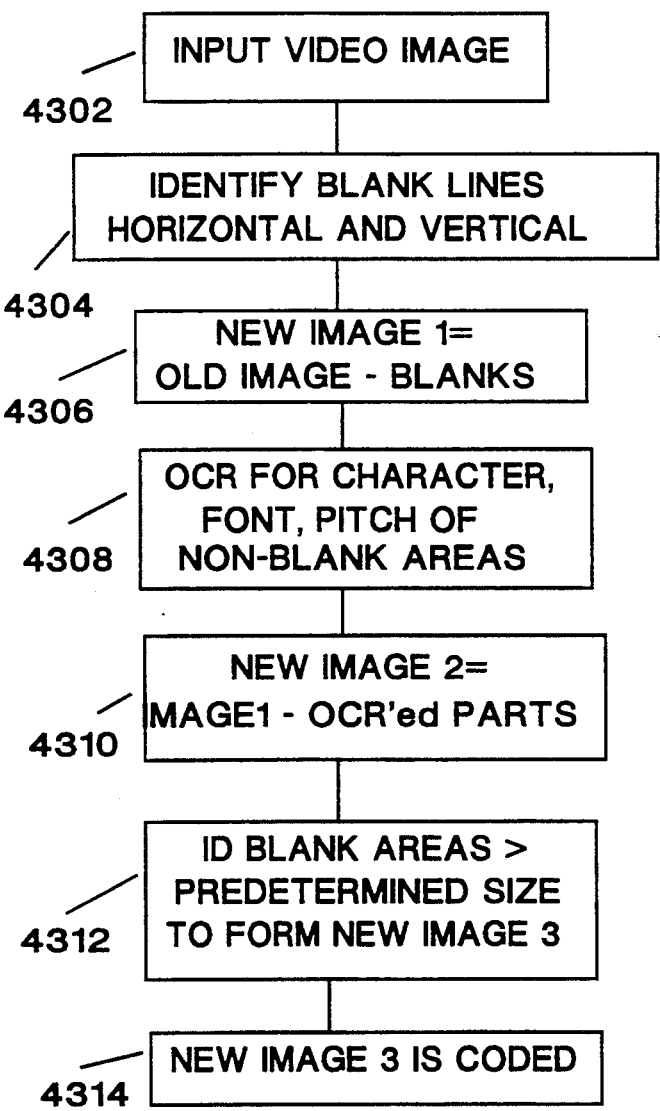
FIG. 43 shows a blank and OCR detection embodiment.

Another modification is shown in FIG. 43. This embodiment of the invention produces an even further compressed signal to be sent. This embodiment of the invention assumes that a fax is being sent from a scanning-type facsimile machine. Step 4302 inputs the video image corresponding to the facsimile to be sent. At step 4304, all blank lines in the image are identified. This includes both horizontal top and bottom margins, vertical left and right margins and horizontal blank lines between adjacent horizontal non-blank lines. A new image is defined at step 4306, as the old image minus the blank lines.

Figure 44:
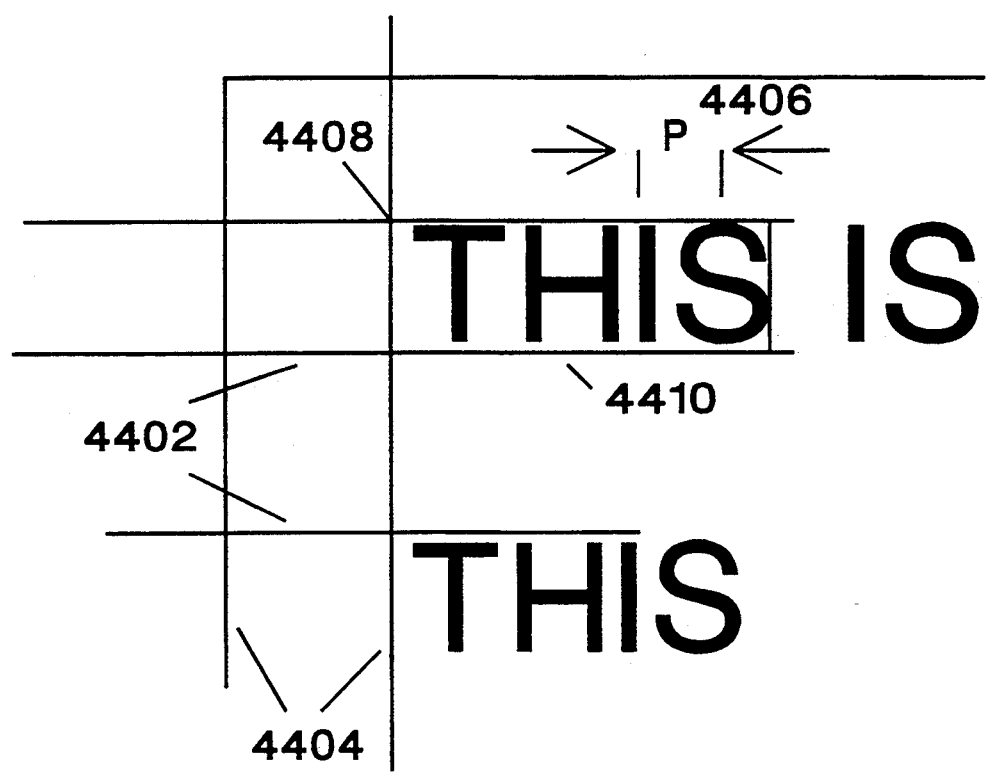
FIG. 44 is used to illustrate how the blank and OCR detection embodiment operates.
Figure 45:
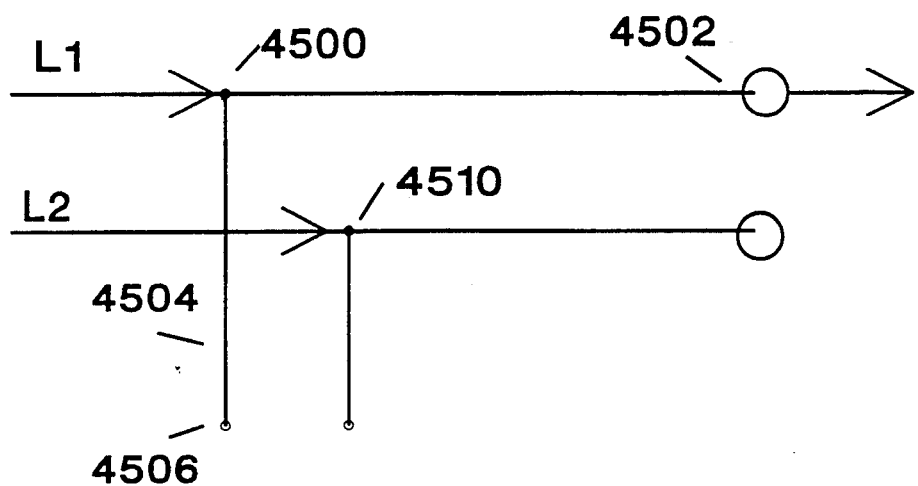
FIG. 45 shows a scanning used according to another coding scheme of the present invention.

At step 4308, the new image is OCR'd to recognize all characters therein. The OCR process is done for the character, font, pitch, spacing, etc. of any non-blank spaces. FIG. 44 shows a representative document. Area 4400 is a top margin and area 4402 is a blank space between two adjacent lines. Area 4404 is a left margin, and there is also a right margin although it is not shown.

The first information includes the letter which we know as the letter T. This letter is OCR'd, and the result is the ASCII code for T, the font name (presentation 18 pt) and the pitch value shown as 4406. The next letter 4410 is investigated and is recognized as being an H. The X,Y coordinates of these letters in the reduced coordinate system of image 1 may also be obtained along with the OCR information indicative of that letter.

After OCRing the entire image, a new image 2 is formed at step 4310 which corresponds to image 1 minus the OCR'd (that is the recognized) parts of image 1. For example, in FIG. 44, this would include the OCR'd boxes shown as 4408 and 4410.

The remainder of image 2, therefore, is 1) blank space which did not fall into the blank line tests of step 4304, and 2) non-recognizable information. The image 2 is identified for blank areas greater than a predetermined size at step 4312 to form new image 3. At step 4314, new image 3 is coded using any commercially-available facsimile format or the facsimile format described with reference to FIGS. 40 through 41.

The resultant image therefore includes a number of parts: 1) identification of location blank lines and areas as determined in step 4304, 2) identification of OCR-recognized characters including character font and pitch thereof, and 3) graphics information coded in any facsimile format.

Advantageously, the blank information is set forth first, to form new image 1, and then a reduced X,Y coordinate system is set up. This new x,y coordinate system is then used to set the locations of the OCR information and the graphics information. Advantageously, only the center point of the OCR or graphics is used, followed by the information itself.

According to another aspect of the invention, the FIG. 43 embodiment is specially adapted for use with a computer-based facsimile machine. Many computers include fax cards therein, and these fax cards typically operate on the information from a word processing spreadsheet or other application, and convert the output to graphic information. According to this embodiment/modification of FIG. 43, the character information including character ASCII format, font, pitch and the like are maintained and not converted to graphics. Only the information which was identified as being graphics information is stored as graphics information.

The above-discussed embodiment is optimized for a text-type document. Other modifications are possible in this embodiment to allow use with non-textual type documents. For example, a spreadsheet might not be efficiently converted in this way. Hence, the FIG. 43 embodiment could be modified to add an additional step of detecting continuous straight lines across vertical and horizontal areas, defining these straight lines in terms of coefficients based on a curve fit to an equation, and removing these lines from the image to form yet another new image. Other such modifications can also be made.

Figure 46:
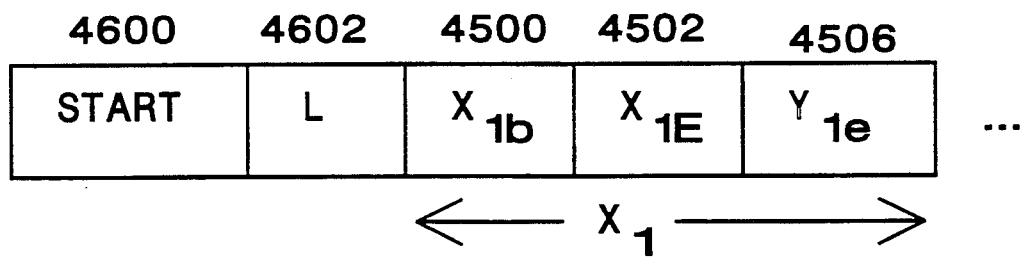
FIG. 46 shows a message structure according to the FIG. 45 operation.

Yet another aspect of the present invention for coding this kind of information is shown schematically in FIG. 5. The scanning system of FIG. 45 scans across a line L to look for the first dark area which is shown as element 4500. The system continues to scan in the X direction to find the end of the dark area at point 4502 and then continues to scan in the X direction in a similar way. At the end of the line, scanning returns to dot 4500, and then continues in the Y direction as shown by line 4504. The image is scanned until point 4506 which is the end of the dark area in the Y direction. This entire image scan between 4500, 4502 and 4506 is encoded as the first couplet similar to the couplet in FIG. 1. FIG. 46 shows the format as including a start code 4600, a line number 4602, point X1 which is value 4500, point X1E which is value 4502, and the last value of the couplet is point Y1E which is the value 4506.

This couplet X1 imparts information about both the X and Y directions. The subsequent scan of line L2 therefore does not look for the point 4508, but rather investigates the point 4510. If there is no change between line L1 and L2, the coding is similar to that in the previous embodiment.

Yet another problem in the art of facsimile machines is excess power consumption. It has been typical in printers and copying machines which use, for example, a photosensitive drum, to enter a power-down mode. In this power-down mode, when no activity is detected for a predetermined time (usually a relatively long time to make sure that it is night or the like), the machine enters the power-down mode and the photosensitive drum and associated equipment is allowed to cool. This saves power, and also can extend the life of the associated heating components.

Facsimile machines which use a photosensitive drum, however, ("laser faxes") have not included this power-down feature. This was because during the time that this feature is engaged, the machine could not print and therefore any incoming facsimiles would be lost. Accordingly, these facsimile machines are maintained in the on state at all times, when in fact they might not be needed for many, many hours. This not only wastes power, but also puts unnecessary wear and tear on the components.

This embodiment of the present invention obviates all of these problems in a new and advantageous way. The first embodiment of the invention operates using the facsimile machine of FIG. 14 or equivalent, and according to the flow chart of FIG. 47.

The FIG. 14 facsimile machine is shown with two separate power supplies: PS1 element 1460 and PS2 element 1462. The power supply 1462 powers printer 1432 and spooler 1422. If the printer 1432 has a photosensitive drum or the like, therefore, it is powered by PS2 power supply 1462. The PS1 power supply 1460 powers only the processing elements including the fax processor and storage and the like. It should be understood that while two power supplies are described in FIG. 14, an equivalent operation could also be done with a single power supply and, for example, a relay to close the connection between the single power supply and the printing section 1430. Then, when the additional power to the printing section was necessary, this relay would be closed. Also, it should be understood that this system would operate in a similar way to the embodiment of FIG. 15. While the power supplies are not shown in FIG. 15, it should be understood that the fax control 1450 could include either a similar or common power supply to the printing elements 1430.

Figure 47:
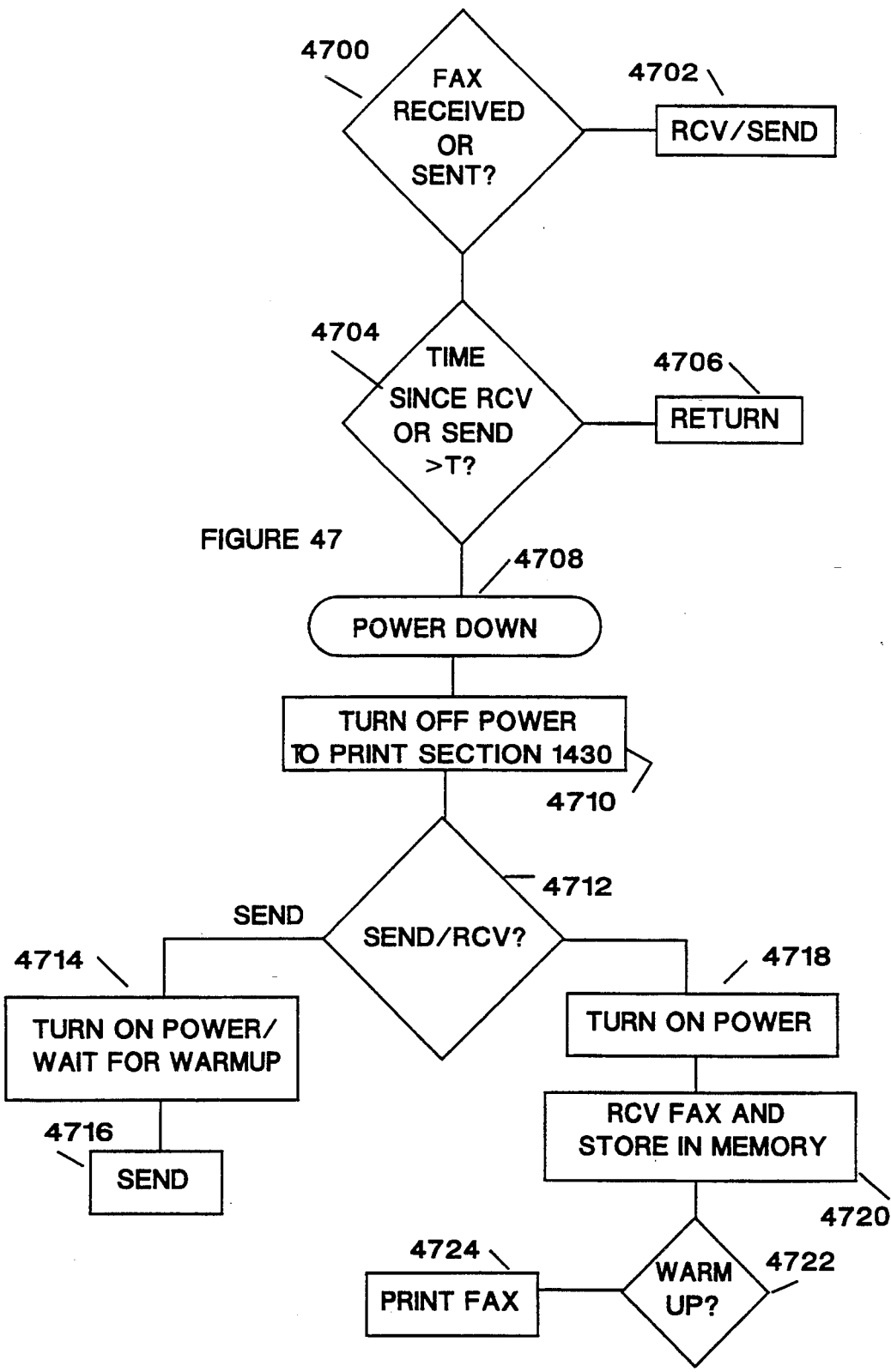
FIG. 47 shows an overall operation of the first mode of the power down embodiment of the present invention.

FIG. 47 shows a routine which is being continuously run by the fax processor, either by timed interrupt or at predetermined times. Step 4700 determines whether a fax is currently being received. If so, control passes to step 4702 which receives the fax in the usual way. If not, step 4704 determines whether the time since receiving or sending the last fax is greater than a time T. The time T is the threshold which will be used to determine power down, and is typically one to two hours. If the result is no, a return to the main routine is executed at step 4706. However, if the time is greater than T, then the power-down routine shown in step 4708 is executed. The power-down routine begins at step 4710 by turning off the power to the print section 1430. The power to the fax control section 1450 is retained. It is recognized that this power consumption, however, is simply the power consumption required to maintain integrated circuits and the like and is hence considerably less than that used by the printer section 1430.

According to another mode of the present invention, however, the processing elements in the fax control section 1450 may be put into a conventional processor sleep mode.

After power is turned off, the system uses a special routine whenever any action is detected. The action detection is shown taking place at step 4712. If a send is detected, power to the print section 1430 is turned on at step 4714, and the send will not be executed until the proper warm-up has occurred. In an alternate mode, send can occur without power to the print section. The send operation is carried out at step 4716.

A receive mode, however, must have a warmed-up machine. Power is immediately turned on at step 4718. At this point, different machines will require different operations. If the printer is a relatively fast warm up printer, such as a bubble jet printer, then warm up can occur while the phone is ringing, and the machine will answer on, for example, the fourth ring. The preferred mode of the invention, however, is intended to be used with a laser fax machine where warm up takes between 30 and 45 seconds; too long to wait before answering the phone to receive the fax. Therefore, in this preferred mode, the fax is received at step 4720 and is stored in memory 1414. It should be understood that the memory in which the fax is stored could be any kind of memory: an audio medium as in the first embodiment, electronic memory, removable memory or any memory described throughout this specification. Therefore, the machine receives the fax as normal. Step 4722 determines whether the machine has warmed up, and when it has warmed up, the fax is retrieved from the memory and printed as normal at step 4724. Therefore, even though the machine was in an powered-down mode, the fax is normally received and processed.

There are many alternate ways of carrying out this embodiment. While this embodiment of FIG. 47 is the preferred embodiment, it requires that the fax machine have a memory function. Of course the first embodiment of this invention allows memory for the fax machine to be embodied relatively cheaply. However, the least expensive fax machines still might not have this memory capability.

Figure 48:
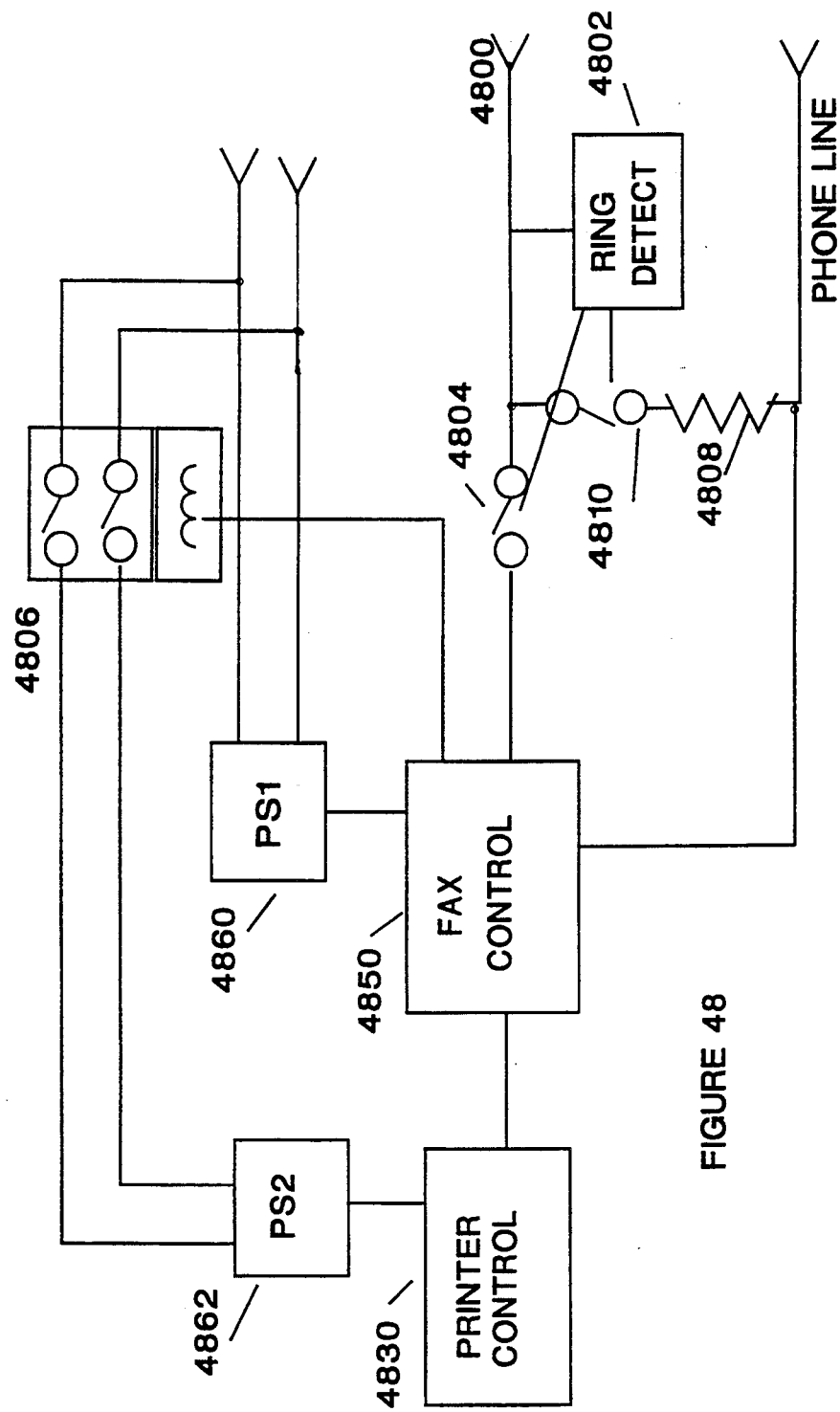
FIG. 48 shows a block diagram for the additional structure necessary for a second mode of the power down embodiment.

The alternate mode of the present invention shown in FIG. 48 allows a power-down mode in a machine that requires warm up even when there is no memory. It does so in a new and novel and no way taught or suggested by the prior art. The preferred mode of power down without storing the fax is shown in FIG. 48. The incoming telephone line 4800 is coupled to a ring detector 4802 which detects the square wave constituting a ringing tone. Ring detector 4802 controls two relays shown as 4804 and 4806. Relay 4804 is the off-hook relay which, when closed, provides an off-hook indication to the telephone line. An off-hook resistor 4808 provides the necessary resistance to indicate an off-hook condition. An auxiliary set of contacts 4810 connect between phone line 4800 and the off-hook resistor 4808. The ring detection also connects the phone line 4800 to the fax controller 1450.

While off-hook resistor 4808 is shown as being separate, it could be the input impedance of the fax controller 1450.

Ring detector 4802 also controls a relay which provides power to the power supply 2 1462 that controls the printer controller. Fax controller 1450 also provides an output to the relay coil that controls these relay contacts.

Figure 49:
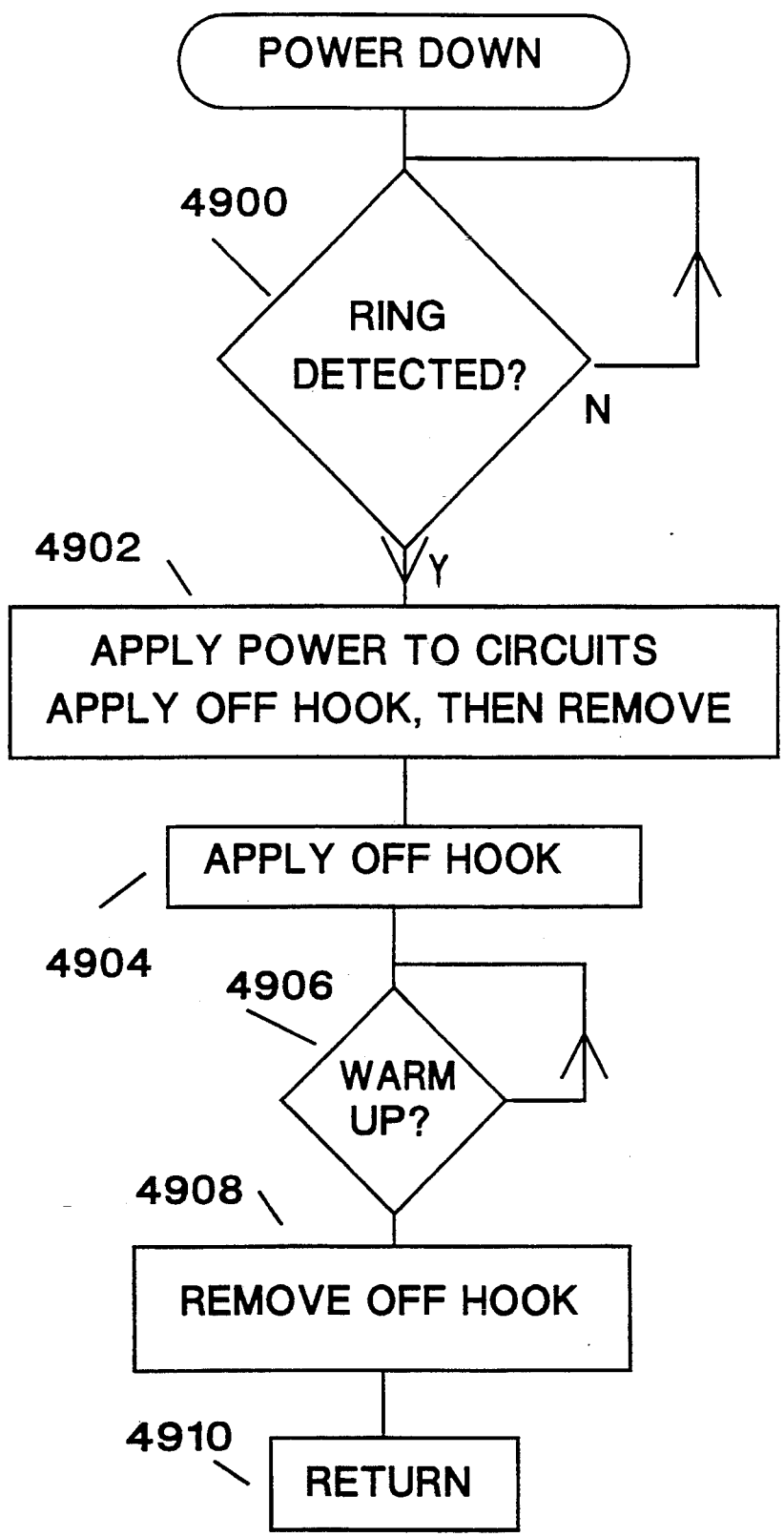
FIG. 49 shows a flowchart of the operation of this second embodiment.

This embodiment operates according to the flow chart of FIG. 49. The normal operation of this embodiment may be the same as any of those embodiments previously discussed. However, the power-down operation is different and is shown in FIG. 49.

When the device is powered down, only the ring detector 4802 needs to be energized. The ring is detected at step 4900. When a ring is detected, a number of items simultaneously occur. First, the relay 4806 is closed, applying power to the fax control circuit 1450 and the printer cbntrol circuit 1430. These circuits immediately begin powering up. Next, power is applied to the relay contacts 4810 to supply an off hook; but only for a very short time. Immediately after supplying an off hook, the off hook is removed to cause a disconnect.

At this point, the circuits will be powering up, but the sending facsimile machine will detect no carrier so it will "decide" that the call has not been successful. Thirty seconds or so after removing the off hook, the off hook is again applied at step 4904. All subsequent calls will receive a "busy" signal. Step 4906 determines whether the system has warmed up, and if so the off hook is removed at step 4908 and control is passed to the normal routine at step 4910.

In this way, the sending facsimile machine will recognize an error, and will automatically go into automatic resend mode. The automatic redial of most facsimile machines will call again after a minute or two. The embodiment of FIGS. 48 and 49 exploit this by making the sending facsimile machine think that it has received a busy signal because it will automatically disconnect. If the machine immediately calls back it will get a busy signal. However, a minute or two later, after warm up has been completed, the system will be back on-line and will receive the facsimile which was previously sent.

Although FIGS. 48 and 49 show a processor controlling the operation, it should be understood that this could be easily carried out using hardwired integrated circuits and relays.

Figure 50:
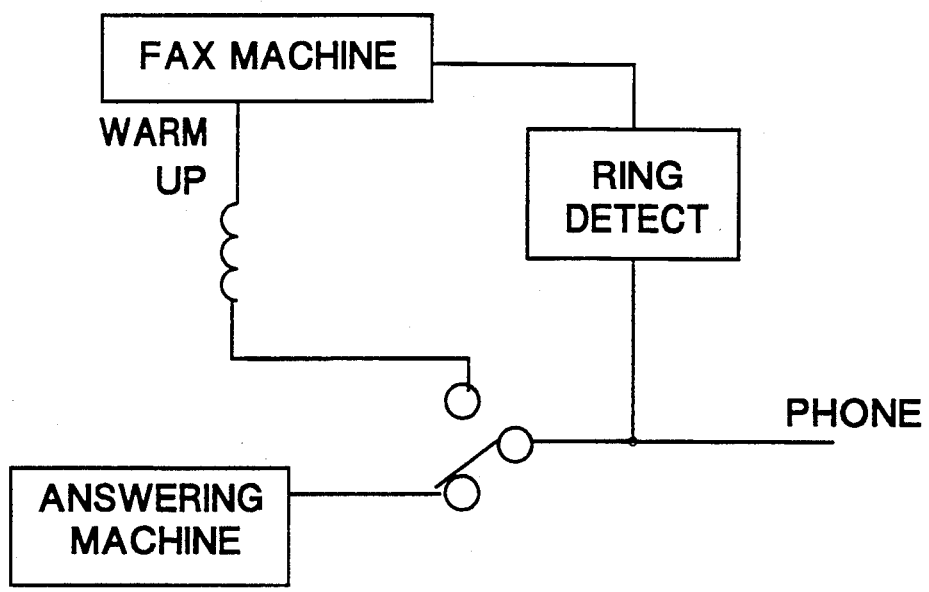
FIG. 50 shows a block diagram of yet another embodiment of the power down.

A modification of this system is shown in FIG. 50 in substantially abbreviated form. In FIG. 50, when an incoming call is received while in the power down mode, the call is coupled to an answering machine. The answering machine plays a message such as: "you have reached a powered-down facsimile machine. This machine has been turned on by your call. Please call back in one to two minutes." Then, the machine can either disconnect or take a message. While the answering machine is shown as being controlled by a relay, it can also be in parallel with the fax machine or the like. The ring detection turns on the facsimile machine.

Figure 51:
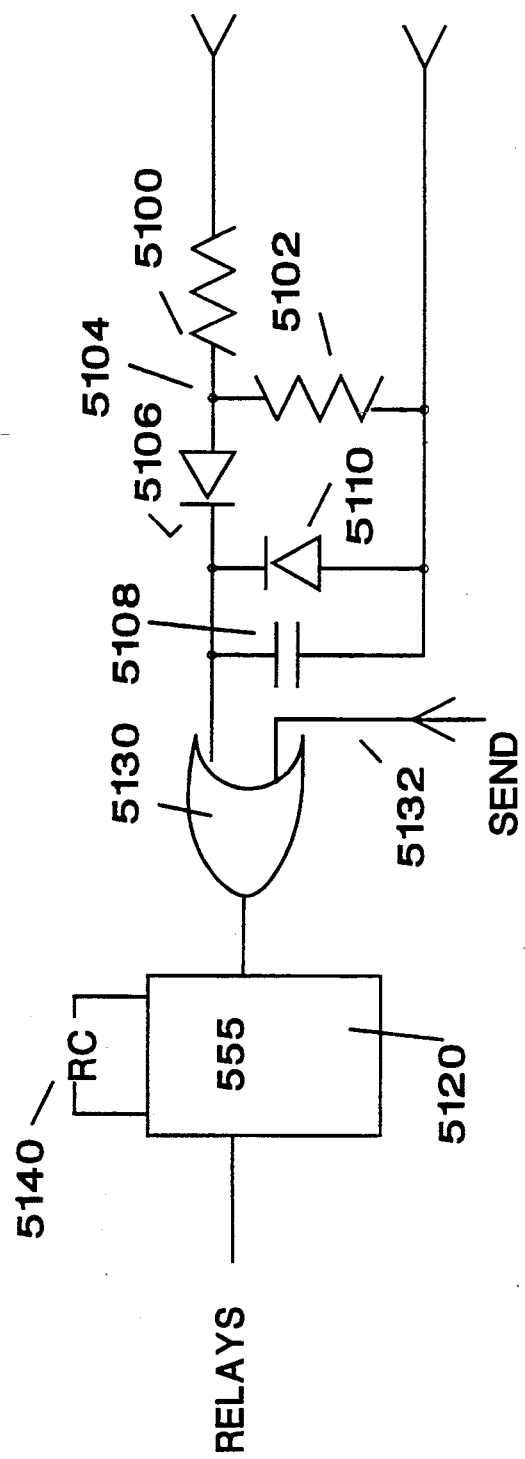
FIG. 51 shows a representative hard wired circuit which could be used for this operation.

A representative simple circuit which can perform this function is shown in FIG. 51. The phone line is input to a pair of resistors 5100 and 5102 connected as a voltage divider. This should ideally divide the voltage down to 15 volts or so at node 5104. The voltage at node 5104 is rectified by diode 5106, and the output of that diode is coupled to parallel-connected capacitor 5108 zener diode 5110. The output of this parallel pair is used to trigger the input of a 555 timer integrated circuit 5120. Optionally, an OR gate 5130 is provided which receives a signal 5132 indicative of a facsimile having been sent. This signal could easily be derived from the off hook signal provided to the telephone line, for example.

The 555 timer includes associated components shown as 5140. These components are preferably connected to provide a one to two hour time delay after which the machine goes into sleep mode. The output of the 555 timer is used to control the relays shown above.

Although only a few embodiments have been described in detail above, those having ordinary skill in the art will certainly understand that many modifications are possible in the preferred embodiment without departing from the teachings thereof.

All such modifications are intended to be encompassed within the following claims.

What is claimed is:

1. A method of assembling and transmitting a color facsimile, comprising the steps of:
    obtaining information to be transmitted as a facsimile;
    dividing said information into luminance signals indicative of monochrome information and chrominance signals indicative of colors of the information;
    assembling a facsimile message to be transmitted which includes a luminance signal and a separate chrominance signal;
    transmitting a first portion of the facsimile message including information indicative of the luminance signal;
    transmitting an additional handshaking signal indicating that the first portion of the message is completed and querying the presence of color capabilities in a receiving facsimile machine; and
    detecting a response to said additional handshaking signal and only if the response to said additional handshaking signal indicates that color capabilities are present, transmitting the chrominance signal corresponding to the already-transmitted luminance signal.

2. Color capable facsimile apparatus, comprising:
    an image receiving element which receives a signal indicative of an image to be sent via facsimile;
    an image resolving element which assembles a signal indicative of a luminance value of said image;
    a facsimile message assembling device, producing a portion of a facsimile message to be sent based on said luminance value; and
    a color information detecting element, determining if the facsimile to be sent will be sent in color, and if so, producing a signal indicative of a chrominance value of said image;
    wherein said facsimile message assembling device produces a final fax signal to be sent by always using said portion including said luminance value, and using said signal including said chrominance value only when the color information detecting element indicates that a color fax is to be sent.

3. An apparatus as in claim 2, wherein said color information detecting element includes means for sending and detecting responses to handshaking signals to determine if the facsimile will be sent in color.

4. Color capable facsimile method, comprising:
receiving a signal indicative of an image to be sent via facsimile;
assembling a signal indicative of a luminance value of said image;
producing a portion of a facsimile message to be sent based on said luminance value;
determining if the facsimile to be sent will be sent in color, and if so, producing a signal indicative of a chrominance value of said image; and
producing a final fax signal to be sent by always using said portion including said luminance value, and using said signal indicative of said chrominance value only when the determining determines that a color fax is to be sent.

* * * * *